(12) United States Patent
Kadomura et al.

(10) Patent No.: US 6,391,437 B1
(45) Date of Patent: May 21, 2002

(54) COMPOSITE MATERIAL AND MANUFACTURING METHOD THEREOF, SUBSTRATE PROCESSING APPARATUS AND MANUFACTURING METHOD THEREOF, SUBSTRATE MOUNTING STAGE AND MANUFACTURING METHOD THEREOF, AND SUBSTRATE PROCESSING METHOD

(75) Inventors: Shingo Kadomura, Kanagawa; Kei Takatsu, Tokyo; Shinsuke Hirano, Kanagawa, all of (JP)

(73) Assignee: Sony Corporation (JP)

(*) Notice: Subject to any disclaimer, the term of this patent is extended or adjusted under 35 U.S.C. 154(b) by 0 days.

(21) Appl. No.: 09/015,636

(22) Filed: Jan. 29, 1998

(30) Foreign Application Priority Data

| Jan. 29, 1997 | (JP) | 9-015386 |
| May 9, 1997 | (JP) | 9-118562 |
| Aug. 13, 1997 | (JP) | 9-218832 |
| Sep. 24, 1997 | (JP) | 9-258229 |

(51) Int. Cl.$^7$ .................................................. C09J 5/02
(52) U.S. Cl. ................................ 428/307.3; 428/306.6
(58) Field of Search ............................ 428/117, 120, 428/457, 620, 306.6, 307.3; 228/121

*Primary Examiner*—Rich Weisberger
(74) *Attorney, Agent, or Firm*—Ronald P. Kananen; Rader, Fishman & Grauer PLLC

(57) ABSTRACT

The invention provides a substrate processing apparatus using a composite material which permits avoidance of occurrence of damages caused by the difference in thermal expansion between different materials and can be with stand the use at high temperatures. The substrate processing apparatus for processing a substrate is partially (for example, a substrate mounting stage) composed of a composite material 11 consisting of a matrix 12 comprising a ceramics member made of, for example, cordierite ceramics, aluminum nitride and/or a texture filled with an aluminum-based material (for example, aluminum or aluminum and silicon), and a ceramics layer (comprising, for example, $Al_2O_3$ and/or AlN) provided on the surface of the matrix 12.

20 Claims, 22 Drawing Sheets

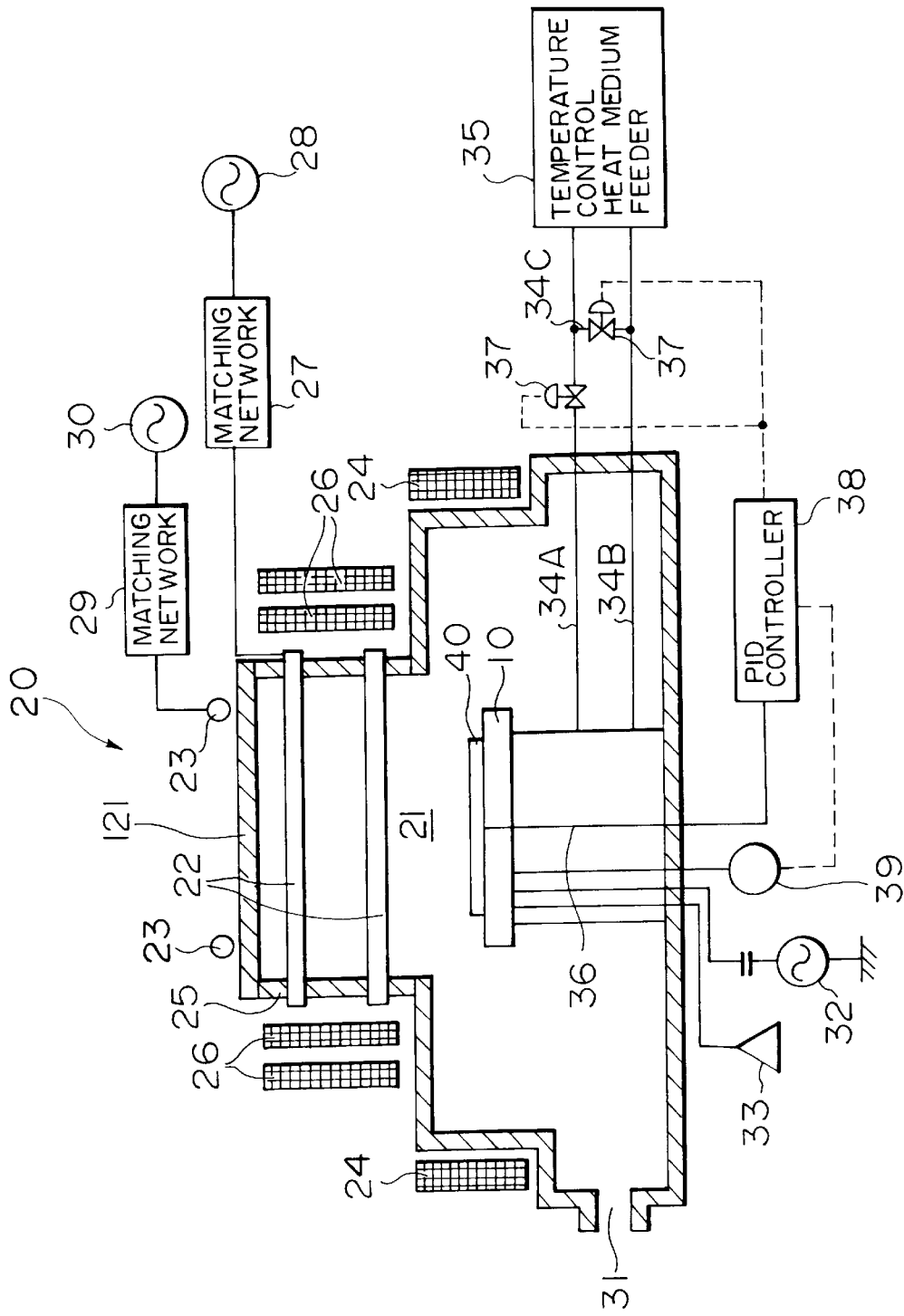

COMPOSITE MATERIAL AND MANUFACTURING METHOD THEREOF, SUBSTRATE PROCESSING APPARATUS AND MANUFACTURING METHOD THEREOF, SUBSTRATE MOUNTING STAGE AND MANUFACTURING METHOD THEREOF, AND SUBSTRATE PROCESSING METHOD

BACKGROUND OF THE INVENTION

1. Field of the Invention

The present invention relates to a composite material and a manufacturing method thereof, a substrate processing apparatus and a preparing method thereof, a substrate mounting stage and a preparing method thereof, and a substrate processing method.

2. Description of the Related Art

A recent ultra LSI is required to integrate more than million of elements in a chip of several square mm. The dry etching technique for achieving fine processing of an ultra LSI and the chemical vapor deposition (CVD) technique, one of the thin film forming techniques, are required to achieve a further higher accuracy, and there are proposed process resulting from contrivances in gas chemistry, plasma source and wafer temperature control.

For the manufacture of a semiconductor apparatus, there are available many processes of applying a plasma treatment to various semiconductor boards, wafers or various thin films formed thereon, including plasma etching and plasma CVD. These carious semiconductor boards, wafers and various thin films formed thereon may sometimes be collectively referred to as substrates. In these plasma treatment, particularly in plasma etching or the like, treatment while holding a substrate at a low temperature within a range of from room temperature to below 0° C. is increasingly being adopted with a view to achieving a high processing accuracy. Importance of temperature control and temperature administration of substrate is now therefore being recognized.

Along with the progress made in multi-layer wiring technology in the area of semiconductor apparatus, there is a demand for using copper (Cu) as a material for wiring for the purpose of reducing wiring resistance or improving resistance to electro-migration, and technical development efforts are made to appropriately dry-etch a wiring material composing copper. There is another demand for adopting high-density plasma CVD in gap filling technology. As a result, not only the processes for plasma treatment at room temperature or at a lower temperature, but also processes of applying a plasma treatment while holding a substrate at a high temperature are having an increasing importance.

In such a plasma treatment at a high temperature, however, there occurs a considerable heat input from the plasma into the substrate as a result of ionic impact to the substrate in etching, or irradiation of a high-density plasma onto the substrate in filling CVD. Consequently, the substrate temperature may be raised by 40° C. to 100° C. as compared with that before generation of plasma. In a process of heating the substrate by a substrate mounting stage (such as a wafer stage) holding the substrate, to apply a plasma treatment at a high temperature, therefore, it is technically important to inhibit the influence of heat input from plasma into the substrate and control the substrate at a set temperature at a high accuracy.

Control of side wall and ceiling plate is also important as one of the process control parameters in various substrate processing apparatuses such as an etching unit and a CVD unit. Control of upper opposite electrode in an etching unit is also important. Reaction products produced in etching or CVD tend to accumulate on side wall, ceiling plate and upper opposite electrode (these may sometimes be referred to as "side wall and the like") of these apparatuses. When the thus accumulating reaction products peel off from the side walls and the like of the apparatus, this may lead to a particle-level deterioration. Or, when a processor such as a polymer accumulates on the side wall and the like of an etching unit during etching of an oxide film, the side wall and the like serve as a scavenger of fluorocarbon polymer precursor, resulting in a variation in the ratio of carbon to fluorine in plasma, thus causing a problem of deterioration of etching property. It is therefore a common practice to adopt a technique for presenting accumulation by causing separation of the accumulating precursor through heating of the side wall and the like to a high temperature and irradiation onto the side wall and the like of the etching unit.

In the conventional art, temperature control of a substrate at high temperature is far from being sufficient. In the conventional art, occurrence of heating of the substrate to the aforesaid extent during processing is deemed to be natural, and temperature of the substrate mounting stage is previously set at a low temperature with heating of the substrate in view. Proceeding of the process in an anticipation of such heating results in many problems to be solved, including an extended period of processing time, a decrease in throughput, and deterioration of reproducibility and controllability of the process as a result of considerable variation of temperature.

A conceivable means for solving these problems is to mount an electrostatic chuck onto the substrate mounting stage to be heated to a high temperature. In order to mount an electrostatic chuck onto the substrate mounting stage, however, there is an important problem of how to connect the heated substrate mounting stage and a dielectric body composing the electrostatic chuck. This problem has prevented practical application of a substrate mounting stage having an electrostatic chuck mounted thereon. More specifically, in a substrate mounting stage based on high-temperature specifications, it is necessary to efficiently conduct heat to the substrate upon attracting the substrate and securing it onto the substrate mounting stage via the electrostatic shuck. The substrate mounting stage and the electrostatic chuck must therefore be connected with a good heat conductivity.

As a material for the substrate mounting stage in a substrate processing apparatus such as an etching unit, a CVD unit or a sputtering unit, it is common to adopt aluminum (Al) for a high heat conductivity and easy processing. Aluminum has a linear expansion coefficient of about $23 \times 10^{-6}$/K. In general a ceramics material is used as a dielectric body composing the electrostatic chuck. When directly connecting the substrate mounting stage and the electrostatic chuck, therefore a damage such as cracks is caused in the ceramics material by heating and cooling of the substrate mounting stage as a result of the difference in linear expansion coefficient between the ceramics material composing the electrostatic chuck and aluminum composing the substrate mounting stage, resulting in a problem of breakage of the electrostatic chuck.

It is therefore a usual practice to fix the electrostatic chuck to the substrate mounting stage by means of screw-fitting or the like. In this structure, however, evacuation of the substrate processing apparatus causes vacuum isolation of the connection interface between the electrostatic chuck and the substrate mounting stage, resulting in a degraded efficiency of heat exchange between the substrate mounting stage and the substrate via the electrostatic chuck. As a result, the substrate suffers heat from plasma, leading to heating of the substrate to a temperature over the set temperature.

The side wall and the like of the substrate processing apparatus are usually made of stainless steel or aluminum. It is therefore a common practice, during etching, to form an $Al_2O_3$ layer (alumite layer) on the surface of the side wall and the like made of aluminum with a view to preventing occurrence of metal contamination caused by the side wall and the like directly exposed to plasma or preventing corrosion of the side wall and the like by a halogen gas. When the side wall is made of stainless steel, and $Al_2O_3$ reflector is provided near the side wall in the interior of the substrate processing apparatus.

When the substrate processing apparatus is heated in this state, with side wall and the like made of aluminum, cracks tend to be caused in an $Al_2O_3$ layer formed on the surface of the side wall and the like, as a result of the difference in linear expansion coefficient between aluminum and $Al_2O_3$. When an $Al_2O_3$ reflector is arranged near the side wall in the interior of the substrate processing apparatus, it is difficult to sufficiently heat the reflector from outside the substrate processing apparatus. That is, it is difficult to heat the reflector to a temperature permitting allout separation of the precursor entering the reflector therefrom. It is possible only to heat the reflector to about 100° C. at the most.

The various problems involved in the manufacture of a semiconductor apparatus have been described above. In many sectors of industry, there is an increasing demand for development of a technology capable of solving these problems, i.e., proving a composite material which permits effective avoidance of occurrence of damages to a ceramics material caused by the difference in linear expansion coefficient between different materials in a composite material comprising a metallic material having a ceramics material formed thereon, or metal contamination or corrosion in environments of use of a composite material.

SUMMARY OF THE INVENTION

An object the present invention is therefore to provide composite material and a manufacturing method thereof, a substrate processing apparatus using such a composite material and manufacturing method thereof, a substrate mounting stage and a manufacturing method thereof, and a substrate processing method using such a substrate processing apparatus, which permit avoidance of occurrence of a damage caused by the difference in thermal expansion between materials, sufficient withstanding of the use at high temperatures, prevention of occurrence of metal contamination, provide a high corrosion resistance, and enable, for example, high-temperature processing of a substrate.

The composite material of the invention to achieve the foregoing object comprises a matrix comprising a ceramics member having a texture filled with an aluminum-based material, and a ceramics layer provided on the surface of the matrix.

The composite material of the invention to achieve the foregoing object composes a part of a processing apparatus for processing a substrate, and comprises a matrix comprising a ceramics member having a texture filled with an aluminum-based material, and a ceramics layer provided on the surface of the matrix. In this substrate processing apparatus, for example, plasma etching, plasma CVD or sputtering is applied to the substrate. A part of the substrate processing apparatus made of a composite material may take the form of a substrate mounting stage having an electrostatic chucking function and provided with temperature control means. Or, in the substrate processing apparatus, for example, plasma etching or plasma CVD is applied to the substrate. A part of the substrate processing apparatus made of a composite material may take the form of side walls and/or a ceiling plate of the substrate processing apparatus. Further, in the substrate processing apparatus, for example, plasma etching is applied to the substrate, and apart of the substrate processing apparatus made of a composite material may take the form of parallel and flat upper opposed electrodes.

The substrate processing apparatus for processing the substrate of the invention to achieve the foregoing object comprises a composite material comprises a matrix consisting of a ceramics member having a texture filled with an aluminum-based material, and a ceramics layer provided on the surface of the matrix.

In the substrate processing apparatus of the invention, for example, plasma etching, plasma CVD or sputtering is applied to the substrate, and a part of the substrate processing apparatus made of a composite material may take the form of a substrate mounting stage having an electrostatic chucking function and provided with temperature control means. This substrate processing apparatus may sometimes be hereinafter referred to as the substrate processing apparatus of the first embodiment of the invention. In this case, the substrate mounting stage may be used as an electrode, in which case, the ceramics layer displays the electrostatic chucking function.

In the substrate processing apparatus of the embodiment 1 of the invention, temperature control means should preferably be provided in the substrate mounting stage for accurate and rapid temperature control of the substrate mounting stage, and further, this temperature control means should preferably be composed of a heater, and the heater may be arranged outside the composite material, or may be provided in the interior of the matrix. In the latter case, when assuming the matrix to have a linear expansion coefficient $\alpha_1$[unit: $10^{-6}$/K], the material composing the heater should preferably have a linear expansion coefficient $\alpha_H$[unit: $10^{-6}$/K] satisfying $(\alpha_1-3) \leq \alpha_H \leq (\alpha_1+3)$. The term the material composing the heater means the material composing a part (for example, a sheath) of the heater in contact with the heater. This applies also in the description hereafter. Further, the temperature control means should preferably be composed of a piping for the flow of a temperature controlling heat medium, provided in the interior of the matrix. In this case, when assuming the matrix to have a linear expansion coefficient $\alpha_1$[unit: $10^{-6}$/K], the piping should preferably have a linear expansion coefficient $\alpha_P$[unit: $10^{-6}$/K] satisfying $(\alpha_1-3) \leq \alpha_H \leq (\alpha_1+3)$. As a result of the linear expansion coefficient $\alpha_1$ of the matrix and the linear expansion coefficients $\alpha_H$ and $\alpha_P$ satisfying these relations as described above, it is possible to effectively present occurrence of a damage to the ceramics layer. When assuming an object to have a length L, a length at 0° C. of $L_0$ and $\theta$ is temperature, in general, the linear expansion coefficient $\alpha$ can be expressed by $\alpha=(dL/d\theta)/L_0$, in units of $K^{-1}(1/K)$. In this specification, the linear expansion coefficient is expressed in unit of $10^{-6}$/K. Hereafter, the linear expansion coefficient may sometimes be explained by omitting the unit.

Or, in the substrate processing apparatus of the invention, for example, plasma etching or plasma CVD is applied to the substrate, and a part of the substrate processing apparatus made of the composite material may take the form of side wall and/or a ceiling plate of the substrate processing apparatus. Such a substrate processing apparatus may hereafter be referred to as the substrate processing apparatus of the second embodiment of the invention. In this case, temperature control means should preferably be provided for the side walls and/or the ceiling plate of the substrate processing apparatus, and further, this temperature control means should preferably comprises a heater. As a result, for example, it is possible to heat the side walls and/or the ceiling plate to a temperature enabling a precursor entering the surface of the side walls and/or the ceiling plate of the processing apparatus to leave the side walls and/or the ceiling plate of the substrate processing apparatus. The heater may be arranged outside the composite material, or may be provided in the interior of the matrix. In the latter case when assuming the matrix to have a linear expansion coefficient $\alpha_1$[unit: $10^{-6}$/K], the material composing the heater should preferably have a linear expansion coefficient $\alpha_H$[unit: $10^{-6}$/K] satisfying $(\alpha_1-3) \leq \alpha_H \leq (\alpha_1+3)$. As a result of the linear expansion coefficient $\alpha_1$ of the matrix and the linear expansion coefficient $\alpha_H$ of the material composing the heater satisfying these relations, it is possible to effectively prevent occurrence of a damage to the ceramics layer.

Or, in the substrate processing apparatus of the invention, for example, plasma etching is applied to the substrate, and apart of the substrate processing apparatus made of the composite material may take the form of a parallel flat upper opposite electrode provided in the substrate processing apparatus. Such a substrate processing apparatus may sometimes be referred to hereafter as the substrate processing apparatus of the embodiment 3 of the invention. In this case, temperature control means should preferably be provided for the upper opposite electrode, and further, this temperature control means should preferably comprise a heater. As a result, it is possible to heat the upper opposite electrode to a temperature enabling the precursor entering the surface of the upper opposite electrode to leave the upper opposed electrodes. The heater may be arranged outside the composite material, or in the interior of the matrix. In the latter case, when assuming the matrix to have a linear expansion coefficient $\alpha_1$[unit: $10^{-6}$/K], the material composing the heater should preferably have a linear expansion coefficient $\alpha_H$[unit: $10^{-6}$/K] satisfying $(\alpha_1-3) \leq \alpha_H \leq (\alpha_1+3)$. As a result of the linear expansion coefficient $\alpha_1$ of the matrix and the linear expansion coefficient $\alpha_H$ of the material composing the heater satisfying the foregoing relation, it is possible to effectively prevent occurrence of a damage to the ceramics layer.

When applying plasma etching to the substrate in the substrate processing apparatus, it is possible to adopt the combination of the substrate processing apparatus of the embodiment 1 and the substrate processing apparatus of the embodiment 2, the combination of the substrate processing apparatus of the embodiment 1 and the substrate processing apparatus of the embodiment 3, the combination of the substrate processing apparatus of the embodiment 2 and the substrate processing apparatus of the embodiment 3, or the combination of the substrate processing apparatus of the embodiment 1, the substrate processing apparatus of the embodiment 2 and the substrate processing apparatus of the embodiment 3. When applying plasma CVD to the substrate in the substrate processing apparatus, it is possible to use the combination of the substrate processing apparatus of the embodiment 1 and the substrate processing apparatus of the embodiment 2.

The substrate mounting stage having an electrostatic chucking function and provided with temperature control means of the invention to achieve the foregoing object comprises a composite material consisting of a matrix comprising a ceramics member having a texture filled with an aluminum-based material and a ceramics layer provided on the surface of the matrix.

In the substrate mounting stage of the invention, the substrate mounting stage can be used as an electrode, and in this case, the ceramics layer displays an electrostatic chucking function. Temperature control means should preferably be provided for the purpose of accurately and rapidly carrying out temperature control, and further, this temperature control means should preferably comprise a heater. The heater may be arranged outside the composite material, or in the interior of the matrix. In the latter case, when assuming the matrix to have a linear expansion coefficient $\alpha_1$[unit: $10^{-6}$/K], the material composing the heater should preferably have a linear expansion coefficient $\alpha_H$[unit: $10^{-6}$/K] satisfying $(\alpha_1-3) \leq \alpha_H \leq (\alpha_1+3)$. Further, it should preferably comprise a piping for the flow of a temperature controlling heat medium provided in the interior of the matrix. When assuming the matrix to have a linear expansion coefficient $\alpha_1$[unit: $10^{-6}$/K], the piping should preferably have a linear expansion coefficient $\alpha_P$[unit: $10^{-6}$/K] satisfying $(\alpha_1-3) \leq \alpha_P \leq (\alpha_1+3)$.

In the composite material, the substrate processing apparatus or the substrate mounting stage of the invention, when assuming the matrix to have a linear expansion coefficient $\alpha_1$[unit: $10^{-6}$/K], the ceramics layer should preferably have a linear expansion coefficient $\alpha_2$[unit: $10^{-6}$/K] satisfying $(\alpha_1-3) \leq \alpha_2 \leq (\alpha_1+3)$. As a result of $\alpha_1$ and $\alpha_2$ satisfying this relationship, it is possible to certainly prevent occurrence of damages such as cracks in the ceramics layer caused by the difference between the linear expansion coefficient $\alpha_1$ of the matrix and the linear expansion coefficient $\alpha_2$ of the ceramics layer.

In this case, the ceramics member composing the matrix may comprise cordierite ceramics; the aluminum-based material composing the matrix may comprise aluminum (Al) and silicon (Si); and the material composing the ceramics layer may comprise $Al_2O_3$. To adjust the linear expansion coefficient and electrical properties of the ceramics layer, for example, $TiO_2$ may be added to the material composing the ceramics layer. It is desirable to select a volumetric ratio of cordierite ceramics to the aluminum-based material so as to satisfy $(\alpha_1-3) \leq \alpha_2 \leq (\alpha_1+3)$. Or, the volumetric ratio of cordierite ceramics to the aluminum-based material should be within a range of from 25/75 to 75/25, or more preferably, from 25/75 to 50/50. By adopting a volumetric ratio within this range, not only the linear expansion coefficient of the matrix can be controlled, but also, the matrix has an electric conductivity and a heat conductivity closer to those of a metal rather than those of a pure ceramics. As a result, it is possible to apply voltage as well as bias to such a matrix. Further, when using the aluminum-based material as reference, the aluminum-based material should contain silicon in an amount within a range of from 12 to 35 vol. %, or preferably, from 16 to 35 vol. %, or more preferably, from 20 to 35 vol. % with a view to satisfying $(\alpha_1-3) \leq \alpha_2 \leq (\alpha_1+3)$. Actually, the texture of the ceramics member in filled with aluminum (Al) and silicon (Si), and silicon (Si) is not contained in aluminum (Al). However, to express the volumetric ratio of silicon (Si) to aluminum (Al) in the aluminum-based material, an expression "silicon is contained in the aluminum-based material" is used, and this applies also hereafter.

The ceramics member may be a fired form (sinter) of cordierite ceramics powder. However, the ceramics member should preferably be a fired (sintered) mixture of cordierite ceramics powder and cordierite ceramics filer with view to obtaining a porous ceramics member, and preventing occurrence of a damage to the ceramics member upon preparing the matrix. In the latter case, the ratio of cordierite ceramics filer in the fired mixture should be within a range of from 1 to 20 vol. %, or preferably, from 1 to 10 vol. %, or more preferably, from 1 to 5 vol. %. The average particle size of cordierite ceramics powder should be within a range of from 1 to 100 $\mu$m, or preferably, from 5 to 50 $\mu$m, or more preferably, from 5 to 10 $\mu$m. Cordierite ceramics fiber should have an average diameter within a range of from 2 to 10 $\mu$m, or preferably, form 3 to 5 $\mu$m, and an average length within a range of from 0.1 to 10 mm, or preferably, from 1 to 2 mm. Further, the porosity of the ceramics member should be within a range of from 25 to 75%, or preferably, from 50 to 75%.

Or, the ceramics member composing the matrix may comprise aluminum nitride (AlN); the aluminum-based material composing the matrix may comprise aluminum (Al) or aluminum (Al) and silicon (Si); and the material composing the ceramics layer may comprise $Al_2O_3$ or aluminum nitride (AlN). To adjust the linear expansion coefficient and electrical properties of the ceramics layer, for example, $TiO_2$ may be added to the material composing the ceramics layer. It is desirable to select a volumetric ratio of aluminum nitride to the aluminum-based material so as to satisfy $(\alpha_1-3) \leq \alpha_2 \leq (\alpha_1+3)$. Or, the volumetric ratio of aluminum nitride to the aluminum-based material should be within a range of from 40/60 to 80/20, or more preferably, from 60/40 to 70/30. By adopting a volumetric ratio within this range, not only the linear expansion coefficient of the matrix can be controlled, but also, the matrix has an electric conductivity and a heat conductivity closer to of a metal rather than those of a pure ceramics. As a result, it is possible to apply voltage as well as bias to such a matrix. When the aluminum-based material composing the matrix comprises aluminum and silicon, the aluminum-based material should contain silicon in an amount within a range of from 12 to 35 vol. %, or preferably, from 16 to 35 vol. %, or more preferably, from 20 to 35 vol. % with a view to satisfying $(\alpha_1-3) \leq \alpha_2 \leq (\alpha_1+3)$.

Or, the ceramics member composing the matrix may comprise silicon carbide (SiC); the aluminum-based material composing the matrix may comprise aluminum (Al) or aluminum (Al) and silicon (Si); and the material composing the ceramics layer may comprise $Al_2O_3$ or aluminum nitride (AlN). To adjust the linear expansion coefficient and electrical properties of the ceramics layer, for example, $TiO_2$ may be added to the material composing the ceramics layer. In this case, it is desirable to select a volumetric ratio of silicon carbide to the aluminum-based material so as to satisfy $(\alpha_1-3) \leq \alpha_2 \leq (\alpha_1+3)$. Or, the volumetric ratio of silicon carbide to the aluminum-based material should be within a range of from 40/60 to 80/20, or more preferably, from 60/40 to 70/30. By adopting a volumetric ratio within this range, not only the linear expansion coefficient of the matrix can be controlled, but also, the matrix has an electric conductivity and a heat conductivity closer to those of a metal rather than those of a pure ceramics. As a result, it is possible to apply voltage as well as bias to such a matrix. When the aluminum-based material composing the matrix comprises aluminum and silicon, the aluminum-based material should contain silicon in an amount within a range of from 12 to 35 vol. %, or preferably, from 16 to 35 vol. %, or more preferably, from 20 to 35 vol. % with a view to satisfying $(\alpha_1-3) \leq \alpha_2 \leq (\alpha_1+3)$.

In the composite material, the substrate processing apparatus, or the substrate mounting stage of the invention, the ceramics layer should preferably be formed on the surface of the matrix by the flame spraying method, or attached to the surface of the matrix by brazing.

A method for manufacturing the composite material of the invention for achieving the foregoing object comprises:
(A) a step of filling the texture of the ceramics member with an aluminum-based material, thereby preparing a matrix composing the ceramics member having the texture filled with the aluminum-based material; and
(B) a step of providing a ceramics layer on the surface of the matrix.

Or, a method for manufacturing the composite material of the invention for achieving the foregoing object, which is a method for manufacturing a composite material composing a part of a processing apparatus for processing the substrate, comprising:
(A) a step of filling the texture of the ceramics member with an aluminum-based material, thereby preparing a matrix comprising the ceramics member having the texture filled with the aluminum-based material; and
(B) a step of providing a ceramics layer on the surface of the matrix.

In the substrate processing apparatus, for example, plasma etching, plasma CVD or sputtering is applied to the substrate. A part of the substrate processing apparatus made of the composite material may take the form of a substrate mounting stage having an electrostatic chucking function and provided with temperature control means in an embodiment. Or, in the substrate processing apparatus, for example, plasma etching or plasma CVD is applied to the substrate, and a part of the substrate processing apparatus made of the composite material may take the form of side walls and/or a ceiling plate of the substrate processing apparatus in another embodiment. Further, in the substrate processing apparatus, for example, plasma etching is applied to the substrate, and a part of the substrate processing apparatus made of the composite material may take the form of parallel and flat upper opposed electrodes in a further embodiment.

A method for manufacturing the substrate processing apparatus for achieving the foregoing object, which is the method for preparing the substrate processing apparatus for processing a substrate, wherein:
a part of the substrate processing apparatus is composed of a composite material consisting of a matrix comprising a ceramics member having a texture filled with an aluminum-based material and a ceramics layer provided on the surface of the matrix.
which comprises preparing the composite material by:
(A) a step of filling the texture of the ceramics member with an aluminum-based material, thereby preparing a matrix comprising the ceramics member having the texture filled with the aluminum-based material; and
(B) a step of providing a ceramics layer on the surface of the matrix.

In the substrate processing apparatus in the method for manufacturing the substrate processing apparatus of the invention, for example, plasma etching, plasma CVD or sputtering is applied to the substrate, and a part of the substrate processing apparatus made of the composite material may take the form of a substrate mounting stage having an electrostatic chucking function and provided with temperature control means in an embodiment. This method for manufacturing the substrate processing apparatus may sometimes be referred to hereafter as the manufacturing method of the substrate processing apparatus of the embodiment 1 of the invention. In this case, the substrate mounting stage may be used as an electrode, and the ceramics layer displays the electrostatic chucking function.

In the manufacturing method of the substrate processing apparatus of the embodiment 1 of the invention, it is desirable to arrange temperature control means on the substrate mounting stage, and further, this temperature control means should preferably comprise a heater. The heater may be arranged outside the composite material, or in the interior of the matrix. In the latter case, when assuming the matrix to have a linear expansion coefficient $\alpha_1$[unit: $10^{-6}$], the material composing the heater should preferably have a linear expansion coefficient $\alpha_H$[unit: $10^{-6}$] satisfying $(\alpha_1-3) \leq \alpha_H \leq (\alpha_1+3)$. Further, the temperature control means should preferably comprise a piping for the flow of a temperature controlling heat medium arranged in the interior of the matrix. In this case, when assuming the matrix to have a linear expansion coefficient $\alpha_1$[unit: $10^{-6}$], the piping should preferably have a linear expansion coefficient $\alpha_P$[unit: $10^{-6}$] satisfying $(\alpha_1-3) \leq \alpha_P \leq (\alpha_1+3)$.

Or, in the manufacturing method of the substrate processing apparatus of the invention, for example, plasma etching or plasma CVD is applied to the substrate, and a part of the substrate processing apparatus composed of the composite material may take the form of a side wall and/or a ceiling plate of the substrate processing apparatus method of the substrate processing apparatus may sometimes be hereafter referred to as the manufacturing method of the substrate processing apparatus of the embodiment 2 of the invention. In this case, temperature control means should preferably be provided on the side wall and/or the ceiling plate of the substrate processing apparatus, and further, the temperature control means should preferably comprise a heater. The heater may be arranged outside the composite material or in the interior of the matrix. In the latter case, when assuming the matrix to have a linear expansion coefficient $\alpha_1$[unit: $10^{-6}$/K], the material composing the heater should preferably have a linear expansion coefficient $\alpha_H$[unit: $10^{-6}$/K] satisfying $(\alpha_1-3) \leq \alpha_H \leq (\alpha_1+3)$.

Or, in the substrate processing apparatus in the manufacturing method of the substrate processing apparatus of the invention, for example, plasma etching is applied to the substrate, and a part of the substrate processing apparatus made of the composite material may take the form of a parallel flat upper opposite electrode arranged in the substrate processing apparatus. This manufacturing method of the substrate processing apparatus may sometimes hereafter be referred to as the manufacturing method of the substrate processing apparatus of the embodiment 3 of the invention. In this case, temperature control means should preferably be provided for the upper opposite electrode, and further, the temperature control means should preferably comprise a heater. The heater may be arranged outside the composite material or in the interior of the matrix. In the latter case, when assuming the matrix to have a linear expansion coefficient $\alpha_1$[unit: $10^{-6}$/K], the material composing the heater should preferably have a linear expansion coefficient $\alpha_H$[unit: $10^{-6}$/K] satisfying $(\alpha_1-3) \leq \alpha_H \leq (\alpha_1+3)$.

In the substrate processing apparatus, plasma etching may be applied to the substrate by the combination of the manufacturing method of the substrate processing apparatus of the embodiment 1 and the manufacturing method of the substrate processing apparatus of the embodiment 2, the combination of the manufacturing method of the substrate processing apparatus of the embodiment 1 and the manufacturing method of the substrate processing apparatus of the embodiment 3, the combination of the manufacturing method of the substrate processing apparatus of the embodiment 2 and the manufacturing method of the substrate processing apparatus of the embodiment 3, or the combination of the manufacturing method of the substrate processing apparatus of the embodiment 1, the manufacturing method of the substrate processing apparatus of the embodiment 2 and the manufacturing method of the substrate processing apparatus of the embodiment 3. In the substrate processing apparatus, when applying plasma CVD to the substrate, this may be achieved by the combination of the manufacturing method of the substrate processing apparatus of the embodiment 1 and the manufacturing method of the substrate processing apparatus of the embodiment 2.

A manufacturing method of the substrate mounting stage of the invention for achieving the foregoing object, which is a manufacturing method of the substrate mounting stage having an electrostatic chucking function and provided with temperature control means, wherein:

the substrate mounting stage is made of a composite material consisting of a matrix comprising a ceramics member having a texture filled with an aluminum-based material and a ceramics layer provided on the surface of the matrix, which comprises preparing the composite material by:

(A) a step of filling the texture of the ceramics member with an aluminum-based material, thereby preparing a matrix comprising the ceramics member having the texture filled with the aluminum-base material; and (B) a step of providing a ceramics layer on the surface of the matrix.

In the manufacturing method of the substrate mounting stage of the invention, the substrate mounting stage is used as an electrode, and the ceramics layer displays an electrostatic chucking function. Temperature control means should preferably be provided. Further, the temperature control means should preferably comprise a heater. The heater may be arranged outside the composite material, or in the interior of the matrix. In the latter case, when assuming the matrix to have a linear expansion coefficient $\alpha_1$[unit: $10^{-6}$/K], the material composing the heater should preferably have a linear expansion coefficient $\alpha_H$[unit: $10^{-6}$/K] satisfying $(\alpha_1-3) \leq \alpha_H \leq (\alpha_1+3)$. Further, the temperature control means should preferably have a piping for the flow of a temperature controlling heat medium, provided in the interior of the matrix. In this case, when assuming the matrix to have a linear expansion coefficient $\alpha_1$[unit: $10^{-6}$/K], the piping should preferably have a linear expansion coefficient $\alpha_P$[unit: $10^{-6}$/K] satisfying $(\alpha_1-3) \leq \alpha_P \leq (\alpha_1+3)$.

In the manufacturing method of the composite material, the manufacturing method of the substrate processing apparatus, and the manufacturing method of the substrate mounting stage of the invention, when assuming the matrix to have a linear expansion coefficient $\alpha_1$[unit: $10^{-6}$/K], the ceramics layer should preferably have a linear expansion coefficient $\alpha_2$[unit: $10^{-6}$/K] satisfying $(\alpha_1-3) \leq \alpha_2 \leq (\alpha_1+3)$. As a result of $\alpha_1$ and $\alpha_2$ satisfying this relationship, it is possible to ensure prevention of damages to the ceramics layer such as cracks caused by the difference between the linear expansion coefficient $\alpha_1$ of the matrix and the linear expansion coefficient $\alpha_2$ of the ceramics layer.

In the manufacturing method of the composite material, the manufacturing method of the substrate processing apparatus, and the manufacturing method of the substrate mounting apparatus, the process (A) should preferably comprise the steps of placing a ceramics member comprising a porous cordierite ceramics in a vessel, casting an aluminum-based material comprising molten aluminum and silicon into the vessel, and filling the ceramics member with the aluminum-based material by the high-pressure coating method. In this case, the ceramics member is available by forming cordierite ceramics by, for example, the die press forming method, the hydrostatic forming method (also known as the CIP method or the rubber press forming method), the casting forming method (also known as the ship casting method), or the sludge casting method, and then, firing the formed product.

In this case, when assuming the matrix to have a linear expansion coefficient $\alpha_1$[unit: $10^{-6}$/K], it is desirable to select a volumetric ratio of cordierite ceramics to the aluminum-based material so that the ceramics layer has a linear expansion coefficient $\alpha_2$[unit: $10^{-6}$/K] satisfying $(\alpha_1-3) \leq \alpha_2 \leq (\alpha_1+3)$. Or, the volumetric ratio of cordierite ceramics to the aluminum-based material should be within a range of from 25/75 to 75/25, or preferably, form 25/75 to 50/50. With the aluminum-based material as a reference, the aluminum-based material should preferably contain silicon in an amount within a range of from 12 to 35 vol. %, or preferably, from 16 to 35 vol. %, or more preferably, from 20 to 35 vol. % with a view to satisfying $(\alpha_1-3) \leq \alpha_2 \leq (\alpha_1+3)$.

While a ceramics member can be prepared by forming cordierite ceramics powder and then firing the formed product, manufacture by firing a mixture of cordierite ceramics powder and cordierite ceramics fiber is preferable with a view to obtaining a porous ceramics member and preventing occurrence of damages to the ceramics member upon manufacture of the matrix. In the latter case, the ratio of cordierite ceramics fiber in the fired mixture should be within a range of from 1 to 20 vol. %, or preferably, from 1 to 10 vol. %, or more preferably, from 1 to 5 vol. %. The cordierite ceramics powder should have an average particle size within a range of from 100 $\mu$m, or preferably, from 5 to 50 $\mu$m, or more preferably, from 5 to 10 $\mu$m. The cordierite ceramics fiber should have an average diameter within a range of from 2 to 10 $\mu$m, or preferably, from 3 to 5 $\mu$m, and an average length within a range of from 0.1 to 10 mm, or preferably, from 1 to 2 mm. Further, the mixture of cordierite ceramics powder and cordierite ceramics fiber should be fired at a temperature within a range of from 800 to 1,200° C., or preferably, from 800 to 1,100° C. The ceramics member should have a porosity within range of from 25 to 75%, or preferably, from 50 to 75%.

Upon casting the molten aluminum-based material into the vessel, the ceramics member should have a temperature within a range of from 500 to 1,000° C., or preferably, from 700 to 800° C. Also upon casting the molten aluminum-based material into the vessel, the aluminum-based material should have a temperature within a range of from 700 to 1,000° C., or preferably, from 750 to 900° C. Upon filling the ceramics member with the aluminum-based material by the high-pressure casting method, the applied absolute pressure should be within a range of from 200 to 1,500 Kgf/cm², or preferably, from 800 to 1,000 Kgf/cm².

Or, the process (A) should preferably comprise the step of causing the aluminum-based material comprising molten aluminum or aluminum and silicon penetrate into a member formed from aluminum nitride particles in accordance with the non-pressurized metal penetrating method. The ceramics member is available by forming by the die press forming method, the hydrostatic forming method, the casting forming method, or the sludge casting forming method, and then firing the formed product at a temperature within a range of from 500 to 1,000° C., or preferably, from 800 to 1,000° C.

In this case, when assuming the matrix to have a linear expansion coefficient $\alpha_1$[unit: $10^{-6}$/K], a volumetric ratio of aluminum nitride particles to the aluminum-based material should preferably be selected so that the ceramics layer has a linear expansion coefficient $\alpha_2$[unit: $10^{-6}$/K] satisfying $(\alpha_1-3) \leq \alpha_2 \leq (\alpha_1+3)$. Or, the volumetric ratio of aluminum nitride particles to the aluminum-based material should be within a range of from 40/60 to 80/20, or preferably, from 60/40 to 70/30. The aluminum nitride particles should have an average particle size within a range of from 10 to 100 $\mu$m, or preferably, from 10 to 50 $\mu$m, or more preferably, from 10 to 20 $\mu$m. When the aluminum-based material composing the matrix comprises aluminum and silicon, the aluminum-based material should contain silicon in an amount within a range of from 12 to 35 vol. %, or preferably, from 16 to 35 vol. %, or more preferably, from 20 to 35 vol. %, with a view to satisfying $(\alpha_1-3) \leq \alpha_2 \leq (\alpha_1+3)$.

Or, the process (A) should preferably comprise the step of causing the aluminum-based material comprising molten aluminum or aluminum and silicon in a non-pressurized state to penetrate into the ceramics member formed from silicon carbide particles in accordance with the non-pressurized metal penetrating method. Or, the process (A) should preferably comprise the steps of arranging a ceramics member comprising silicon carbide in a vessel, casting an aluminum-based material comprising molten aluminum or aluminum and silicon into the vessel, and filling the ceramics member with the aluminum-based material by the high-pressure casting method. In this case, upon casting the molten aluminum-based material into the vessel, the ceramics member should have a temperature within a range of from 500 to 1,000° C., and upon filling the ceramics member with the aluminum-based material, the applied absolute pressure should preferably be within a range of from 200 to 1,500 Kgf/cm². The ceramics member is available by forming by the die press forming method the hydrostatic forming method, the casting forming method, or the sludge casting forming method, and then firing the formed product at a temperature within a range of from 500 to 1,000° C., or preferably, from 800 to 1,000° C. In this case, when assuming the matrix to have a linear expansion coefficient $\alpha_1$[unit: $10^{-6}$/K], a volumetric ratio of silicon carbide particles to the aluminum-based material should preferably be selected so that the ceramics layer has a linear expansion coefficient $\alpha_2$[unit: $10^{-6}$/K] satisfying $(\alpha_1-3) \leq \alpha_2 \leq (\alpha_1+3)$. Or, the volumetric ratio of silicon carbide particles to the aluminum-based material should be within a range of from 40/60 to 80/20, or preferably, from 60/40 to 70/30. The silicon carbide particles should have an average particle size within a range of from 1 to 100 FM, or preferably, from 10 to 80 $\mu$m, or more preferably, from 15 to 60 $\mu$m. When the aluminum-based material composing the matrix comprises aluminum and silicon, the aluminum-based material should contain silicon in an amount within a range of from 12 to 35 vol. %, or preferably, from 16 to 35 vol. %, or more preferably, from 20 to 35 vol. %, with a view to satisfying $(\alpha_1-3) \leq \alpha_2 \leq (\alpha_1+3)$.

In the manufacturing method of the composite material, the manufacturing method of the substrate processing apparatus, and the manufacturing method of the substrate mounting stage of the invention, the material composing the ceramics layer may comprise $Al_2O_3$ or aluminum nitride (AlN). $TiO_2$ may be added to the material composing the ceramics layer to adjust linear expansion coefficient and electrical properties of the ceramics layer. The process (B) should preferably comprise the step of forming the ceramics layer on the surface of the matrix by the flame spraying method. Or, the process (B) should preferably comprise the step of attaching the ceramics layer to the surface of the matrix by brazing.

In the method for processing a substrate of the embodiment 1 of the invention for achieving the foregoing object, which is method for processing the substrate by the use of the substrate processing apparatus for processing the substrate, the substrate processing apparatus has a substrate mounting stage. The substrate mounting stage is manufactured from a composite material consisting of a matrix comprising a ceramics member having a texture filled with an aluminum-based material, and a ceramics layer provided on the surface of the matrix. The substrate mounting stage has an electrostatic chucking function and is provided with temperature control means. It is characterized in that it fixes the substrate on the substrate mounting stage by means of the electrostatic chucking function, and processes the substrate in a state in which temperature of the substrate mounting stage is controlled by the temperature control means. This substrate processing method may sometimes be hereafter referred to as the substrate processing method of the embodiment 1 of the invention. In this case, the substrate may be processed by plasma etching, plasma CVD or sputtering. Sputtering may include soft etching of the substrate. Temperature of the substrate mounting stage upon processing the substrate should be controlled within a range of from room temperature to 650° C., or preferably, from 100 to 400° C., or more preferably, from 100 to 300° C. for plasma etching; from room temperature to 650° C., or preferably, from 100 to 500° C., or more preferably, from 200 to 500° C. for plasma CVD; and from room temperature to 650° C., or preferably, from 200 to 600° C., or more preferably, from 300 to 500° C. for sputtering. Temperature control means should preferably be arranged on the substrate mounting stage, and the temperature control means should preferably comprise a heater. The heater may be arranged outside the composite material of in the interior of the matrix. The temperature control means should preferably comprise a piping for the flow of a temperature controlling heat medium. More specifically, the aforesaid substrate processing apparatus of the embodiment 1 of the invention may be employed as such a substrate processing apparatus.

Or, a substrate processing method of the embodiment 2 of the invention for achieving object is a substrate processing method using the substrate processing apparatus for processing a substrate in which a side wall and/or a ceiling plate are manufactured from a composite material consisting of a matrix comprising ceramics member having a texture filled with an aluminum-based material, and a ceramics layer provided on the surface of the matrix, and comprises the steps of housing the substrate in the substrate processing apparatus, and applying plasma etching or plasma CVD to the substrate. This substrate processing method may sometimes be referred to hereafter as the substrate processing method of the embodiment 2 of the invention. More specifically, it suffices to use the substrate processing apparatus of the foregoing embodiment 2 of the invention as the substrate processing apparatus. Upon applying plasma etching or plasma CVD to the substrate, temperature of the side wall and/or the ceiling plate should be controlled within a range of from room temperature to 650° C., or preferably, from 100 to 400° C., or more preferably, from 100 to 300° C. for plasma etching; and from room temperature to 650° C., or preferably, from 100 to 500° C., or more preferably, from 200 to 500° C. for plasma CVD. Temperature control means should preferably be provided for the side wall and/or the ceiling plate, and the temperature control means should preferably comprise a heater. Further, the heater may be arranged outside the composite material, but should preferably be arranged in the interior of the matrix.

Further, a substrate processing method of the embodiment 3 of the invention for achieving the foregoing object is a substrate processing method using the substrate processing apparatus for processing a substrate, in which the substrate processing apparatus is provided with a substrate mounting stage serving as a lower electrode and an upper opposite electrode; the upper opposite electrode is made of a composite material consisting of a matrix comprising a ceramics member having a texture filled with an aluminum-base material, and a ceramics layer provided on the surface of the matrix; and comprises the step of applying plasma etching to the substrate in a state in which the substrate is mounted on the substrate mounting stage. This substrate processing method may sometimes be referred to hereafter as the substrate processing method of the embodiment 3 of the invention. More specifically, it suffices to use the substrate processing apparatus of the foregoing embodiment 3 of the invention as the substrate processing apparatus. Upon applying plasma etching to the substrate, temperature of the upper opposite electrode should be controlled within a range of from room temperature to 400° C., or preferably, from 50 to 400° C., ore more preferably, from 200 to 350° C. Temperature control means should preferably be provided for the upper opposed electrode; and the temperature control means should comprise a heater. Further, which the heater may be arranged outside the composite material, it should preferably be arranged in the interior of the matrix.

Plasma etching may be applied via the combination of the substrate processing method of the embodiment 1 and the substrate processing method of the embodiment 2, the combination of the substrate processing method of the embodiment 1 and the substrate processing method of the embodiment 3, the combination of the substrate processing method of the embodiment 2 and the substrate processing method of the embodiment 3, or the combination of the substrate processing method of the embodiment 1, the substrate processing method of the embodiment 2, and the substrate processing method of the embodiment 3. When applying plasma CVD to the substrate, the combination of the substrate processing method of the embodiment 1 and the substrate processing method of the embodiment 2 may be employed.

Substrate applicable in the invention include a silicon semiconductor substrate, a compound semiconductor or semi-insulating substrate such as a GaAs substrate, a semiconductor substrate having an SOI structure an insulating substrate, various insulating layer of insulating films formed on a semiconductor substrate or a semi-insulating substrate or an insulating film, a conductive thin film, a metal thin film, a metal compound thin film, and laminations thereof. Applicable insulating layers and insulating films include known materials such as $SiO_2$, BPSG, PSG, BSG, AsSG, PbSG, NSG, SOG, LTO (Low Temperature Oxide: low-temperature CVD-$SiO_2$), SiN and SiON, and laminations thereof. Applicable conductive thin films include polycrystalline silicon doped with impurities. Applicable metal thin films and metal compound thin films include Cu, Ti, TiN, BST (barium-strontium-titanium-oxide), STO (strontium-titanium oxide), SBT (strontium-barium-tantalum oxide), Pt, Al, aluminum alloys containing, for example, copper or silicon, high-melting-point metals such as tungsten, and various silicides. Further, materials in areas other than the semiconductor device manufacturing sector such as a copper film or a copper lamination formed on a plastic film such as a polyimide film is also applicable in the present invention.

In the present invention, the matrix is provided with properties coming between a ceramics member and an aluminum-based material by preparing the composite material with a matrix comprising a ceramics member having a texture filled with an aluminum-based material and a ceramics layer provide on the surface of the matrix, and as a result, it is possible to adjust the linear expansion coefficient to such a value coming between. It is therefore possible to avoid occurrence of damages to the ceramics layer caused by the difference in thermal expansion between the matrix and ceramics layer and to ensure application of the composite material at high temperatures. In addition, since the matrix has a high thermal conductivity, the substrate can be efficiently heated. Further, because the ceramics layer is provided, it is possible to prevent occurrence of metal contamination and to prevent occurrence of corrosion of the composite material caused by a halogen gas. By satisfying the relationship $(\alpha_1 - 3) \leq \alpha_2 \leq (\alpha_1 + 3)$, it is possible to prevent almost perfectly occurrence of damages to the ceramics layer caused by the difference between the linear expansion coefficient $\alpha_1$ of the matrix and the linear expansion coefficient $\alpha_2$ of the ceramics layer.

BRIEF DESCRIPTION OF THE DRAWINGS

FIG. 2 is a conceptual view of a dry etching unit which is a substrate processing apparatus in the embodiment 1 of the invention;

DESCRIPTION OF THE PREFERRED EMBODIMENTS

The present invention will now be described by means of embodiments with reference to the drawings.

(Embodiment 1)

The embodiment 1 covers the composite material and the manufacturing method thereof of the invention, the substrate processing apparatus and the manufacturing method thereof of the embodiment 1 of the invention, the substrate mounting stage and the manufacturing method thereof, and the substrate processing method of the embodiment 1 of the invention.

More particularly, the matrix in the embodiment 1 consisting of a matrix comprising a ceramics member having a texture filled with an aluminum-based material, and a ceramics layer provided on the surface of the matrix. Or, the composite material forming a part of a processing apparatus for processing the substrate consists of a matrix comprising a ceramics member having a texture filled with an aluminum-based material and a ceramics layer provided on the surface of the matrix. Further, a part of the substrate processing apparatus for processing the substrate of the embodiment 1 is composed of a matrix comprising a ceramics member having a texture filled with an aluminum-based material and a ceramics layer provided on the surface of the matrix. In the substrate processing apparatus of the embodiment 1, plasma etching is applied to the substrate, and a part of the substrate processing apparatus composed of the composite material to a substrate mounting stage (or more specifically, a wafer stage) having an electrostatic chucking function and provided with temperature control means.

Figure 1A:
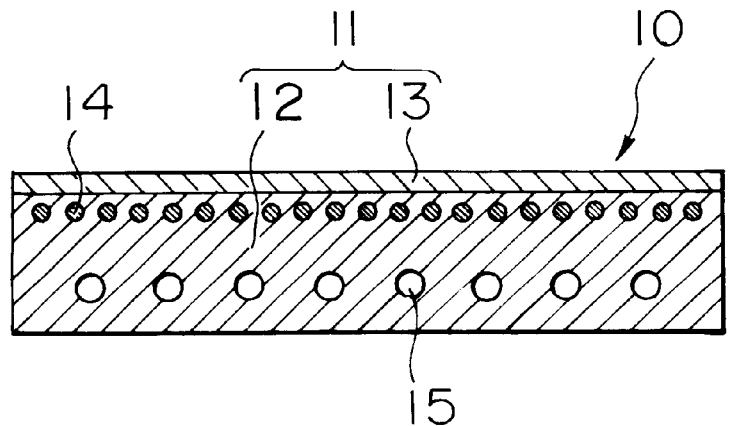
FIG. 1 consisting of FIGS. 1A and 1B is a schematic sectional view of a substrate mounting stage of an embodiment 1 of the invention.

A schematic sectional view of the substrate mounting stage 10 in the embodiment 1 forming a part of the substrate processing apparatus composed of the composite material is illustrated in (A) of FIG. 1. This substrate mounting stage 10 is composed of the composite material 11. The composite material 11 consists of the matrix 12 comprising the ceramics member having the texture filled with the aluminum-based material (corresponding to a temperature adjusting jacket), and the ceramics layer 13 provided on the surface of the matrix 12. The matrix 12 is disk-shaped.

In the embodiment 1, the ceramics member composing the matrix 12 comprises cordierite ceramics. The cordierite ceramics is a ceramics having a chemical composition adjusted so as to achieve about 13 wt. % MgO, about 52 wt. % $SiO_2$ and about 35 wt. % $Al_2O_3$. The cordierite ceramics has a linear expansion coefficient of $0.1 \times 10^{-6}$/K.

The aluminum-based material composing the matrix 11 comprising aluminum (Al) and silicon (Si). In the embodiment 1, the aluminum-based material contains 20 vol. % silicon relative to the aluminum-based material. The ceramics member is a fired mixture of cordierite ceramics powder and cordierite ceramics fiber, having a ratio of cordierite ceramics fiber of 5 vol. %. The cordierite ceramics powder has an average particle size of 10 $\mu$m. The cordierite ceramics fiber has an average diameter of 3$\mu$m, and an average length of 1 mm. The ceramics member has a porosity of about 50% and a pore diameter within a range of from about 1 to 2 $\mu$m. The volumetric ratio of cordierite ceramics to the aluminum-based material is therefore about 1/1. The matrix 12 having such a composition has a linear expansion coefficient at a temperature of 100 to 300° C. of about $10.6 \times 10^{-6}$/K on the average, i.e., $\alpha_1 = 10.6$. Because the volumetric ratio of cordierite ceramics to the aluminum-based material is about 1/1, the matrix 12 has an electric conductivity and a heat conductivity closer to those of a metal rather than those of a pure ceramics. It is therefore possible to apply voltage as well as bias to the substrate mounting stage 10 manufactured from such a matrix 12.

The material composing the ceramics layer 13 is $Al_2O_3$ added with about 2.5 wt. % $TiO_2$. The ceramics layer 13 having a thickness of about 0.2 mm is formed by the flame spraying method on the surface of the matrix 12. The ceramics layer 13 having such a composition has a linear expansion coefficient of about $9 \times 10^{-6}$/K on the average at a temperature of 100 to 300° C. Therefore, the linear expansion coefficient $\alpha_2$ of the ceramics layer 13, which is about 9, satisfies $(\alpha_1-3) \leq \alpha_2 \leq (\alpha_1+3)$. $Al_2O_3$ itself has a linear expansion coefficient of about $8 \times 10^{-6}$/K. By adding about 2.5 wt. % $TiO_2$ to $Al_2O_3$, it is possible to adjust the volumetric intrinsic resistance value of the ceramics layer 13 to the order of $10^{11}$ $\Omega/\mu$. As a result, the ceramics layer 13 acts as a dielectric body and can display the function as an electrostatic chuck. The volumetric intrinsic resistance value is adjusted as described above because the value of volumetric intrinsic resistance of the ceramics layer 13 of over the order of $10^{11}$ $\Omega/\mu$ leads to a poorer attracting force of the ceramics layer 13, so that it may because difficult to cause the ceramics layer 13 to sufficiently attract the substrate. With a value of under $10^{11}$ $\Omega/\mu$ for the ceramics layer 13, use of the substrate mounting stage 10 at a high temperature results in a further lower resistance value for the ceramics layer 13, and current may be produced at the interface between the substrate and the ceramics layer 13. Depending upon conditions for use, the ceramics layer 13 should preferably have a volumetric intrinsic resistance value within a range of from $10^{11}$ to $10^{16}$ $\Omega/\mu$ in general.

The substrate mounting stage 10 has an electrostatic chucking function and is provided with temperature control means. More specifically, the ceramics layer 13 which is a dielectric layer has an electrostatic chucking function. Temperature control means is provided (built) in the interior of the matrix 12, and this temperature control means comprises a heater 14 and a piping for the flow of a temperature controlling heat medium.

A large sized sheath heater having a large capacity corresponding to the area (bottom area) of the matrix 12 is used as the heater 14. The heater 14 is a known heater comprising a heater main body (not shown) and a sheath pipe (not shown) provided outside the heater main body and protecting heater main body. The heater 14 is connected to a power source through a wiring not shown. The thermal expansion of the heater 14 exerts an influence on the substrate mounting stage 10. It is therefore desirable to use a material having a value dose to the linear expansion coefficients $\alpha_2$ of the matrix 12 and the ceramics layer 13. More specifically, it is desirable to use a sheath pipe manufactured from a material having a linear expansion coefficient within a range of from $9 \times 10^{-6}$/K to $12 \times 10^{-6}$/K such as titanium and stainless steel. That is, the material composing the heater 14 (the material of the sheath pipe in contact with the matrix 12) should preferably have a linear expansion coefficient $\alpha_2$[unit: $10^{-6}$/K] satisfying $(\alpha_1-3) \leq \alpha_2 \leq (\alpha_1+3)$. There is no particular limitation on the linear expansion coefficient of the main body of the heater 14, which has no effect on the substrate mounting stage 10.

The piping 15 is connected to a temperature controlling heat medium supplying apparatus (not shown in FIG. 1) and is manufactured from a metal or an alloy. By causing the temperature controlling heat medium supplied from the temperature controlling heat medium supplying apparatus to flow to the piping in the substrate mounting stage 10, it is possible to conduct temperature control of the substrate mounting stage 10. Heat expansion of the piping 15 also affects the substrate mounting stage 10. It is therefore desirable to use a material having a value close to the linear expansion coefficients $\alpha_1$ and $\alpha_2$ of the matrix 12 and the ceramics layer 13. More specifically, the piping 15 should preferably be manufactured from a material having a linear expansion coefficient within a range of from $9 \times 10^{-6}$/K to $12 \times 10^{-6}$/K such as titanium and stainless steel. That is, the material composing the piping 15 should preferably have a linear expansion coefficient $\alpha_P$[unit: $10^{-6}$/K] satisfying $(\alpha_1-3) \leq \alpha_P \leq (\alpha_1+3)$.

Dc voltage is applied via a wiring (not shown) to the substrate mounting stage 10 (more specifically, the matrix 12) having the configuration as described above. By using the substrate mounting stage 10 as an electrode, therefore, the ceramics layer 13 serves as an electrostatic chuck. A pusher pin (not shown) for pushing up the substrate (eg., a silicon semiconductor substrate) mounted and held on the ceramics layer 13 is incorporated in the substrate mounting stage 10. A mechanism (not shown) for causing the pusher pin to project from of retreat from the top surface of the ceramics layer 13 is attached to the pusher pin.

Now, a method for manufacturing the substrate mounting stage 10 in the embodiment 1 forming a part of the substrate processing apparatus composed by the composite material 11 will be described below. The composite material 11 is manufactured by a method comprising the steps of (A) filling the texture of the ceramics member with the aluminum-based material, thereby preparing the matrix comprising the ceramics member having the texture thereof filled with the aluminum-based material, and (B) providing a ceramics layer on the surface of the matrix. In the embodiment 1, the process (A) comprises the steps of arranging the ceramics member comprising porous cordierite ceramics in a vessel (mold), casting the aluminum-based material comprising molten aluminum and silicon into the vessel (mold), and filling the ceramics member with the aluminum-based material by the high-pressure casting method.

The ceramics member comprising porous cordierite ceramics is made porous in the firing step during manufacture of the ceramics member. In the embodiment 1, a porous cordierite ceramics board (hereinafter simply referred to as the "fiber board") which is a sinter available by sintering cordierite ceramics powder and cordierite ceramics fiber is employed. While a general powdery sintered ceramics is high-temperature-sintered at about 1,200° C., the fiber board is low-temperature-sintered at about 800° C.: it is sintered and made porous so that cordierite ceramics powder adheres via a binder to the periphery of cordierite ceramics fiber. By, for example, changing the volumetric ratio of cordierite ceramics powder to cordierite ceramics fiber, therefore, it is possible to adjust the porosity and the pore diameter of the resultant ceramics member comprising the porous cordierite ceramics.

For the manufacture of the substrate mounting stage 10, a first fiber board formed into a prescribed disk shape is first prepared. A groove for arranging the heater 14 is previously provided on the first fiber board. A second fiber board is previously provided apart from the first fiber board. A groove for arranging the piping 15 is previously provided on the second fiber board. The first fiber board is arranged on the bottom of a vessel (mold), and further, the heater 14 is arrange in the groove provided on the first fiber board. Then, the second fiber board is placed upon the first fiber board, and the piping 15 is arranged in the groove provided on the second fiber board. Further, a third fiber board is placed upon the second fiber board. Holes for incorporating pusher pins are machined in advance in these fiber boards.

Then, the ceramics member comprising these fiber boards is preliminarily heated to about 800° C., and then, the aluminum-based material (80 vol. % Al-20 vol. % Si) heated to about 800° C. into a molten state is cast into the vessel (mold). The high-pressure casting method is then applied by applying a high pressure of about 1 ton/cm² into the vessel (mold). As a result, the texture of the ceramics member comprising the porous fiber boards is filled with the aluminum-based material. By cooling and solidifying the aluminum-based material, a matrix 12 is prepared.

Then, the top surface of the matrix 12, i.e., the surface facing the heater is polished. Subsequently, mixed powder having a particle size of about 10 $\mu$m prepared by mixing about 2.5 wt. % $TiO_2$ with $Al_2O_3$ is sprayed in a molten state onto the thus polished surface by the vacuum flame spray method, and solidified. This permits formation of a ceramics layer 13 having a volumetric intrinsic resistance of the order of $10^{11}$ $\Omega/\mu$ and a thickness of about 0.2 mm by the flame spray method. Prior to forming the ceramics layer 13, nickel containing, for example, about 5 wt. % aluminum (Ni-5 wt. % Al) may previously be sprayed as a flame-sprayed undercoat layer, and a ceramics layer 13 may be formed on the flame-sprayed undercoat layer by the flame spray method.

For the purpose of confirming the cracks preventing effect of the thus formed ceramics layer 13 of the substrate mounting stage 10, a heat cycle test of the substrate mounting stage 10 was carried out as follows with the use of a hot beast circulating oven:

(1) Placing the substrate mounting stage 10 in the oven, and heating the oven interior to 300° C. in 30 minutes;
(2) Holding the oven interior at a temperature of 300° C. for 20 minutes;
(3) Allowing the oven interior to cool for 40 minutes to room temperature; and
(4) Removing the substrate mounting stage 10 from the oven and observing the exterior view.

As a result of repetition of these options (1) to (4) ten times, no change was observed in the exterior view of the substrate mounting stage 10 even after the completion of ten runs, thus permitting confirmation of the absence of any cracks in the ceramics layer 13.

The thus obtained substrate mounting stage 10 is compound of the matrix (temperature adjusting jacket) 12 obtained by filling the ceramics member comprising the porous cordierite ceramics fiber boards with the aluminum-based material comprising 80 vol. % Al and 20 vol. % Si, and the matrix 12 has a linear expansion coefficient $\alpha_1$ of a value close to the linear expansion coefficient $\alpha_2$ of the ceramics layer 13. Therefore, the matrix 12 and the ceramics layer 13 present almost the same extent of expansion and contraction upon heating and cooling of the substrate mounting stage 10. It is therefore possible to ensure avoidance of occurrence of damages to the ceramics layer 13 such as cracks caused upon heating to a high temperature or upon bringing the substrate mounting stage 10 from a high to room temperatures by the difference in the linear expansion coefficients $\alpha_1$ and $\alpha_2$ between these different materials.

In the manufacturing method of the composite material, the manufacturing method of the substrate processing apparatus, and the manufacturing method of the substrate mounting stage of the embodiment 1, the porous cordierite ceramics fiber boards are specifically used. The fiber boards can withstand the impact produced when the aluminum-based material enters pores upon high-pressure casting. As a result, it is possible to inhibit occurrence of cracks in the fiber boards. That is, in a ceramics member comprising a porous cordierite ceramics available by the usual powder sintering method, cracks tend to easily occur upon high-pressure casting. By using porous cordierite ceramics fiber boards, however, it is possible to inhibit occurrence of cracks in the ceramics member upon high-temperature casting.

Since occurrence of cracks in the fiber boards upon high-pressure casting can be avoided, it is possible to more certainly prevent occurrence of damages such as cracks to the ceramics layer 13 provided on the surface of the matrix 12. More particularly, even when cracks are produced in the fiber boards, the aluminum-based material filling the texture of the ceramics member comprising the fiber boards serves as an adhesive, thus making available the matrix 12. In the thus obtained matrix 12, however, a layer comprising the aluminum-based material is formed in gaps such as cracks produced in the fiber boards. As a result, the ceramics layer 13 provided on the surface of the matrix 12 can no more follow changes in temperature during the use of the substrate mounting stage 10, and cracks tend to be easily produced in the ceramics layer 13. That is, since the mixed powder having a particle size of about 10 $\mu$m is flame-sprayed and assimilated with the matrix 12, the ceramics layer 13 is almost free from the influence of thermal expansion of the aluminum-based material itself filling the pores of 1 to 2 $\mu$min the fiber boards. The layer comprising the aluminum-based material present in the gaps at cracked portions of the fiber boards has layer length and width then the diameter of the particles forming the ceramics layer 13. The effect of thermal expansion of the layer comprising the aluminum-based material on the ceramics layer 13 cannot be disregarded, thus leading to a high probability of occurrence of cracks in the ceramics layer 13.

Because the ceramics layer 13 is formed on the matrix 12 by the flame spraying method, the matrix 12 and ceramics layer 13 are more closely integrate. As a result, it becomes possible to alleviate stress between the matrix 12 and the ceramics layer 13, to accelerate heat conduction from the matrix 12 to the ceramics layer 13 and to ensure rapid and certain temperature control of the substrate (for example, a silicon semiconductor substrate) held by and fixed to the ceramics layer 13.

FIG. 2 is a conceptual view of a dry etching unit (hereinafter referred to as the "etching unit") 20 which is the substrate processing apparatus of the embodiment 1 of the invention incorporating the substrate mounting stage 10 as described above. The etching unit 20 further comprises a chamber 21, and RF antenna 22, another RF antenna 23, and a multi-pole magnet 24. For this etching unit 20, a silicon semiconductor substrate 40 will be described below as the substrate.

The two RF antenna 22 are arranged to surround the outer periphery of a bell jar comprising a cylindrical quartz pipe having a diameter of 350 mm arranged above the chamber 21, has an antenna shape generating plasma of M=l mode, and connected to a Helicon-wave plasma generating source 28 via matching network 27. A solenoid coil assembly 26 comprising an inner peripheral coil and an outer peripheral coil is arranged outside these RF antennas 22. Of this solenoid coil assembly 26, the inner peripheral coil contributes to propagation of Helicon wave, and the outer peripheral coil contributes to transfer of the generated plasma. The RF antenna 23 is arranged is a loop shape on a ceiling plate 121 (made of quartz) of the chamber 21, and connected via the matching network 29 to a power source 30. The multipole magnet 24 is provided outside of the bottom of the chamber 21, and forms a casp magnet field for inhibiting disappearance of electrons on the side wall of the chamber 21.

A substrate mounting stage 10 (see (A) in FIG. 1) for holding and fixing a silicon semiconductor substrate 40, which is a substrate, is arranged in the chamber 21. Further, an exhaust port 31 for discharging gases in the chamber 21 is connected to negative-pressure means (not shown) such as a vacuum pump. A bias power source 32 for controlling input ionic energy into the silicon semiconductor substrate 40 is connected to substrate mounting stage 10, and further, a DC power source 33 for causing the ceramics layer 13 to display an electrostatic attraction force is connected to the temperature adjusting jacket serving as the matrix 12. A heater 14 arranged in the matrix 12 of the substrate mounting stage 10 is connected to a power source 39. Further, a fluorescent fiber thermometer 36 for measuring temperature of the silicon semiconductor substrate 40 serving as the substrate is provided in the etching unit 20.

A piping 15 arranged in the matrix 12 of the substrate mounting stage 10 is connected via piping 34A and 34B to a temperature controlling heat medium supplying unit 35. The temperature controlling heat medium supplying unit 35 supplies the temperature controlling heat medium such as a silicon oil through the piping 34A to the piping 15 of the substrate mounting stage 10, receives the temperature controlling heat medium sent out from the piping 15 via the piping 34B, and then heats or cools the temperature controlling heat medium to a prescribed temperature. In some cases, a chiller may be incorporated into the temperature controlling heat medium supplying unit 35, and a temperature controlling heat medium (cooling medium) of a low temperature (0° C., for example) such as flon gas may supply into the piping 34A, 15 and 34B. By circulating the temperature controlling heat medium in the piping 15, temperature control of the silicon semiconductor substrate 40 serving as the substrate held by and fired on the substrate mounting stage 10 is accomplished. A control value 37 operable at high temperatures is arranged in the piping 34A connected to the temperature controlling heat medium supplying unit 35. On the other hand, a control value 37 is arranged also in a bypass piping 34C between the piping 34A and 34B. In this configuration, the quantity of supplied temperature controlling heat medium to the piping 15 is controlled by controlling the degree of opening/closing of the control value 37. The quantity of supplied temperature controlling heat medium is determined by the controller 38 by detecting the temperature detected at the fluorescent fiber thermometer 36 by a controller (PID controller) 38, and selecting a temperature from a difference from a predetermined temperature of the silicon semiconductor substrate 40 so as to achieve a quantity of supply previously determined through experiment or calculation.

In the substrate mounting stage 10 shown by (A) in FIG. 1, temperature control is manly accomplished through heating with the heater 14, depending upon the set temperature of the silicon semiconductor substrate 40 serving as the substrate. Temperature control of the substrate mounting stage by the temperature controlling heat medium is an auxiliary temperature control for temperature stabilization of the silicon semiconductor substrate 40. More specifically, when applying plasma etching, heat input from plasma is received by the silicon semiconductor substrate 40 serving as the substrate, as well as by the substrate mounting stage 10. As a result, it may sometimes be difficult to maintain the silicon semiconductor substrate 40 at the prescribed temperature through heating alone by the heater 14. In this case, in addition to heating by the heater 14, the temperature controlling heat medium at a temperature lower than the set temperature is fed into the piping 15 so as to offset the heat input from plasma with a view to maintaining the silicon semiconductor substrate 40 serving as the substrate at the set temperature. This permits stabilization of the silicon semiconductor substrate 40 at the set temperature. In FIG. 2, illustration of details of the etching unit such as an etching as introducing port and a gate value is omitted.

Figure 3A:
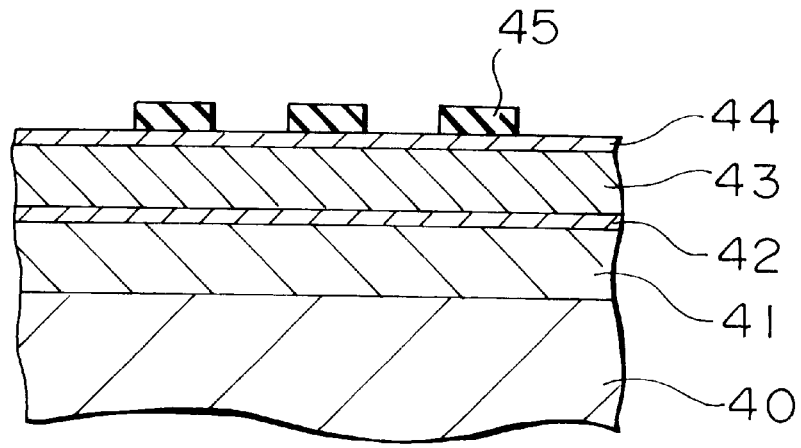
FIG. 3 consisting of FIGS. 3A and 3B is a schematic partial sectional view of a semiconductor substrate and the like for illustrating the substrate processing method (using plasma etching) in the embodiment 1 of the invention.
Figure 3B:
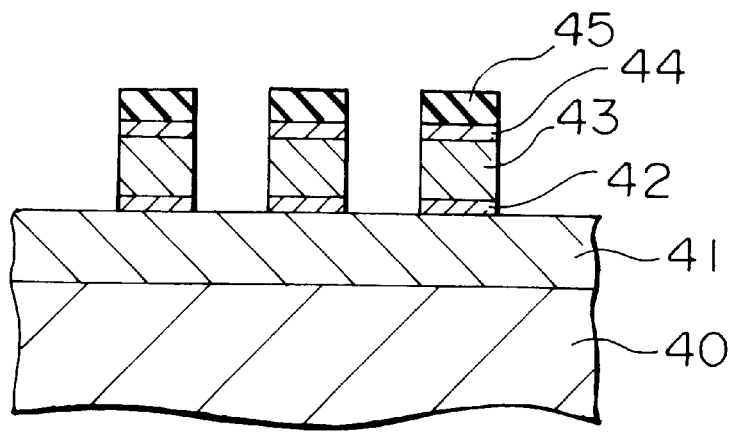

Now, the substrate processing method using the etching unit 20 which is a substrate processing apparatus (more specifically, the plasma etching method) will be described with reference to FIGS. 3(A) and 3(B). In this substrate processing method, a copper (CU) film 43 mainly corresponds to the substrate.

First, a Cu film 43 is formed on an undercoat insulating layer 41 comprising $SiO_2$ formed on a silicon semiconductor substrate 40. More specifically, a TiN film 42 serving as an adhering layer was first formed by sputtering on the undercoat insulating layer 41 formed by a known method on the silicon semiconductor substrate 40. Then, a Cu film 43 corresponding to the substrate was formed by sputtering on the TiN film 42, and TiN film 44 was further formed thereon by sputtering. An $SiO_2$ film was formed on this TiN film 44, and further, the $SiO_2$ film was patterned by the known lithography and etching techniques to form a mask pattern 45 comprising the $SiO_2$ film. This state is illustrated in a schematic partial sectional view of FIG. 3(A).

Then, the silicon semiconductor substrate 40 having the mask pattern formed thereon was placed on the substrate mounting stage 10 in the etching unit 20 shown in FIG. 2, and the silicon semiconductor substrate 40 was held on, and fixed to the substrate mounting stage 10 by causing the ceramics layer 13 to exert an electrostatic attracting force. Then, the substrate mounting stage 10 was heated by operation of the heater 14 and passage of the temperature controlling heat medium through the piping 15, and temperature of the silicon semiconductor substrate 40 including the Cu film 43 which was the substrate was adjusted to the set temperature shown in the following Table 1. Plasma etching was applied to the TiN film 44, the Cu film 43 and the TiN film 42 under the conditions shown in Table 1, thereby obtaining a wiring composed of the Cu film 43. This sate is illustrated in a schematic partial sectional view of FIG. 3(B).

TABLE 1

| Etching gas: | $Cl_2$ = 3 sccm |
|---|---|
| Pressure: | 0.05 Pa |
| Power from power source 28 (RF antenna 22): | 1.5 kw (13.56 MHz) |
| Power from power source 30 (RF antenna 23): | 1.5 kw (13.56 MHz) |
| RF bias: | 350 W |
| Silicon semiconductor substrate temperature: | 250° C. |

As a result of application of plasma etching as described above, almost no temperature increase was observed in the silicon semiconductor substrate 40 and the like caused by heat input from plasma even during etching, and it was possible to keep the silicon semiconductor substrate 40, and further, the Cu film 43 stably at a set temperature (250° C.) during etching. Because of the possible to stabilize temperature of the silicon semiconductor substrate 40 including the Cu film at a high accuracy, it was possible to form a wiring having a satisfactory anisotropic shape and accomplish processing of the Cu film 43 satisfactory, in spite of the single use of $Cl_2$ as the etching gas.

For comparison purposes, changes in temperature of the silicon semiconductor substrate 40 were investigated under the same conditions as those shown in Table 1, not allowing display of the electrostatic chucking function, but by simply heating the silicon semiconductor substrate 40 by means of the substrate mounting stage 10. The result is that sufficient heating was not conductor at the start of etching, and temperature of the silicon semiconductor substrate 40 was considerably lower than the set temperature, with a value of 190° C. Along with the progress of etching, temperature increased and reached 250° C., the set temperature, in about 60 seconds after the start of etching. When etching was further continued, there was another progress of temperature increase as a result of heat input from plasma to reach about 265° C. in 120 seconds after the start of etching.

It was thus confirmed that it was possible to accomplish temperature control of the substrate at a high accuracy, so far unavailable in the conventional art, by allowing display of the electrostatic attraction force in the substrate mounting stage 10. Even when the interior of the chamber 21 was brought back to room temperature in, for example, maintenance after repetition such etching, no damage to the ceramics layer 13 such as cracks was observed in the substrate mounting stage 10.

Figure 1B:
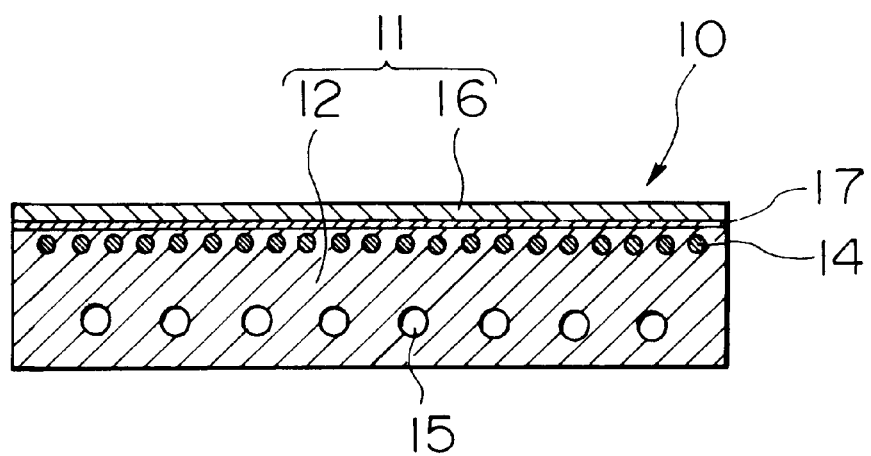

As shown in the schematic sectional view of FIG. 1(B), the ceramics layer may be provided on the surface of the matrix 12, not by the flame spraying method, but by brazing. In this case, it suffices to attach a ceramics layer 16 comprising a ceramics plate made of $Al_2O_3$ by sintering to the surface of the matrix 12 by brazing with the use of an Al—Mg—Ge brazing material 17 at a temperature of, for example, about 600° C. Other applicable brazing materials include alloys comprising titanium, tin, antimony or magnesium. When assuming the matrix having a linear expansion coefficient $\alpha_1$[unit: $10^{-6}$/K], a brazing material should preferably have a linear expansion coefficient $\alpha_2$ within a range of from ($\alpha_1$−3) to ($\alpha_1$+3).

In dry etching of the Cu film, such a gas as HCl, HBr or HI is applicable alone or in combination, apart from $Cl_2$. The dry etching conditions of the Cu film when using HBr are shown in the following Table 2:

TABLE 2

| Etching gas: | HBr = 50 sccm |
|---|---|
| Pressure: | 0.5 Pa |
| Power from power source 28 (RF antenna 22): | 2.5 kW |
| Power from power source 30 (RF antenna 23): | 2.5 kW |
| RF bias: | 300 W |
| Silicon semiconductor substrate temperature: | 250° C. |

(Embodiment 2)

The embodiment 2 is a variant of the embodiment 1. The embodiment 2 is different from the embodiment 1 in that the ceramics member composing the matrix in the composite material comprises aluminum nitride, and the aluminum-based material composing the matrix comprises aluminum.

Figure 4A:
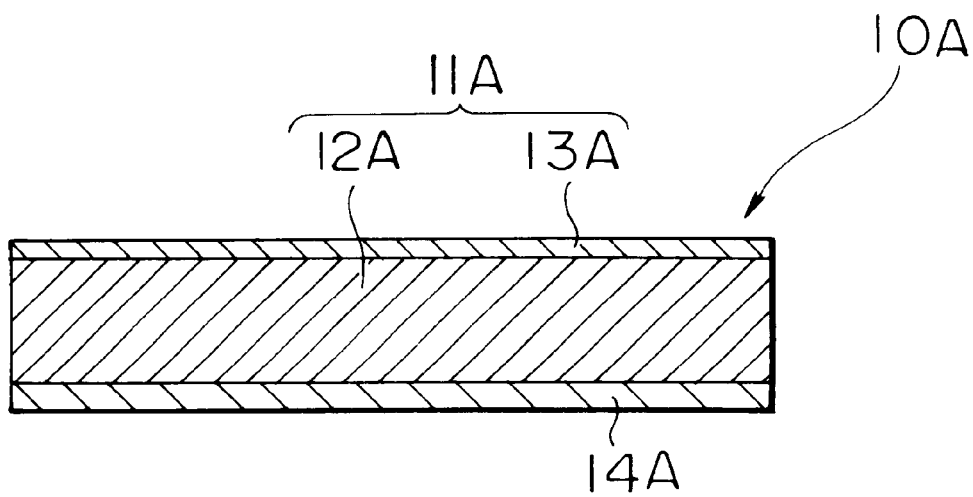
FIG. 4 consisting of FIGS. 4A and 4B is a schematic sectional view of a substrate mounting stage in an embodiment 2 of the invention.

FIG. 4(A) is a schematic sectional view of a substrate mounting stage 10A of the embodiment 2, forming a part of the substrate processing apparatus composed of the composite material. The substrate mounting stage 10A also comprises the composite material 11A. The composite material 11A consists of a matrix 12A (corresponding to the temperature adjusting jacket) comprising a ceramics member having a texture thereof filled with an aluminum-based material, and a ceramics layer 13 provided on the surface of the matrix 12A. The matrix 12A is disk-shaped. Unlike the embodiment 1, a heater 14A is attached to the bottom surface of the matrix 12A.

In the embodiment 2, the ceramics member composing the matrix 12A comprises aluminum nitride (AlN). Aluminum nitride has a linear expansion coefficient of $5.1 \times 10^{-6}$/K, and a heat conductivity of 0.235 cal/cm¥sec¥K. The aluminum-based material composing the matrix comprises aluminum (Al). A volumetric ratio of aluminum nitride to aluminum is selected so as to satisfy $(\alpha_1-3) \leq \alpha_2 \leq (\alpha_1+3)$. More specifically, the volumetric ratio of aluminum nitride to aluminum is 70/30. The matrix 12 A has a linear expansion coefficient of $8.7 \times 10^{-6}$/K on the average for temperature of 100 to 300° C., i.e., $\alpha_1$=8.7. The material of the ceramics layer 13A comprises $Al_2O_3$ added with 2.5 wt. % $TiO_2$. The ceramics layer 13A is formed by the flame spraying method on the surface of the matrix 12A. While $Al_2O_3$ has originally a linear expansion coefficient of about $8 \times 10^{-6}$/K, addition of $TiO_2$ to $Al_2O_3$ leads to a linear expansion coefficient of about $9 \times 10^{-6}$/K on the average over temperatures of 100 to 300° C. ($\alpha_2$ is about 9), almost the same value as the linear expansion coefficient $\alpha_1$ of the matrix 12. As a result, it is possible to effectively prevent occurrence of damages to the ceramics layer 13A such as cracks even upon a temperature change resulting from heating of the matrix 12A to a high temperature. By adding $TiO_2$ to $Al_2O_3$, it is possible to adjust the volumetric intrinsic resistance value of the ceramics layer 13A to the order of $10^{11}$ Ω/μ. As a result, the ceramics layer 13A effectively displays the function as an electrostatic chuck.

The heater 14A is PBN heater (pyrolitic boron nitride pyrolitic graphite heater) capable of heating to about 400° C. By attaching the heater 14A to the back of the temperature control jacket serving as the matrix 12A, it is possible to control temperature of the matrix 12A within a range of from room temperature to about 400° C. When applying DC voltage through a wiring (not shown) to the matrix 12A of the substrate mounting stage 10A, the matrix 12A can be used as an electrode, and the ceramics layer 13A functions as an electrostatic chuck. A pusher pin (not shown) for pushing up the substrate (for example, a silicon semiconductor substrate) place and held on the ceramics layer 13A is incorporated in the substrate mounting stage 10A. A mechanism (not shown) for causing the pusher pin to project or retreat from the top surface of the ceramics layer 13A is attached to the pusher pin.

Now, a manufacturing method of the substrate mounting stage 10 forming a part of the substrate processing apparatus comprising the composite material will be described below. The composite material 11A is basically prepared, as in the embodiment 1, by (A) a step filling the texture of the ceramics member with the aluminum-based material, thereby preparing a matrix comprising a ceramics member having a texture filled with an aluminum-based material, and (B) a step of providing a ceramics layer on the surface of the matrix. In the embodiment 2, the process (A) comprises the step of causing the aluminum-based material comprising molten aluminum in a non-pressurized state to penetrate into the ceramics member formed from aluminum nitride particles in accordance with the non-pressurized metal penetrating method.

More specifically, a ceramics member which is a preform made by forming AlN particles through forming of AlN particles having an average particle size of 10 $\mu$m by the sludge casting forming method and firing the formed product at a temperature of about 800° C. The ceramics member is preliminarily heated to about 800° C. and aluminum melted by heating to about 800° C. is caused to penetrate into the ceramics member under non-pressurized condition. It is thus possible to prepare a matrix 12A comprising 70 vol. % AlN and 30 vol. % Al. Then, the matrix 12A is formed into the shape of a disk-shaped temperature adjusting jacket. Holes for building in the pusher pin and the like were previously machined. Then, the top surface of the thus obtained matrix 12A is polished. Subsequently, a mixed powder having a particle size of about 10 $\mu$m prepared by mixing about 2.5 wt. % $TiO_2$ with $Al_2O_3$ is sprayed in a molten state by the vacuum flame spraying method onto the polished surface, and solidified. As a result, a ceramics layer 13A having a volumetric intrinsic resistance value of the order of $10^{11}$ $\Omega/\mu$ and a thickness of about 0.2 mm can be formed. Thereafter, a heater 14 comprising a PBN heater is attached to the bottom surface of the matrix 12A, i.e., the side opposite to that provided with the ceramics layer 13A, thereby obtaining a substrate mounting stage 10A. Prior to forming the ceramics layer 13A, nickel containing about 5 wt. % aluminum (5wt. % Ni—Al) may previously be flame-sprayed as a flame-sprayed undercoat layer, thereby forming a ceramics layer 13A on this flame sprayed undercoat layer.

In the thus manufactured substrate mounting stage 10A, the ceramics layer 13A has a linear expansion coefficient $\alpha_2$ substantially equal to the linear expansion coefficient $\alpha_1$ of the matrix 12A (temperature adjusting jacket). Therefore, no damage to the ceramics layer 13 such as cracks occurs even upon change in temperature caused, for example, by heating the matrix 12A to a high temperature. In the manufacturing method of the composite material, the manufacturing method of the substrate processing apparatus, and the manufacturing method of the substrate mounting stage of the embodiment 2, the linear expansion coefficient $\alpha_1$ of the matrix 12A and the linear expansion coefficient $\alpha_2$ of the ceramics layer 13A can be adjusted so as to satisfy the relationship $(\alpha_1-3) \leq \alpha_2 \leq (\alpha_1+3)$ by adjusting the volumetric ratio of aluminum nitride to aluminum, and further, as required, by adjusting the ratio of addition of $TiO_2$ in the ceramics layer 13A comprising $Al_2O_3$. As a result, it is possible to effectively prevent occurrence of damages to the ceramics layer 13A such as cracks caused by a change in temperature of the substrate mounting stage 10A.

Since the ceramics layer 13A is formed by the flame spraying method on the matrix 12A, the matrix 12A and the ceramics layer 13A are further integrated. This permits alleviation of stress between the matrix 12A and the ceramics layer 13A, and acceleration of heat conduction from the matrix 12A to the ceramics layer 13A. It is possible to ensure rapid and certain temperature control of the substrate (for example, a silicon semiconductor substrate) held on and secured to the ceramics layer 13A.

Figure 5:
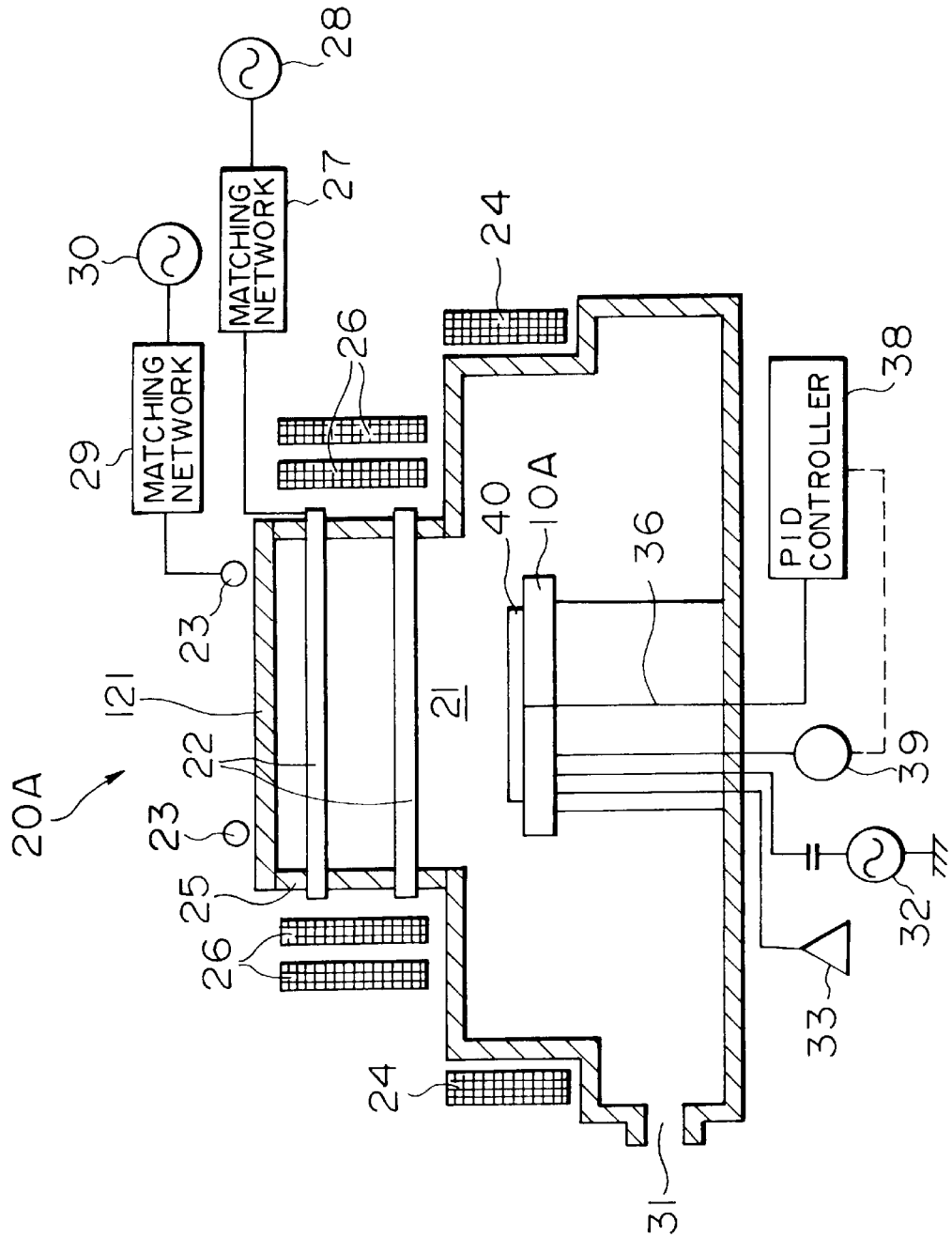
FIG. 5 is a conceptual view of a dry etching unit which is a substrate processing apparatus in the embodiment 2 of the invention.

The etching unit 20A of the embodiment 2, which is the substrate processing apparatus of the embodiment 1 of the invention, provided with a substrate mounting stage 10A forming a part of the substrate processing apparatus composed of the composite material 11A can be substantially the same as the substrate processing apparatus described above as to the embodiment 1 except for the piping 15 and related components as shown in the conceptual view of FIG. 5. Derailed description thereof is omitted here. The substrate processing method (plasma etching method) of the embodiment 1 of the invention using the substrate processing apparatus of the embodiment 2 can also be substantially the same as the substrate processing method described as to the embodiment 1. Detailed description thereof is therefore omitted here. Temperature control of the substrate mounting stage 10A can be accomplished by detecting the temperature detected by a fluorescent fiber thermometer 36 by means of a controller (PID controller) 38 to control a power source 39 for supplying power to the heater 14A.

Figure 4B:
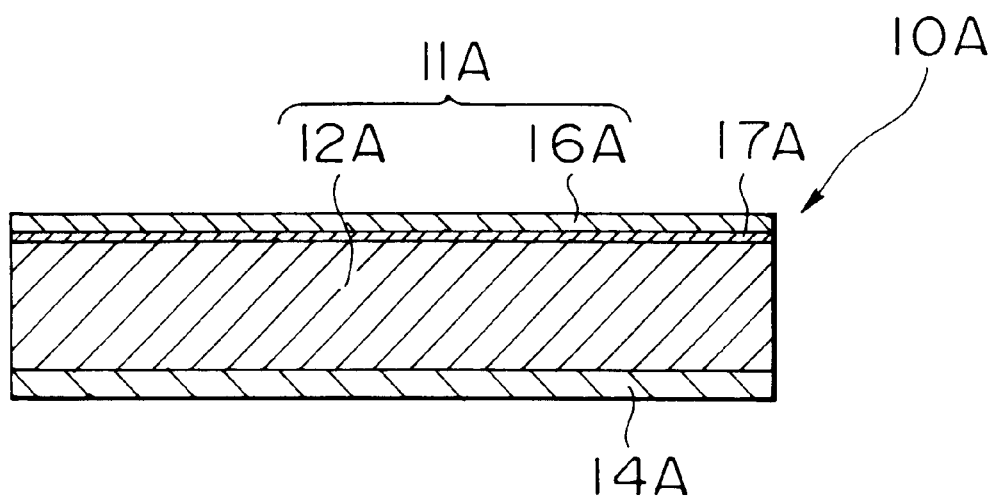

As shown in the schematic sectional view of FIG. 4(B), the ceramics layer may be provided on the surface of the matrix 12A, not by the flame spraying method, but by brazing. In this case, it suffices to attach the ceramics layer 16A comprising an $Al_2O_3$ ceramics plate manufactured by the sintering method to the surface of the matrix by brazing by the use of an Al—Mg—Ge brazing material 17A at a temperature, for example, of about 600° C.

While the aluminum-based material forming the matrix comprises aluminum, the aluminum-based material forming the matrix may comprise aluminum and silicon. By using the aluminum-based material comprising aluminum and silicon (for example, 80 vol. % Al-20 vol. % Si), it is possible to control the linear expansion coefficient $\alpha_1$ of the matrix, and to further reduce the difference from the linear expansion coefficient $\alpha_2$ of the ceramics layer. In place of $Al_2O_3$, the ceramics layer may comprise aluminum nitride (AlN).

(Embodiment 3)

The embodiment 3 is also a variant of the embodiment 1. The embodiment 3 is different from the embodiment 1 in that the ceramics member forming the matrix in the composite material comprises silicon carbide (SiC), and the aluminum-based material forming the matrix comprises aluminum (Al).

Figure 6A:
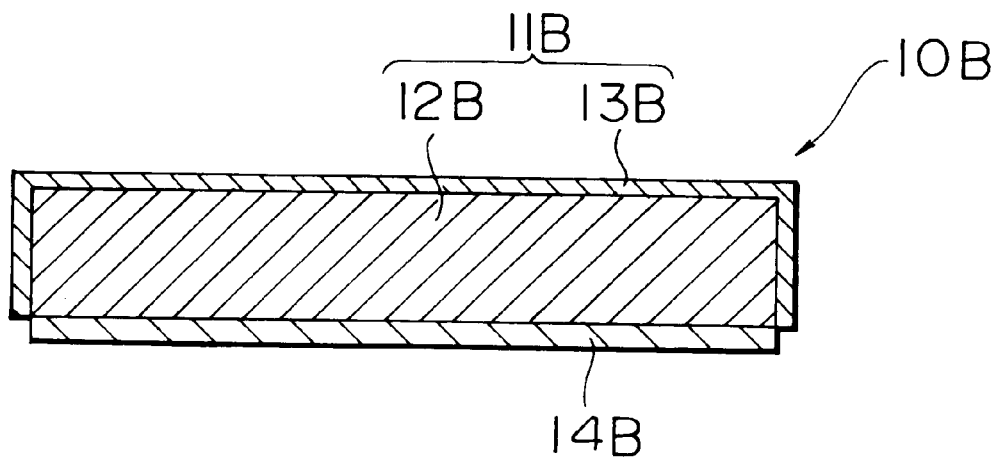
FIG. 6 consisting of FIGS. 6A and 6B is a schematic sectional view of a substrate mounting stage in an embodiment 3 of the invention.

FIG. 6(A) is a schematic sectional view of the substrate mounting stage 10B the embodiment 3 forming a part of the substrate processing apparatus composed of the composite material. The substrate mounting stage 10B also comprises the composite material 11B. The composite material 11B comprises a matrix 12B (corresponding to the temperature adjusting jacket) comprising a ceramics member having a texture filled with an aluminum-based material, and ceramics layer 13B provided on the top and side surfaces of the matrix 12B. The matrix 12B is disk-shaped. As in the embodiment 2, a heater 14B is attached to the bottom surface of the matrix 12B.

In the embodiment 3, the ceramics member composing the matrix 12B comprises silicon carbide (SiC). Silicon carbide has a linear expansion coefficient of $4 \times 10^{-6}$/K, and a heat conductivity of 0.358 cal/cm¥scc¥K (150 W/m¥K). The aluminum-based material composing the matrix comprises aluminum (Al). A volumetric ratio of silicon carbide to aluminum is selected so as to satisfy $(\alpha_1-3) \leq \alpha_2 \leq (\alpha_1+3)$. That is, the volumetric ratio of silicon carbide to aluminum is 70/30. The matrix 12B has a linear expansion coefficient of $6.2 \times 10^{-6}$/K on the average over temperatures of 100 to 300° C., i.e., $\alpha_1=6.2$. The material composing the ceramics layer 13B comprises $Al_2O_3$ added with about 1.5 wt. % $TiO_2$. The ceramics layer 13B are formed on the top and side surfaces of the matrix 12B. While $Al_2O_3$ has originally a linear expansion coefficient of about $8 \times 10^{-6}$/K, addition of $TiO_2$ to $Al_2O_3$ leads to a linear expansion coefficient with a range of from about 8 to $9 \times 10^{-6}$/K ($\alpha_2$: about 8 to 9) on the average over temperatures of 100 to 300° C., so that the relationship between the linear expansion coefficient $\alpha_1$ of the matrix 12B and the linear expansion coefficient $\alpha_2$ of the ceramics layer 13B satisfies $(\alpha_1-3) \leq \alpha_2 \leq (\alpha_1+3)$. As a result, it is possible to effectively prevent occurrence of damages to the ceramics layer 13B such as cracks even upon a change in temperature resulting from heating of the matrix 12B to a high temperature. Addition of $TiO_2$ to $Al_2O_3$ permits adjustment of the volumetric intrinsic resistance value of the ceramics layer 13B to the order of $10^{11}$ $\Omega/\mu$. It is thus possible to allow the ceramics layer 13B to display effectively the function as an electrostatic chuck.

The heater 14A is a PBN heater as in the embodiment 2. By attaching the heater 14B to the back of the temperature adjusting jacket which is the matrix 12B, it is possible to accomplish temperature control of the matrix 12B within a range of from room temperature to about 400° C. When applying DC voltage through a wiring (not shown) onto the matrix 12B of the substrate mounting stage 10B, the matrix 12B can be used as an electrode, and the ceramics layer 13B functions as an electric chuck. A pusher pin (not shown for pushing up the substrate (a silicon semiconductor substrate, for example) mounted and held on the ceramics layer 13B is built in the substrate mounting stage 10B. A mechanism (not shown) for causing the pusher pin to project or retreat from the top surface of the ceramics layer 13B is attached to the pusher pin.

Now, the manufacturing method of the substrate mounting stage 10B forming a part of the substrate processing apparatus composed by the composite material will be described below. The composite material 11B is basically manufactured, as in the embodiment 2, by a method comprising (A) the step of filling the texture of the ceramics member with the aluminum-based material, thereby preparing the matrix comprising the ceramics member having the texture filled with the aluminum-based material, and (B) provided the ceramics layer on the surface of the matrix. In the embodiment 3, the process (A) comprises the step of causing the aluminum-based material comprising molten aluminum in a non-pressurized state to penetrate into the ceramics member formed from silicon carbide particles in accordance with the non-pressurized metal penetrating method.

More specifically, a mixture of SiC particles having an average particle size of 15 μm and SiC particles having an average particle size of 60 μm in a volumetric ratio of 1:4 is first formed by the cast sludge forming method, and then a ceramics member which is a preform made by forming the SiC particles is prepared by firing the formed product at a temperature of about 800° C. The ceramics member is preliminarily heated to about 800° C., and aluminum melted by heating to about 800° C. is caused to penetrate in a non-pressurized state into the ceramics member. This permits manufacture of the matrix 12B comprising 70 vol. % SiC and 30 vol. % Al. Then, the matrix 12B is formed into a disk-shaped temperature adjusting jacket. Holes for building in the pusher pin and the like are preciously pierced in the matrix 12B. Then, the top and side surfaces of the thus obtained matrix 12B are polished. A mixed powder having a particle size of about 10 μm prepared by mixing about 1.5 wt. % $TiO_2$ with $Al_2O_3$ in a molten state is sprayed by the vacuum spraying method onto the thus polished surfaces and solidified, thereby forming the ceramics layer 13B having a volumetric intrinsic resistance value of the order of $10^{11}$ $\Omega/\mu$ and a thickness of about 0.2 mm. Subsequently, the heater 14B comprising a PBN heater is attached to the bottom surface of the matrix 12B, i.e., the surface opposite to the top surface provided with the ceramics layer 13B, thus obtaining the substrate mounting stage 10B. Prior to forming the ceramics layer 13B, nickel containing, for example, about 5 wt. % aluminum (Ni- 5 wt. % Al) may be flame-sprayed as a flame sprayed undercoat layer and the ceramics layer 13B may be formed on the flame-sprayed undercoat layer by the flame spraying method.

The manufacturing method of the substrate mounting stage is not limited to that described above. The foregoing process (A) may comprise the step, as in the embodiment 1, of arranging the ceramics member comprising silicon carbide in a vessel (mold), casting the aluminum-based material comprising molten aluminum into the vessel (mold), and filling the ceramics member with the aluminum-based material by the high-pressure casting method. More specifically, in order to manufacture the substrate mounting stage 10B, a preform comprising SiC formed into a prescribed disk shape is first prepared. Holes for building in the pusher pins and the like are previously pierced in the preform. Then, the ceramics member comprising the preform is preliminarily heated to about 800° C., and aluminum method by heating to about 800° C. is cast into the vessel (mold). Then, the high-pressure casting method is applied by applying a high pressure of about 1 ton/cm² into the vessel (mold). As a result, the texture of the ceramics member is filled with aluminum. By cooling aluminum for solidification, the matrix 12B is manufactured. Subsequently, it suffices to manufacture the substrate mounting stage 10B in the same manner as described above.

In the thus manufactured substrate mounting stage 10B, even a change in temperature resulting from heating of the matrix 12B to a high temperature causes no damage to the ceramics layer 13B such as cracks. In the manufacturing method of the composite material, the manufacturing method of the substrate processing apparatus, and the manufacturing method of the substrate mounting stage of the embodiment 3, the relationship between the linear expansion coefficient $\alpha_1$ of the matrix 12B and the linear expansion coefficient $\alpha_2$ of the ceramics layer 13B can be adjusted so as to satisfy $(\alpha_1-3) \leq \alpha_2 \leq (\alpha_1+3)$, by adjusting the volumetric ratio of silicon carbide to aluminum, and further as required, adjusting the ratio of added $TiO_2$ in the ceramics layer 13B comprising $Al_2O_3$. As a result, it is possible to effectively prevent occurrence of damages to the ceramics layer 13B such as cracks caused by a change in temperature of the substrate mounting stage 10B.

Since the ceramics layer 13B is formed by the flame spraying method on the matrix 12B, the matrix 12B and the ceramics layer 13B are further integrated. This permits alleviation of stress between the matrix 12B and the ceramics layer 13B, and acceleration of heat conduction from the matrix 12B and the ceramics layer 13B. It is possible to ensure rapid and certain temperature control of the substrate (for example, a silicon semiconductor substrate) held on and secured to the ceramics layer 13B.

Figure 6B:
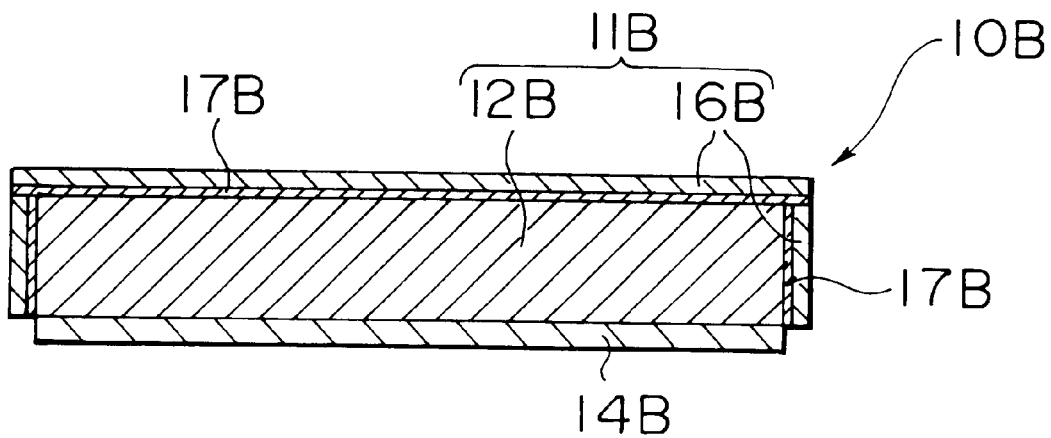

As shown in the schematic sectional view of FIG. 6(B) the ceramics layer may be provided on the top and side surfaces of the matrix 12B, not by the flame spraying method, but by brazing. In this case, it suffices to attach the ceramics layer 16B comprising an $Al_2O_3$ ceramics plate manufactured by the sintering method to the surface of the matrix by brazing the use of an Al—Mg—Ge brazing material 17B at a temperature, for example, of about 600° C.

While the aluminum-based material forming the matrix comprises aluminum, the aluminum-based material forming the matrix may comprise aluminum and silicon. By using the aluminum-based material comprising aluminum and silicon (for example, 80 vol. % Al-20 vol. % Si), it is possible to control the linear expansion coefficient $\alpha_1$ of the matrix, and to further reduce the difference from the linear expansion coefficient $\alpha_2$ of the ceramics layer. In place of $Al_2O_3$, the ceramics layer may comprise aluminum nitride (AlN).

Figure 7:
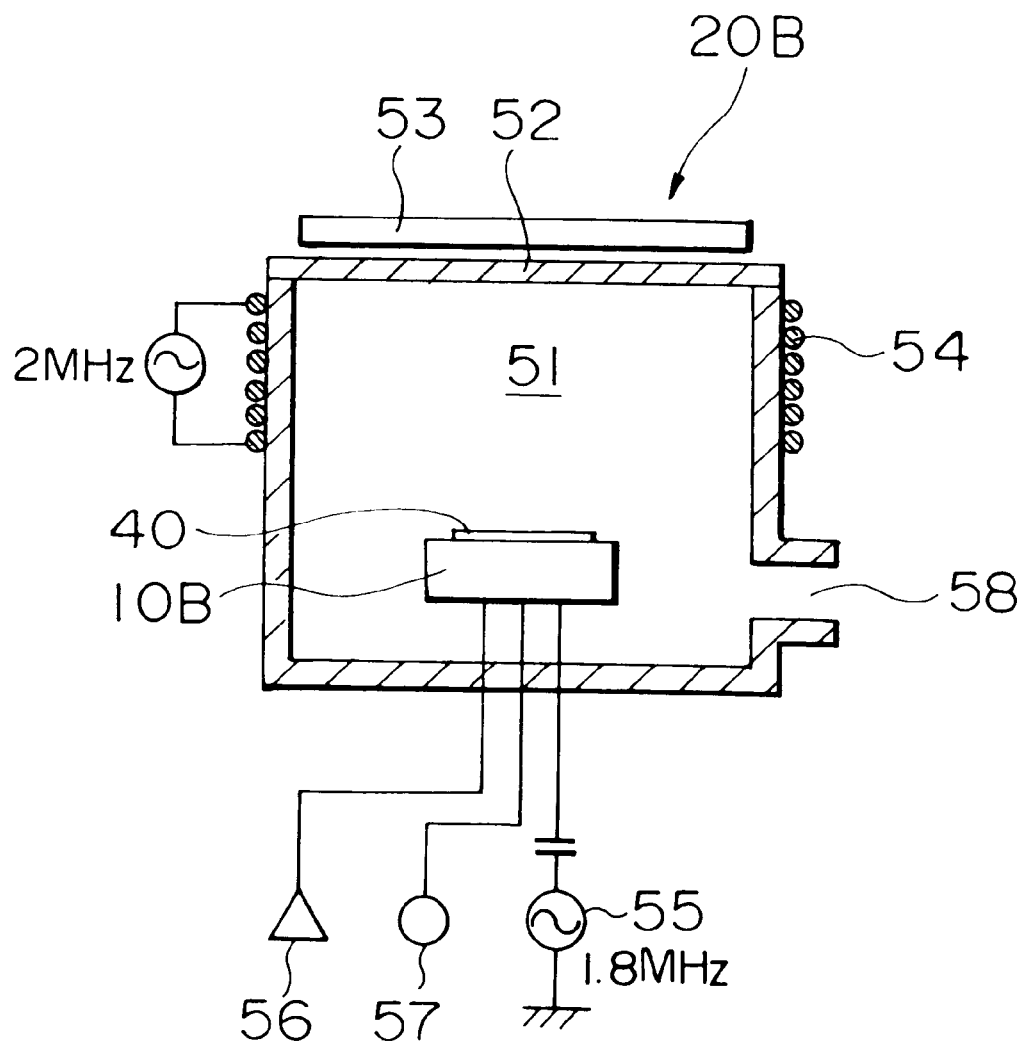
FIG. 7 is a conceptual view of a dry etching unit which is a substrate processing apparatus in the embodiment 3 of the invention.

FIG. 7 is a conceptual view of an etching unit 20B of the embodiment 3, which is the substrate processing apparatus of the embodiment 1 of the invention, provided with the substrate mounting stage 10B as described above forming a part of the substrate processing apparatus composed of the composite material 11B. The etching unit 20B is an ICP (Inductive Coupled Plasma)—type dry etching unit. The etching unit 20B comprises a chamber 51 made of quartz, a ceiling plate 52, a heater 53 for heating the ceiling plate, and an inductive coupling coil 54 arrange on the outside of a side of the chamber 51. A substrate mounting stage 10B (see (A) in FIG. 6) for holding and securing a silicon semiconductor substrate 40 which is a substrate is arranged in the chamber 51. An exhaust port 58 for discharging gases in the chamber 51 is connected to negative pressure means (not shown) such as a vacuum pump. A bias power source 55 for controlling input ionic energy to the silicon semiconductor substrate 40 is connected to the substrate mounting stage 10B, and further, a DC power source 55 for causing the ceramics layer 13B to display an electrostatic attracting force is connected to a temperature adjusting jacket corresponding to the matrix 12B. The heater 14B arranged in the matrix 12B of the substrate mounting stage 10B is connected to a power source 57. Further, a fluorescent fiber thermometer (not shown) for measuring temperature of the silicon semiconductor substrate 40 which is the substrate is provided on the etching unit 20B. Temperature control of the substrate mounting stage 10B can be carried out by detecting the temperature detected by the fluorescent fiber thermometer by means of a controller (PID controller) (not shown), and controlling the power source 57 for supplying power to the heater 14B. The ceiling plate 52 should preferably be made of the composite material of the invention as described later.

As in the embodiment 1, plasma etching of a copper (Cu) film was performed by the use of the etching unit 20B serving as the substrate processing apparatus. The etching conditions are shown in the following Table 3:

TABLE 3

| | |
|---|---|
| Etching gas: | $Cl_2$ = 10 sccm |
| Pressure: | 0.13 Pa (1 mtorr) |
| Source power: | 1.5 kW (13.56 MHz) |
| RF bias: | 350 W |
| Silicon semiconductor substrate temperature: | 250° C. |
| Ceiling plate temperature: | 300° C. |

As a result of application of plasma etching as described above, almost no temperature increase was observed in the silicon semiconductor substrate 40 and the like caused by heat input from plasma even during etching, and it was possible to keep the silicon semiconductor substrate 40, and further, the Cu film (see FIG. 3) 43 stably at a set temperature (250° C.) during etching. Because of the possibility to stabilize temperature of the silicon semiconductor substrate 40 including the Cu film at a high accuracy, it was possible to form a wiring having a satisfactory anisotropic shape and accomplish processing of the Cu film 43 satisfactorily, in spite of the single use of $Cl_2$ as the etching gas.
(Embodiment 4)

The embodiment 4 is a variant of the embodiment 1, and relates to the composite material of the invention and the manufacturing method thereof, the substrate processing apparatus of the embodiment 1 of the invention and the manufacturing method thereof, the substrate mounting stage and the manufacturing method thereof, and the substrate processing method of the embodiment 1 of the invention (with plasma CVD).

More specifically, the matrix in the embodiment 4 is composed, as in the embodiment 1, of a matrix consisting of a ceramics member made of cordierite ceramics having a texture filled with an aluminum-based material comprising aluminum and silicon, and a ceramics layer comprising $Al_2O_3$ provided on the surface of the matrix. Or, the composite material forming a part of the processing apparatus for processing the substrate is composed of a matrix comprising a ceramics member made of cordierite ceramics having a texture filled with an aluminum-based material comprising aluminum and silicon, and a ceramics layer comprising $Al_2O_3$ provided on the surface of the matrix. Further, a part of the substrate processing apparatus for processing the substrate of the embodiment 4 is composed of a composite material consisting of a matrix comprising a ceramics member made of cordierite ceramics having a texture thereof filled with an aluminum-based material comprising aluminum and silicon and a ceramics layer comprising $Al_2O_3$ provided on the surface of the matrix. In the substrate processing apparatus of the embodiment 4, unlike the embodiment 1, plasma CVD is applied to the substrate. A part of the substrate processing apparatus composed of the composite material is a substrate mounting stage (or more specifically, a wafer stage) having an electrostatic chucking function and provided with temperature control means, which has the same structure as that in the embodiment 1.

As the composite material an the manufacturing method thereof, the substrate processing apparatus of the embodiment 1 of the invention, and the substrate mounting stage and the manufacturing method thereof in the embodiment 4 can be regarded as the same as in the embodiment 1, detailed description is omitted here. Now, an outline of the plasma CVD unit serving as the substrate processing apparatus in the embodiment 4 will first be described below, and then, the substrate processing method of the embodiment 1 of the invention (with plasma CVD) will be described.

Figure 8:
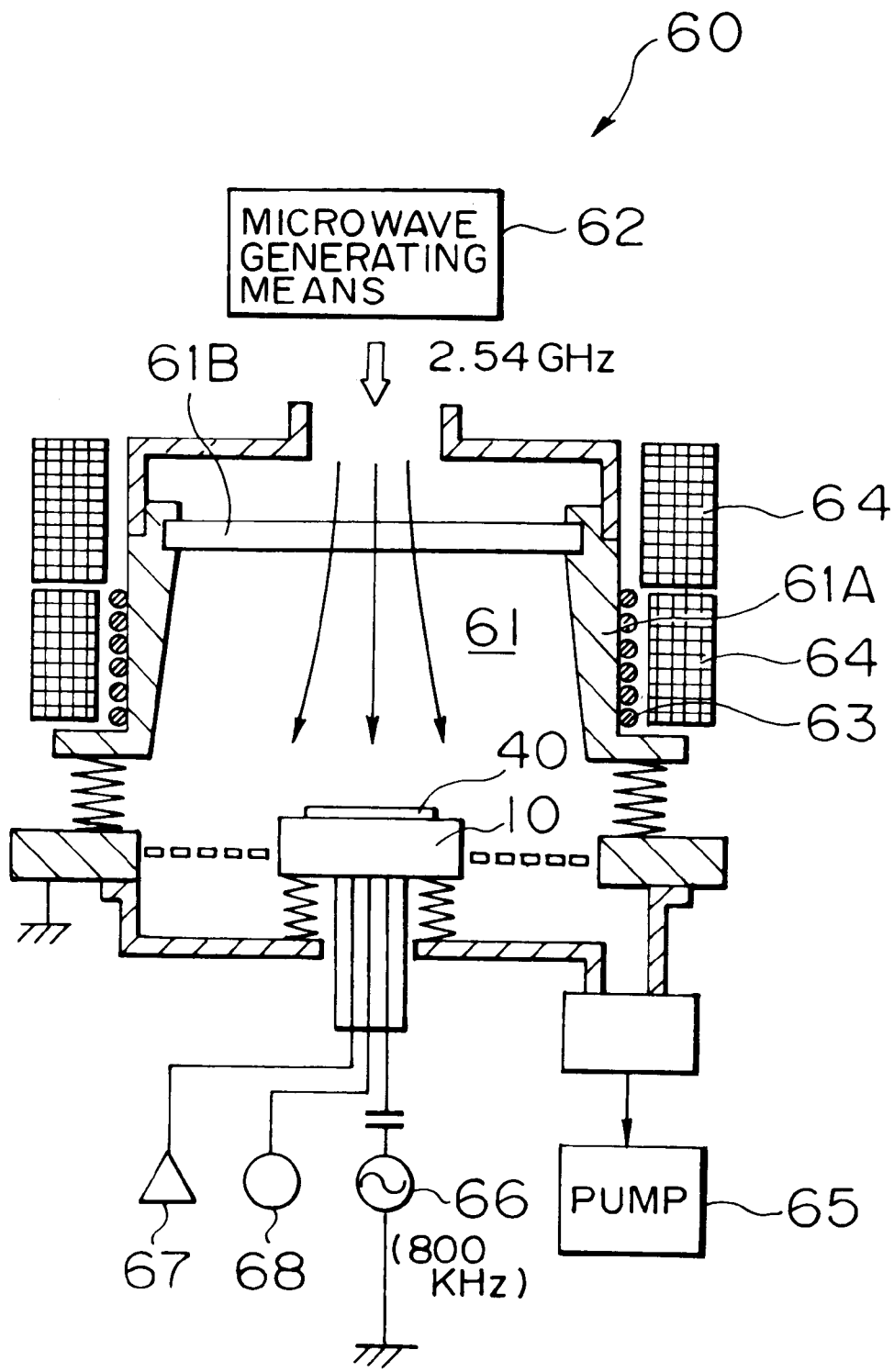
FIG. 8 is a conceptual view of a plasma CVD unit which is a substrate processing apparatus in an embodiment 4 of the invention.

FIG. 8 is a conceptual view of the plasma CVD unit (more specifically, a bias ECR-CVD unit) serving as a substrate processing apparatus in the embodiment 4.

This bias ECR-CVD apparatus 60 (hereinafter abbreviated as the "CVD unit") is provided with a chamber 61 having a side wall 61A made of an aluminum block, and a substrate mounting stage (wafer stage) 10 shown in FIG. 1. The substrate mounting stage 10 is arranged on the bottom of the chamber 61.

A quartz window 61B is provided on the top surface of the chamber 61. Microwave generating means 62 is arranged above the window 61B. A heater 63 is provided on the outer peripheral surface of the side wall 61A, thereby permitting heating of the chamber 61 to a prescribed temperature. Further, a solenoid coil 64 is arranged on the upper periphery of the chamber 61. A pump 65 is arranged on the exhaust side of the chamber 61. An RF bias power source 66 is connected to the substrate mounting stage 10. A DC power source 67 for causing the ceramics layer 13 to display an electrostatic attracting force is connected to a temperature adjusting jacket corresponding to the matrix 12. Further, a heater 14 arranged in the matrix 12 is connected to a power source 68. Illustration of piping 34A 34B and 34C, a temperature controlling heat medium supplying unit 35, a fluorescent fiber thermometer 36, a control value 37 and a controller (PID controller) 38 is omitted here.

In the CVD unit 60 having the configuration as described above, resonance of microwave supplied through the window 61B from the microwave generating means 62 and a magnetic field caused by the solenoid coil 64 produces ECR discharge, and ion generated thereby enters the substrate (for example, a silicon semiconductor substrate 40) on the substrate mounting stage 10. Therefore, under the effect of such a mechanism, it is possible to achieve a high accuracy gap fill in the CVD unit 60. A piping (not shown) for supplying the raw material gas for CVD processing to the chamber 61 is provided in the CVD unit 60.

Figure 9A:
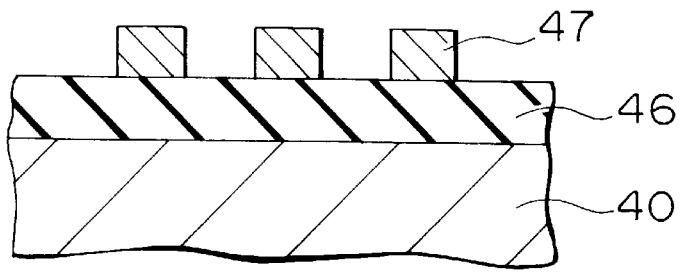
FIG. 9 consisting of FIGS. 9A through 9C is a schematic partial sectional view of a semiconductor substrate and the like for illustrating the substrate processing method (using plasma CVD) in the embodiment 4 of the invention.
Figure 9B:
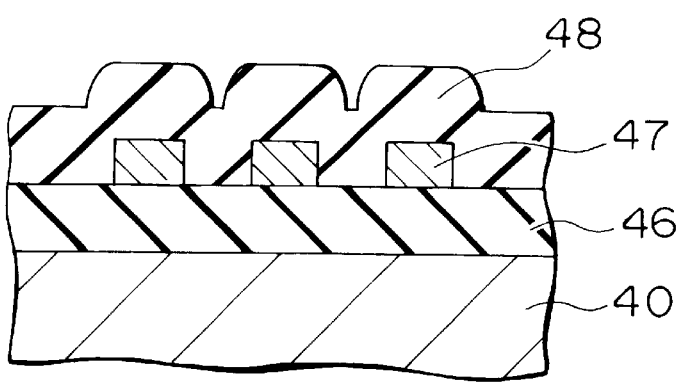

Now, the substrate processing method (with plasma CVD) of the embodiment 1 of the invention using the CVD unit of the embodiment 4 will be described below with reference to FIGS. 9(A) to (C).

First, an undercoat insulating layer 46 comprising $SiO_2$ is formed by a known method on the silicon semiconductor substrate 40, and then, a piping 47 comprising an aluminum alloy is formed in accordance with the known sputtering method, the lithographic technique and the etching technique. In this embodiment, the undercoat insulating layer 46 and the piping 47 comprising the aluminum alloy forms the substrate. This state is illustrated in the schematic partial sectional view of FIG. 9(A).

The silicon semiconductor substrate 40 is mounted on the substrate mounting stage 10 of the CVD unit 60 shown in FIG. 8. The ceramics layer 13 is caused to function as an electrostatic chuck, and the silicon semiconductor substrate 40 is held on and secured to the substrate mounting stage 10. Then, the substrate mounting stage 10 is heated and adjusted to 350° C. which is the prerequisite temperature in the CVD processing. More specifically, the substrate mounting stage 10 is heated by operating the heater 14 and passing the temperature controlling heat medium through the piping 15. Under the conditions shown in the following Table 4, plasma CVD is applied, and an interlayer insulating film 48 comprising $SiO_2$ is formed. This state is shown in the schematic partial sectional view of FIG. 9(B).

TABLE 4

| Gas used: | $SiH_4/N_2O$ = 80/20 sccm |
| Pressure: | 1.3 Pa (10 mTorr) |

TABLE 4-continued

| Microwave power: | 1,500 W |
| RF bias: | 800 W (800 kHz) |
| Silicon semiconductor substrate temperature: | 350° C. |

Figure 9C:
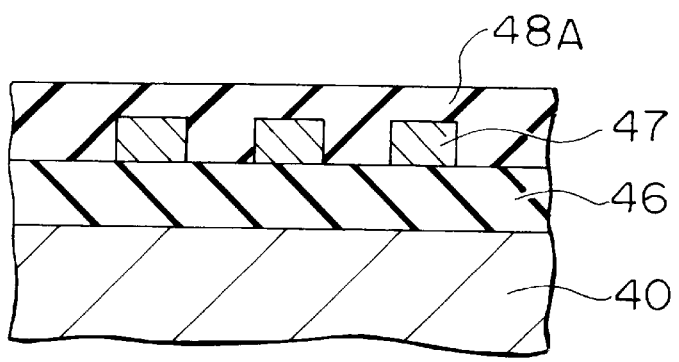

After thus forming the interlayer insulating film 48, the interlayer insulating film 48 is flattened by, for example, the CMP method (chemicomechanical polishing), thereby forming a flattened insulating film 48A as shown in the schematic partial sectional view of FIG. 9(C).

According to such plasma CVD processing method, the interlayer insulating film 48 is formed while conducting temperature control of the substrate by using the substrate mounting stage 10. It is therefore possible to control temperature of the substrate at a high accuracy while forming the interlayer insulating film 48. As a result, it is possible to form a highly reliable interlayer insulating film containing little structural water (water entering into the interlayer insulating film 48). In the conventional art, unavailability of an electrostatic chucking system of high-temperature specifications did not permit sufficient control of the substrate temperature. It was therefore impossible to sufficiently remove H or OH from an interlayer insulating film, and there was available only an interlayer insulating film comprising $SiO_2$ having a film quality still involving problem is reliability.

(Embodiment 5)

The embodiment 5 is a variant of the embodiment 2, and relates to the composite material of the invention and the manufacturing method thereof, the substrate processing apparatus of the embodiment 1 of the invention and the manufacturing method thereof, the substrate mounting stage and the manufacturing method thereof, and the substrate processing method of the embodiment 1 of the invention (with plasma CVD).

More particularly, the matrix in the embodiment 5 is composed, as in the embodiment 2, of a matrix comprising a ceramics member made of aluminum nitride having a texture filled with an aluminum-based material comprising aluminum, and a ceramics layer comprising $Al_2O_3$ provided on the surface of the matrix. Or, the composite material forming a part of the processing apparatus for processing the substrate is composed of a matrix comprising a ceramics member made of aluminum nitride having a texture filled with an aluminum-based material comprising aluminum, and a ceramics layer comprising $Al_2O_3$ provided on the surface of the matrix. Further, a part of the substrate processing apparatus for processing the substrate of the embodiment 5 is composed of a composite material consisting of a matrix comprising a ceramics member made of aluminum nitride having a texture filled with an aluminum-based material comprising aluminum, and a ceramics layer comprising $Al_2O_3$ provided on the surface of the matrix. Unlike the embodiment 2, plasma CVD is applied to the substrate in the embodiment 5. A part of the substrate processing apparatus composed of the composite material is a substrate mounting stage (more specifically, a wafer stage) having an electrostatic chucking function and provided with temperature control means, which has the same structure as that of the embodiment 2.

As the composite material in the embodiment 5 and the manufacturing method thereof, the substrate processing apparatus of the embodiment 1 of the invention and the manufacturing method thereof, and the substrate mounting stage and the manufacturing method thereof can be the same as in the embodiment 2, detailed description is omitted here.

Since the CVD unit of the embodiment 5 which is the substrate processing apparatus of the embodiment 1 of the invention, provided with such a substrate mounting stage 10A forming a part of the substrate processing apparatus composed of the composite material 11A can be substantially the same as the CVD unit described above in the embodiment 4, of which a conceptual view is shown in FIG. 8, except for the piping 15 and the related components, detailed description is omitted here. Also, the substrate processing method (with plasma CVD processing) of the embodiment 1 of the invention using the substrate processing apparatus of the embodiment 5 can be substantially the same as the substrate processing method described above in the embodiment 4. Detailed description is therefore omitted here. Temperature control of the substrate mounting stage 10A can be accomplished through control of power supply to the heater 14A by detecting the temperature detected by the fluorescent fiber thermometer 36 by means of a controller (PID controller) 38.

An interlayer insulating film 48 can be formed while controlling temperature of the substrate by using the substrate mounting stage 10A even by the plasma CVD processing method of the embodiment 5. It is therefore possible to control temperature of the substrate at a high accuracy during formation of the interlayer 48. As a result, an interlayer insulating film 48 of a high reliability with little structural water can be formed.

While the aluminum-based material composing the matrix has been described as comprising aluminum in the above description, the aluminum-based material composing the matrix may comprise aluminum and silicon (for example. 80 vol. % Al-20 vol. % Si). By selecting an aluminum-based material comprising aluminum and silicon, it is possible to control the linear expansion coefficient $\alpha_1$ of the matrix, and further reduce the difference form the linear expansion coefficient $\alpha_2$ of the ceramics layer. The ceramics layer may comprise aluminum nitride (AlN) in place of $Al_2O_3$.

(Embodiment 6)

The embodiment 6 is a variant of the embodiment 3, and relates to the composite material of the invention and the manufacturing method thereof, the substrate processing apparatus of the embodiment 1 of the invention and the manufacturing method thereof, the substrate mounting stage and the manufacturing method thereof, and the substrate processing method (with plasma CVD) of the embodiment 1 of the invention.

More particularly, the matrix in the embodiment 6 is composed of a matrix comprising a ceramics member, made of silicon carbide, having a texture filled with an aluminum-based material comprising aluminum, and a ceramics layer comprising $Al_2O_3$ provided on the surface of the matrix. Or, the composite material forming a part of the processing apparatus for processing the substrate is composed of a matrix comprising a ceramics member made of silicon carbide filled with an aluminum-based material comprising aluminum, and a ceramics layer comprising $Al_2O_3$ provided on the surface of the matrix. Further, a part of the substrate processing apparatus for processing the substrate of the embodiment 6 is composed of a composite material consisting of a matrix comprising a ceramics member made of silicon carbide having a texture filled with an aluminum-based material comprising aluminum, and a ceramics layer comprising $Al_2O_3$, provided on the surface of the matrix. Unlike the embodiment 3, plasma CVD is applied to the substrate in the embodiment 6. A part of the substrate processing apparatus composed of the composite material is a substrate mounting stage (more specifically, a wafer stage) having an electrostatic chucking function and provided with temperature control means, while has the same structure as that of the embodiment 3.

As the composite material in the embodiment 6 and the manufacturing method thereof, the substrate processing apparatus of the embodiment 1 of the invention and the manufacturing method thereof, and the substrate mounting stage and the manufacturing method thereof can be the same as in the embodiment 3, detailed description is omitted here.

Since the CVD unit of the embodiment 6 which is the substrate processing apparatus of the embodiment 1 of the invention, provided with such a substrate mounting stage 10B forming a part of the substrate processing apparatus composed of the composite material 11B can be substantially the same as the CVD unit described above in the embodiment 4, of which a conceptual view is shown in FIG. 8, except for the piping 15 and the related components, detailed description is omitted here. Also, the substrate processing method (with plasma CVD processing) of the embodiment 1 of the invention using the substrate processing apparatus of the embodiment 6 can be substantially the same as the substrate processing method described above in the embodiment 4. Detailed description is therefore omitted here. Temperature control of the substrate mounting stage 10B can be accomplished through control of power supply to the heater 14B by detecting the temperature detected by the fluorescent fiber thermometer 36 by means of a controller (PID controller) 38.

An interlayer insulating film 48 can be formed while controlling temperature of the substrate by using the substrate mounting stage 10B even by the plasma CVD processing method of the embodiment 6. It is therefore possible to control temperature of the substrate at a high accuracy during formation of the interlayer insulating film 48. As a result, an interlayer insulating film 48 of a high reliability with little structural water can be formed.

While the aluminum-based material composing the matrix has been described as comprising aluminum in the above description, the aluminum-based material composing the matrix may comprising aluminum and silicon (for example, 80 vol. % Al-20 vol. % Si). By selecting an aluminum-based material comprising aluminum and silicon, it is possible to control the linear expansion coefficient $\alpha_1$ of the matrix, and further reduce the difference from the linear expansion coefficient $\alpha_2$ of the ceramics layer. The ceramics layer may comprise aluminum nitride (AlN) in place of $Al_2O_3$.

(Embodiment 7)

The embodiment 7 is also a variant of the embodiment 1, and relates to the composite material of the invention and the manufacturing method thereof, the substrate processing apparatus of the embodiment 1 of the invention and the manufacturing method thereof, the substrate mounting stage and the manufacturing method thereof, and the substrate processing method (with plasma CVD) of the embodiment 1 of the invention.

More particularly, the matrix in the embodiment 7 is composed of a matrix comprising a ceramics member, made of cordierite ceramics, having a texture filled with an aluminum-based material comprising aluminum and silicon, and a ceramics layer comprising $Al_2O_3$, provided on the surface of the matrix. Or, the composite material forming a part of the processing apparatus for processing the substrate is composed of a matrix comprising a ceramics member, made of cordierite ceramics, having a texture filled with an aluminum-based material comprising aluminum and silicon, and a ceramics layer comprising $Al_2O_3$, provided on the surface of the matrix. Further, a part of the substrate processing apparatus for processing the substrate of the embodiment 7 is composed of a composite material consisting of a matrix comprising a ceramics member made of cordierite ceramics having a texture filled with an aluminum-based material comprising aluminum and silicon, and a ceramics layer comprising $Al_2O_3$, provided on the surface of the matrix. Unlike the embodiment 1, sputtering is applied to the substrate in the embodiment 7. A part of the substrate processing apparatus composed of the composite material is a substrate mounting stage (more specifically, a wafer stage) having an electrostatic chucking function and provided with temperature control means, which has the same structure as that of the embodiment 1.

As the composite material in the embodiment 7 and the manufacturing method thereof, the substrate processing apparatus of the embodiment 1 of the invention and the manufacturing method thereof, and the substrate mounting stage and the manufacturing method thereof can as the same as in the embodiment 1, detailed description is omitted here. Now, an outline of the sputtering unit which is the substrate processing apparatus in the embodiment 7 will first be described below, and then, the substrate processing method of the embodiment 1 of the invention (sputtering including soft etching) will be described.

Figure 10:
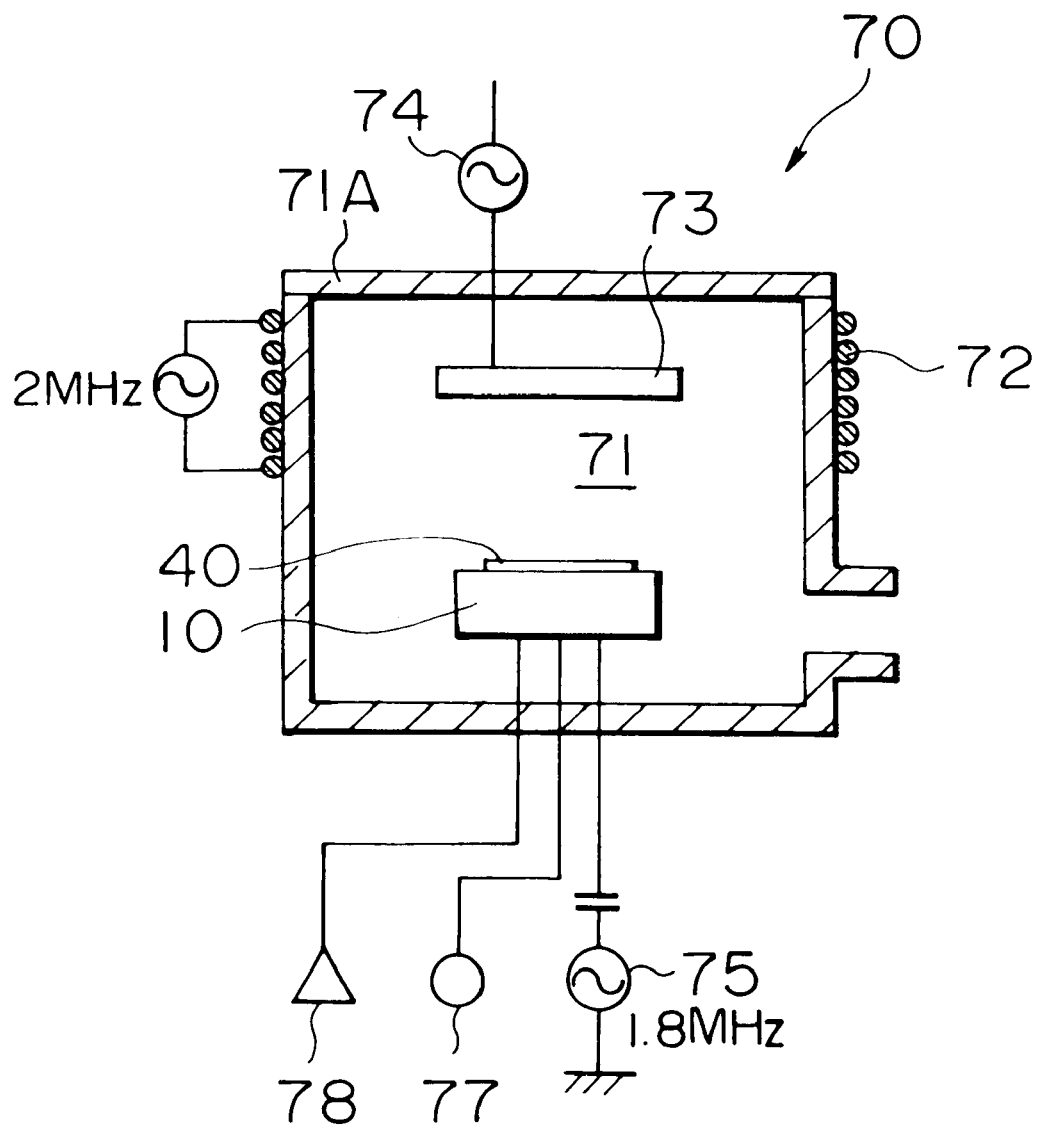
FIG. 10 is a conceptual view a sputtering unit which is a substrate processing apparatus in on embodiment 7 of the invention.

FIG. 10 is a conceptual view of the sputtering unit 70 which is the substrate processing apparatus in the embodiment 7. In this sputtering unit 70, the substrate mounting stage 10 as shown in FIG. 1 is provided in an ICP-type chamber 71. The chamber 71 has a quartz ceiling plate 71A. An inductive coupling coil 72 is arranged on the outer surface of the chamber 71. The reference numeral 73 represents a target. The target 73 is connected to a high-frequency power source 74. Further, a high-frequency power source 75 is connected to the substrate mounting stage 10. A DC power source 76 for causing the ceramics layer 13 to exert an electrostatic attraction force is connected to a temperature adjusting jacket corresponding to the matrix 12. A heater 14 arranged in the matrix 12 is connected to a power source 77. Illustration of pipings 34A, 34B and 34C, a temperature controlling heat medium supply unit 35, a fluorescent fiber thermometer 36, a control value 37, and a controller (PID controller) is omitted here. Pipings for introducing various process gases are provided in the sputtering unit 70, of which illustration is omitted here.

Figure 11A:
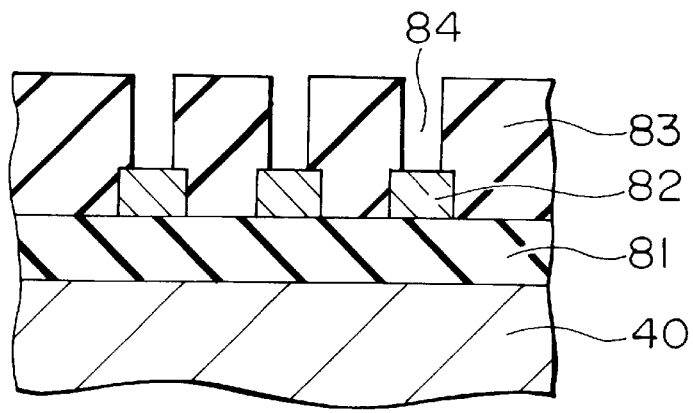
FIG. 11 consisting of FIGS. 11A and 11B is a schematic partial sectional view of a semiconductor substrate and the like for illustrating the substrate processing method (using sputtering) in the embodiment 7 of the invention.
Figure 11B:
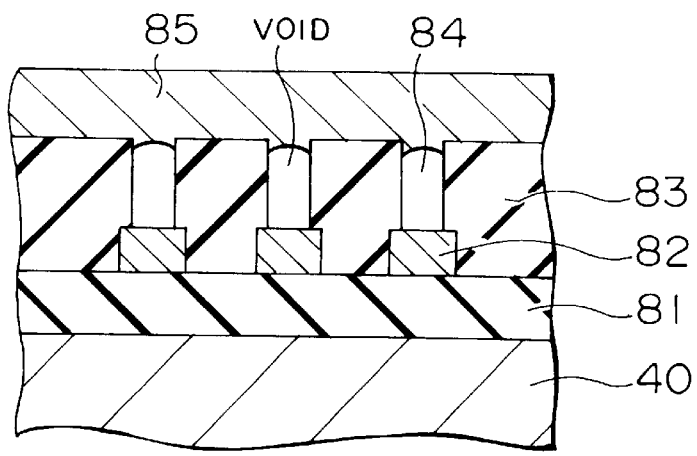
Figure 12:
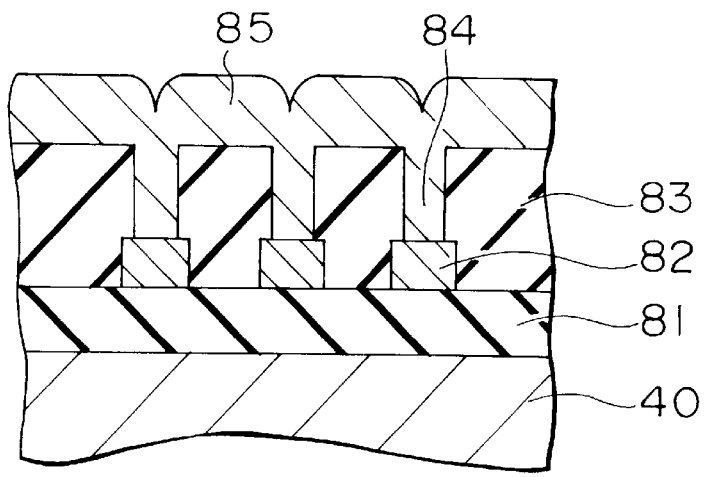
FIG. 12 is a schematic partial sectional view of a semiconductor substrate and the like for illustrating the substrate processing method (using sputtering) in the embodiment 7 of the invention.

The sputtering method using the sputtering unit 70 will now be described below with reference to FIGS. 11 and 12.

First, a wiring 82 comprising an aluminum alloy is formed on an undercoat insulating layer 81 comprising $SiO_2$ formed on the silicon semiconductor substrate 40 in accordance with the known sputtering method, the lithographic and etching techniques. Then, an interlayer insulating film 83 comprising $SiO_2$ is formed by a known method over the entire surface. Subsequently, an opening 84 is provided in the interlayer insulating film 83 above the wiring 82 by the lithographic and dry etching techniques. This state is illustrated in the schematic partial sectional view of FIG. 11(A). In the embodiment 7, the wiring 82 corresponding to the matrix.

A silicon semiconductor substrate is placed on the substrate mounting stage 10 of the sputtering unit 70 shown in FIG. 10. The ceramics layer 13 is caused to exert the electrostatic attracting force to hold and secure the silicon semiconductor substrate 40 onto the substrate mounting stage 10. Then, the substrate mounting stage 10 is heating-adjusted to 500° C. which is the conditional temperature of soft etching and the substrate is kept at 500° C.

Soft etching is applied under conditions as shown in the following Table to remove a spontaneous oxide film (not shown) formed on the surface of the wiring 82 comprising an aluminum alloy exposed on the bottom of the opening 84.

TABLE 5

| | |
|---|---|
| Gas used: | Ar – 200 sccm |
| Pressure: | 1.3 Pa (10 mTorr) |
| Source power: | 1,500 W |
| RF bias: | 100 W |
| Silicon semiconductor substrate temperature: | 500° C. |

Because soft etching is applied while holding the substrate under high-temperature heating condition, not only the spontaneous oxide film on the surface of the wiring 82 is removed, but also water contained in the interlayer insulating film 83 is baked out.

After application of the preliminary processing as described above, a Ti layer, a TiN layer and a metal wiring material layer 85 comprising an aluminum alloy are formed by sputtering. This state is illustrated in the schematic partial sectional view of FIG. 11(B). Illustration of the Ti layer and the TiN layer is omitted. The metal wiring material layer 85 formed above the opening 84 should preferably have a bridge shape. That is, voids should preferably remain in the bottom of the opening 84, and the portion above the opening 84 should preferably be clogged off by the metal wiring material layer 85. By adopting the bridge shape for the metal wiring material layer 85 as described above, pressure of a high-pressure inert gas pushes the metal wiring material present above and near the opening 84 into the opening 84. More specifically, while heating the substrate to a temperature within a range of from 300 to 500° C., or preferably, from 400 to 500° C., or more preferably, from 440 to 500° C., an inert gas atmosphere is kept at a pressure over about $10^6$ Pa in the sputtering unit 70. It is thus possible, as shown in the schematic partial sectional view of FIG. 12, to form a connecting hole (bear hole) filled with the metal wiring material layer 85 with no voids remaining in the opening 84.

In the conventional art, it was difficult, upon carrying out the high-pressure reflow process, to fill certainly the opening 84 with the metal wiring material layer 85 because of the influence of discharge gases from the interlayer insulating film 83, resulting a problem of voids formed in the connecting hole (bear hole). In the sputtering method of the embodiment 7 using the sputtering unit 70 of the embodiment 7, however, it is possible to sufficiently accomplish removal of water in the interlayer insulating film 83 upon soft etching, thus permitting obtaining a connecting hole free from filling defects.

(Embodiment 8)

The embodiment 8 is also a variant of the embodiment 1, and relates to the composite material of the invention and the manufacturing method thereof, the substrate processing apparatus of the embodiment 1 of the invention and the manufacturing method thereof, the substrate mounting stage and the manufacturing method thereof, and the substrate processing method (with sputtering) of the embodiment 1 of the invention.

More particularly, the matrix in the embodiment 8 is composed, as in the embodiment 2, of a matrix comprising a ceramics member made of aluminum nitride having a texture filled with an aluminum-base material comprising aluminum, and a ceramics layer comprising $Al_2O_3$ provided on the surface of the matrix. Or the composite material forming a part of the processing apparatus for processing the substrate is composed of a matrix comprising a ceramics member made of aluminum nitride having a texture filled with an aluminum-based material comprising aluminum, and a ceramics layer comprising $Al_2O_3$ provided on the surface of the matrix. Further, a part of the substrate processing apparatus for processing the substrate of the embodiment 8 is composed of a composite material consisting of a matrix comprising a ceramics member made of aluminum nitride having a texture filled with an aluminum-based material comprising aluminum, and a ceramics layer comprising $Al_2O_3$ provided on the surface of the matrix. Unlike the embodiment 2, sputtering is applied to the substrate in the embodiment 8. A part of the substrate processing apparatus composed of the composite material is a substrate mounting stage (more specifically, a wafer stage) having an electrostatic chucking function and provided with temperature control means, which has the same structure as that of the embodiment 2.

As the composite material in the embodiment 8 and the manufacturing method thereof, the substrate processing apparatus of the embodiment 1 of the invention and the manufacturing method thereof, and the substrate mounting stage and the manufacturing method thereof can be the same as in the embodiment 2, detailed description is omitted here. While the aluminum-based material comprising the matrix has described as comprising aluminum in the above description, the aluminum-based material composing the matrix may comprise aluminum and silicon (for example, 80 vol. % Al-20 vol. % Si). By selecting an aluminum-based material comprising aluminum and silicon, it is possible to control the linear expansion coefficient $\alpha_1$ of the matrix, and further reduce the difference from the linear expansion coefficient $\alpha_2$ of the ceramics layer. The ceramics layer may comprise aluminum nitride (AlN) in place of $Al_2O_3$.

Since the sputtering unit of the embodiment 8 which is the substrate processing apparatus of the embodiment 1 of the invention, provided with such a substrate mounting stage 10A forming a part of the substrate processing apparatus composed of the composite material can be regarded as substantially the same as the CVD unit described above in the embodiment 7, of which a conceptual view is shown in FIG. 10, except for the piping 15 and the related components, detailed description is omitted here. Also, the substrate processing method (with sputtering including soft etching) of the embodiment 1 of the invention using the substrate processing apparatus of the embodiment 8 can be regarded as substantially the same as the substrate processing method described above in the embodiment 7. Detailed description is therefore omitted here. Temperature control of the substrate mounting stage 10A can be accomplished through control of power supply to the heater 14A by detecting the temperature detected by the fluorescent fiber thermometer 36 by means of a controller (PID controller) 38.

(Embodiment 9)

The embodiment 9 is a variant of the embodiment 3, and relates to the composite material of the invention and the manufacturing method thereof, the substrate processing apparatus of the embodiment 1 of the invention and the manufacturing method thereof, the substrate mounting stage and the manufacturing method thereof, and the substrate processing method (with sputtering) of the embodiment 1 of the invention.

More particularly, the matrix in the embodiment 9 is composed of a matrix comprising a ceramics member, made of silicon carbide, having a texture filled with an aluminum-based material comprising aluminum, and a ceramics layer comprising $Al_2O_3$ provided on the surface of the matrix. Or, the composite material forming a part of the processing apparatus for processing the substrate is composed of a matrix comprising a ceramics member made of silicon carbide filled with an aluminum-based material comprising aluminum, and a ceramics layer comprising $Al_2O_3$ provided on the surface of the matrix. Further, a part of the substrate processing apparatus for processing the substrate of the embodiment 9 is composed of a composite material consisting of a matrix comprising a ceramics member made of silicon carbide having a texture filled with an aluminum-based material comprising aluminum, and a ceramics comprising $Al_2O_3$ provided on the surface of the matrix. Unlike the embodiment 3, sputtering is applied to the substrate in the embodiment 9. A part of the substrate processing apparatus composed of the composite material is a substrate mounting stage (more specifically, a wafer stage) having an electrostatic chucking function and provided with temperature control means, which has the same structure as that of the embodiment 3.

As the composite material in the embodiment 9 and the manufacturing method thereof, the substrate processing apparatus of the embodiment 1 of the invention and the manufacturing method thereof, and the substrate mounting stage and the manufacturing method thereof can be the same as in the embodiment 2, detailed description is omitted here. While the aluminum-based material comprising the matrix has been described as comprising aluminum in the above description, the aluminum-based material composing the matrix may comprise aluminum and silicon (for example, 80 vol. % Al-20 Vol. % Si). By selecting an aluminum-based material comprising aluminum and silicon, it is possible to control the linear expansion coefficient $\alpha_1$ of the matrix, and further reduce the difference from the linear expansion coefficient $\alpha_2$ of the ceramics layer. The ceramics layer may comprise aluminum nitride (AlN) in place of comprising $Al_2O_3$.

Since the sputtering unit of the embodiment 9 while is the substrate processing apparatus of the embodiment 1 of the invention, provided with such a substrate mounting stage 10B forming a part of the substrate processing apparatus composed of the composite material can be regarded as substantially the same as the CVD unit described above in the embodiment 7, of which a conceptual view is shown in FIG. 10, except for the piping 15 and the related components, detailed description is omitted here. Also, the substrate processing method (with sputtering including soft etching) of the embodiment 1 of the invention using the substrate processing apparatus of the embodiment 9 can be substantially the same as the substrate processing method described above in the embodiment 7. Detailed description is therefore omitted here. Temperature control of the substrate mounting stage 10B can be accomplished through control of power supply to the heater 14A by detecting the temperature detected by the fluorescent fiber thermometer 36 by means of a controller (PID controller) 38.

(Embodiment 10)

The embodiment 10 relates to the composite material of the invention and the manufacturing method thereof, the substrate processing apparatus and the manufacturing method thereof, the substrate mounting stage and the manufacturing method thereof, and the substrate processing method of the embodiment 2 of the invention (with plasma etching and plasma CVD).

More particularly, the matrix in the embodiment 10 is composed of a matrix comprising a ceramics member, made of cordierite ceramics, having a texture filled with an aluminum-based material comprising aluminum and silicon, and a ceramics layer comprising $Al_2O_3$ provided on the surface of the matrix. Or, the composite material forming a part of the processing apparatus for processing the substrate is composed of a matrix comprising a ceramics member, made of cordierite ceramics, having a texture filled with an aluminum-based material comprising aluminum and silicon, and a ceramics layer comprising $Al_2O_3$ provided on the surface of the matrix. Further, a part of the substrate processing apparatus for processing the substrate of the embodiment 10 is composed of a composite material consisting of a matrix comprising a ceramics member, made of cordierite ceramics, having a texture filled with an aluminum-based material comprising aluminum and silicon, and a ceramics layer comprising $Al_2O_3$, provided on the surface of the matrix. In the substrate processing apparatus of the embodiment 10, plasma CVD is applied to the substrate. A part of the substrate processing apparatus composed of the composite material is a side wall of the substrate processing apparatus in the embodiment 10. The matrix has a hollow cylindrical shape.

Figure 13:
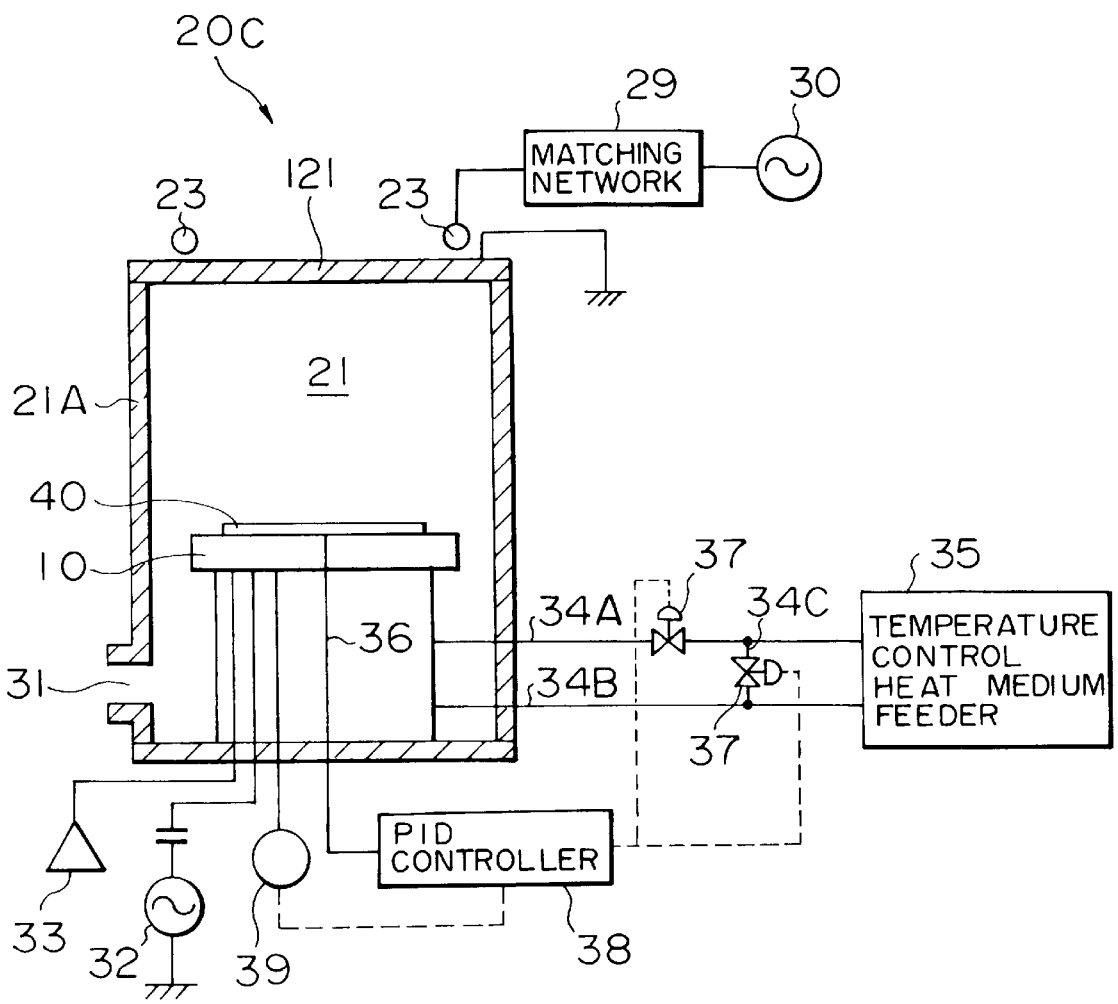
FIG. 13 is a conceptual view of a dry etching unit which is a substrate processing apparatus in an embodiment 10 of the invention.

FIG. 13 is a conceptual view of the substrate processing apparatus of the embodiment 10 which is the substrate processing apparatus of the embodiment 2 of the invention, a part of which (side wall) is composed of the composite material (a dry etching unit 20C, which is hereinafter simply referred to as the "etching unit 20C"). A schematic sectional view of the side wall is illustrated in FIG. 14(A).

Figure 14A:
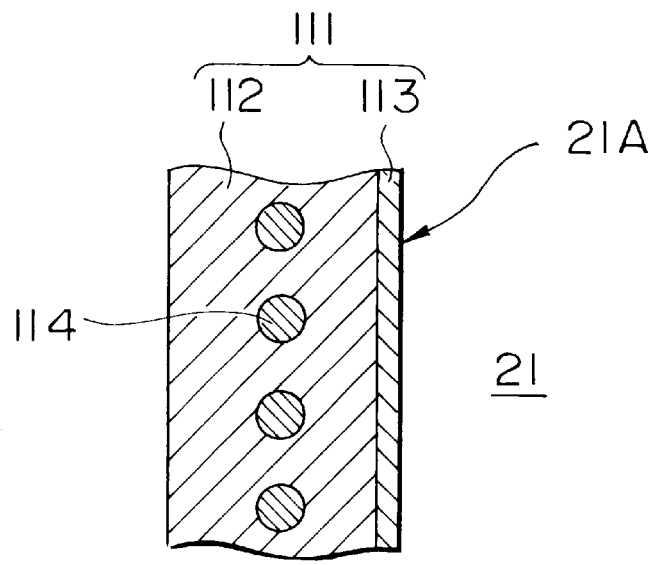
FIG. 14 consisting of FIGS. 14A and 14B is a schematic sectional view of the side walls of a dry etching unit which is a substrate processing apparatus in an embodiment 10 of the invention.

The etching unit 20C shown in FIG. 13 is an ICP-type dry etching unit, and as shown in FIG. 14(A), the side wall 21A of the chamber 21 is composed of the composite material 111. An RF antenna 23 is provided in a loop shape on a ceiling plate 121 (made of quartz) of the chamber 21, and connected to a power source 30 via a matching network 29.

In the embodiment 10, as in the embodiment 1, the ceramics member composing the matrix 112 comprises cordierite ceramics. The aluminum-based material composing the matrix 112 comprises aluminum (Al) and silicon (Si). In the embodiment 10, the aluminum-based material contains 20 vol. % silicon relative to the aluminum-based material. The ceramics member is a fired mixture of cordierite ceramics powder and cordierite ceramics fiber, and the ratio of the cordierite ceramics fiber in this fired mixture is 3 vol. %. The cordierite ceramics powder has an average particle size of 10 μm. The cordierite ceramics fiber has an average diameter of 5 μm and an average length of 1 mm. The ceramics member has a porosity of about 50%, and a pore diameter of about 1 to 2 μM. The volumetric ratio of cordierite ceramics to the aluminum-based material is therefore about 1/1. The matrix 112 having the configuration as described above has a linear expansion coefficient of about $10.6 \times 10^{-6}$/K on the average over temperature of 100 to 300° C., i.e., $\alpha_1=10.6$. Because the volumetric ratio of cordierite ceramics to the aluminum-based material is about 1/1, the matrix 112 has an electric conductivity and a thermal conductivity closer to those of a metal than those of a pure ceramics. Therefore, the side wall 21A manufactured from such matrix 112 has a higher thermal conductivity than that of aside wall made of a ceramics alone.

The material composing the ceramics layer 113 comprises $Al_2O_3$ added with about 2.5 wt. % $TiO_2$. The ceramics layer 113 having a thickness of about 0.2 mm is formed by the flame spraying method on the surface of the matrix 112. The ceramics layer 113 having the chemical composition as described above has a linear expansion coefficient of about $9 \times 10^{-6}$/k on the average over temperatures of 100 to 300° C., i.e., $\alpha_2$ is about 9. The ceramics layer 113 has thus a linear expansion coefficient $\alpha_2$ satisfying $(\alpha_1-3) \leq \alpha_2 \leq (\alpha_1+3)$. $Al_2O_3$ itself has a linear expansion coefficient of about $8 \times 10^{-6}$/K.

A heater 114 comprising a sheath heater is provided in the interior of the side wall 21A. The heater 114 is composed of a heater main body (not shown), and a sheath pipe (not shown) for protecting the heater main body, arranged outside the heater main body. The heater 114 is connected via a wiring not shown to a power source. Thermal expansion of the heater 114 affects the side wall 21A. It is therefore desirable to use a material having a linear expansion coefficient close to the values for the ceramics layer 113 and the matrix 112. More specifically, the sheath pipe should preferably be made of a material having a linear expansion coefficient within a range of from $9 \times 10^{-6}$/K such as titanium or stainless steel. That is, the linear expansion coefficient $\alpha_H$ of the material composing the heater 114 (material of the sheath pipe in contact with the matrix 112) [unit: $10^{-6}$/K] should preferably satisfy $(\alpha_1-3) \leq \alpha_2 \leq (\alpha_1+3)$. There is no particular limitation of the linear expansion coefficient of the main body of the heater 114, which never affects the side wall 21A. As required, a piping 15 described above as to the embodiment 1 may be arranged in the interior of the side wall 21A, in addition to arrangement of the heater 114. In place of arranging the heater 114, a piping 15 described above as to the embodiment 1 may be arranged in the interior of the side wall 21A.

The manufacturing method of the side wall 21A in the embodiment 10, forming a part of substrate processing apparatus composed of the composite material 111 will be described below as an example. The composite material 111 is prepared by (A) a step of filling the texture of the ceramics member with an aluminum-based material, thereby preparing a matrix comprising the ceramics member having the texture filled with the aluminum-based material, and (B) a step of providing a ceramics layer on the surface of the matrix. In the embodiment 10, this process (A) comprises the step of placing the ceramics member comprising porous cordierite ceramics into a vessel (mold), casting an aluminum-based material comprising molten aluminum and silicon into the vessel (mold), and filling the ceramics member with the aluminum-based material by the high-pressure casting method.

In the embodiment 10 also, porous annular fiber boards available by sintering cordierite ceramics powder and cordierite ceramics fiber were used as the porous cordierite ceramics composing the ceramics member. The fiber boards are the same as those used in the embodiment 1. For the manufacture of the side wall 21A, a plurality of fiber boards formed into a prescribed shape (annular) are first prepared. Flanges and holes for attaching various pipings and the like as required should preciously provided in the fiber boards. A groove for arranging the heater 114 is previously provided. These annular fiber boards are piled up in the vessel (mold). The heater 114 is as required arranged between the annular fiber boards. The fiber boards are preliminarily heater to about 800° C., and then, the aluminum-based material (80 vol. % Al-20 vol. % Si) melted by heating to about 800° C. into the vessel (mold). The high-pressure casting method of applying a high pressure of about 1 ton/cm² is carried out in the vessel (mold). As a result, the porous fiber boards, i.e., the texture of the ceramics member, are filled with the aluminum-based material. The matrix 112 is prepared by cooling the aluminum-based material for solidification.

Then, the inner surface of the hollow cylindrical matrix 112 is polished. A mixed powder having a particle size of about 10 μm prepared by mixing about 2.5 WT. % $TiO_2$ with $Al_2O_3$ in a molten state is sprayed by the vacuum flame spraying method and solidified. It is thus possible to form a ceramics layer 113 having a thickness of about 0.2 mm by the flame spraying method. Prior to forming the ceramics layer 113, an undercoat layer for flame spraying may be formed by flame-spraying nickel containing about 5 wt. % aluminum (Ni-5 wt. % al) in advance and the ceramics layer 113 may be formed by the flame spraying method on this flame-sprayed undercoat layer.

Figure 14B:
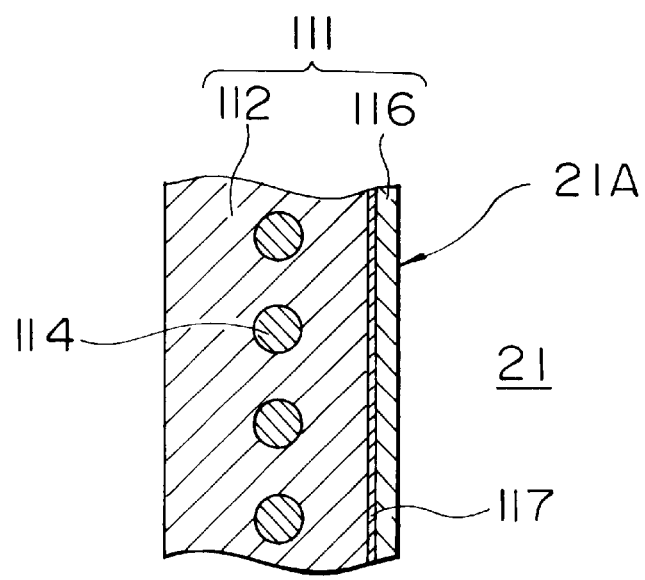

As shown in the schematic sectional view of FIG. 14(B), the ceramics layer may be formed on the surface of the matrix 112, not by the flame spraying method, but by brazing. In this case, a ceramics layer 116 comprising an $Al_2O_3$ ceramics annular member prepared by the sintering method may be attached to the surface of the matrix 112 by the brazing method using an Al—Mg—Ge brazing material at a temperature, for example, of about 600° C.

In the thus obtained side wall 21A, the matrix 112 is composed of a material prepared by filling a porous cordierite ceramics fiber board with an aluminum-based material comprising 80 vol. % al and 20 vol. % Si, and the matrix 112 has a linear expansion coefficient close to the linear expansion coefficient of the ceramics layer 113. Therefore, the matrix 112 and the ceramics layer 113 exhibit almost the same extent of expansion or contraction as a result of heating or cooling of the side wall 21a. It is therefore possible to ensure avoidance of occurrence of damages to the ceramics layer 113 such as cracks upon bringing the side wall to a high temperature or from a high temperature to room temperature, caused by the difference in linear expansion coefficient between these different materials. Because of the excellent heat conductivity of the composite material 111, the heater 114 can efficiently heat the side wall 21A.

In the plasma CVD unit (see FIG. 8) which is the substrate processing apparatus described as to the embodiment 4, the side wall 61A may be manufactured with the composite material 111 in place of an aluminum block. This permits performance of the substrate processing method (plasma CVD processing) of the embodiment 2 of the invention by the case such a substrate processing apparatus.

In the embodiment 10, etching is applied to a Cu fiber of the like under the same conditions as in the embodiment 1 in a state in which the side wall 21A is heated by the heater 114 to 350° C., and a silicon semiconductor substrate 40 is held by and secured to the substrate mounting stage 10 described above as to the embodiment 1, and no damage occurs to the ceramics layer 113 such as cracks. Since the side wall 21A is heated to 350° C., it is possible to prevent the precursor from accumulating on the surface of the side wall 21A. In general, temperature of the side wall 21A should preferably be higher than temperature of the substrate, with a view to preventing the precursor, or the like from accumulating on the surface of the side wall 21A.

Or, in the embodiment 10, CVD processing is carried out under the same conditions as in the embodiment 4 in a state in which the side wall 21A is heated by the heater 114 to 400° C., and the silicon semiconductor substrate 40 is held by and secured to the substrate mounting stage 10 described above as to the embodiment 1, and no damage occurs to the ceramics layer 113 such as cracks. Since the side wall 21A us heated to 400° C., it is possible to prevent deposits from accumulating on the surface of the side wall 21A.

In the above description of the embodiment 10, the substrate processing apparatus having the substrate mounting stage 10 described as to the embodiment 1 has been used. As required, however, the side wall or the ceiling plate of a substrate processing apparatus having the substrate mounting stage 10A or 10B described above as to the embodiment 2 or 3 may comprise the composite material of the invention.

(Embodiment 11)

The embodiment 11 is a variant of the embodiment 10. The embodiment 11 differs from the embodiment 10 in that the ceramics member composing the matrix in the composite material comprises aluminum nitride, and the aluminum-based material composing the matrix comprises aluminum.

Figure 15A:
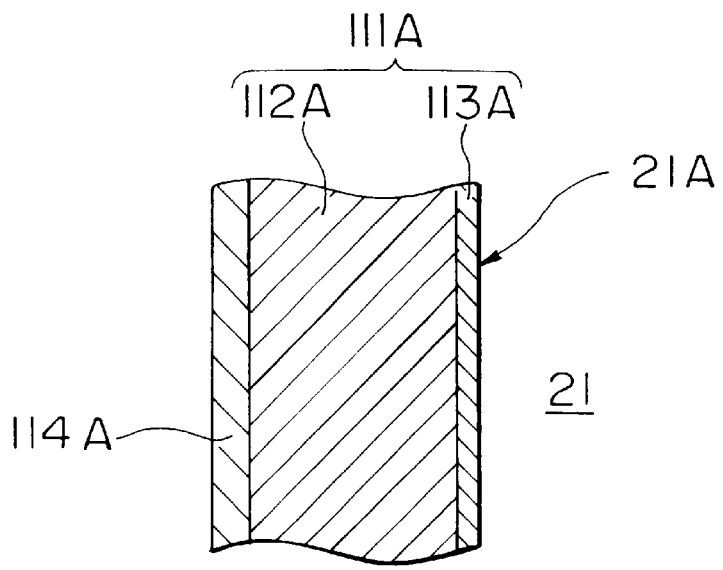
FIG. 15 consisting of FIGS. 15A and B is a schematic view of the side walls of a dry etching unit which is a substrate processing apparatus in an embodiment 11 of the invention.

FIG. 15(A) is a schematic sectional view of the side wall 21A of the embodiment 1, which is a part of the substrate processing apparatus composed of the composite material 111A. This side wall 21A is composed of the composite material 111A as well. The composite material 111A consists of a matrix 112A comprising a ceramics member having a texture filled with the aluminum-based material, and a ceramics layer 113A provided on the surface of the matrix 112A. The matrix 112A has a hollow cylindrical shape. Unlike the embodiment 10, a heater 114A comprising a PBN heater is attached to the outer surface of the matrix 112A. As a result, it is possible to conduct temperature control of the matrix 112A within a range of from room temperature to about 400° C.

In the embodiment 11, the ceramics member composing the matrix 112A comprises aluminum nitride (AlN). The aluminum-based material composing the matrix comprises aluminum (Al). A volumetric ratio of aluminum nitride to aluminum is selected so as to satisfy $(\alpha_1-3) \leq \alpha_2 \leq (\alpha_1+3)$, or more specifically, the volumetric ratio of aluminum nitride to aluminum is 70/30. The matrix 112A has a linear expansion coefficient of $8.7 \times 10^{-6}$/K on the average over temperature of 100 to 300° C., i.e., $\alpha_1=8.7$. The material composing the ceramics layer is $Al_2O_3$ added with about 1.5 wt. % $TiO_2$. The ceramics layer 113A is formed by the flame spraying method on the surface of the matrix 112A. While $Al_2O_3$ has a linear expansion coefficient of $8 \times 10^{-6}$/K, addition of $TiO_2$ to $Al_2O_3$ brings the linear expansion coefficient to a value within a range of from about $8 \times 10^{-6}$/K on the average over temperature of 100 to 300° C. ($\alpha_2$=about 8–9), which is almost the same as the linear expansion coefficient $\alpha_1$ of the matrix 112A. As a result, it is possible to effectively prevent occurrence of damages to the ceramics layer 113A such as cracks caused by a change in temperature in heating to a high temperature, for example, of the matrix 112A.

The manufacturing method of the side wall 21A which is a part of the substrate processing apparatus composed of the composite material 111A will be described below as an example. The composite material 111A is basically prepared; as in the embodiment 10, by (A) a step of filling the texture of a ceramics member with an aluminum-based material, thereby preparing a matrix comprising the ceramics member having the texture filled with the aluminum-based material, and (B) a step of providing a ceramics layer on the surface of the matrix. In the embodiment 11, this process (A) comprises a step of causing an aluminum-based material comprising molten aluminum to penetrate in a non-pressurized state into a ceramics member formed from aluminum nitride particles in accordance with the non-pressurized metal penetrating method.

More particularly, a ceramics member which is a preform prepared by forming AlN particles is prepared by forming AlN particles having an average particle size of 10 μm by the sludge forming method, and then firing the formed product at about 800° C. As required, flanges and holes for attaching various pipings and the like are previously provided in the ceramics member. This hollow cylindrical ceramics member is preliminarily heated to about 800° C., and aluminum melted by heating to about 800° C. is caused to penetrate in a non-pressurized state into the ceramics member. As a result, it is possible to prepare a matrix 112A comprising 70 vol. % AlN and 30 vol. % Al. Then, the matrix 112A is formed, for example, into the shape of the hollow cylindrical side wall 21A. The inner surface of the matrix 112A thus obtained is then polished. Subsequently, a mixed powder having a particle size of about 10 μm prepared by mixing about 1.5 wt. % $TiO_2$ wit $Al_2O_3$ is sprayed in a molten state onto the polished surface, and solidified. This permits formation of a ceramics layer 113A having a thickness of about 0.2 mm. Then, the heater 114A comprising a PBN heater is attached to the outer surface of the matrix 112A, thereby giving the side wall 21A. Prior to forming the ceramics layer 113A, nickel containing, for example, about 5 wt. % aluminum (Ni-5 wt. % Al) may be flame-sprayed to form an undercoat layer for flame spraying, and the ceramics layer 113A may be formed by the flame spraying method on the flame-sprayed undercoat layer.

In the thus prepared side wall 21A, the ceramics layer 113A has almost the same linear expansion coefficient $\alpha_2$ as the linear expansion coefficient $\alpha_1$ of the matrix 112A. As a result, any change in temperature resulting from heating to a high temperature of the matrix 112A never causes damages to the ceramics layer 113A such as cracks. In the manufacturing method of the composite material, the manufacturing method of the substrate processing apparatus and the manufacturing method of the substrate mounting stage of the embodiment 11, it is possible to select a relationship between the linear expansion coefficient $\alpha_1$ of the matrix 112A and the linear expansion coefficient $\alpha_2$ of the ceramics layer 113A, which satisfies $(\alpha_1-3) \leq \alpha_2 \leq (\alpha_1+3)$ by adjusting the volumetric ratio of aluminum nitride to aluminum, and further, as required, by adjusting the ratio of $TiO_2$ added to $Al_2O_3$ in the ceramics layer 113A, thereby permitting effective prevention of occurrence of damages to the ceramics layer 113A such as cracks caused by a change in temperature of the side wall 21A.

Figure 15B:
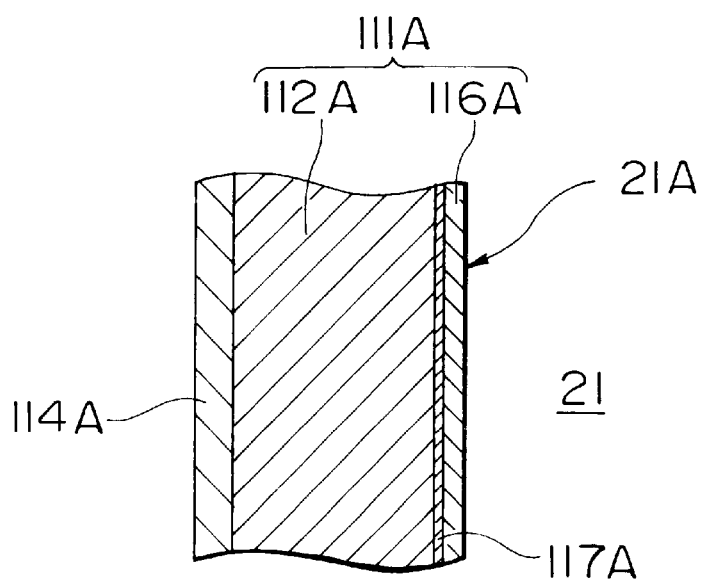

As shown in the schematic sectional view of FIG. 15(B), the ceramics layer may be provided on the surface of the matrix 112A, not by the flame spraying method, but by brazing. In this case, it suffices to attach a ceramics layer 116A comprising an $Al_2O_3$ ceramics annular member prepared by the sintering method to the surface of the matrix by the brazing method using an Al—Mg—Ge brazing material 117A at a temperature, for example, of about 600° C.

The dry etching unit of the embodiment 11 which is the substrate processing apparatus of the embodiment 2 of the invention, provided with a side wall 21A which is a part of the substrate processing apparatus composed of the composite material 111A can be substantially the same as the dry etching unit described as to the embodiment 10, of which a conceptual view is shown in FIG. 13, except the piping 15 and the related components. Detailed description is therefore omitted here.

In the plasma CVD unit (see FIG. 8) which is the substrate processing apparatus described above as to the embodiment 4, by manufacturing the side wall 61A from the composite material 111A in place of the aluminum block, it is possible to carry out the substrate processing method (plasma CVD) of the embodiment 2 of the invention by the use of such a substrate processing apparatus.

In the embodiment 11, etching of a Cu film or the like is applied under the same conditions as in the embodiment 1 in a state in which the side wall 21A is heated by the heater 14A to 400° C., and a silicon semiconductor substrate 40 is held by, and secured to, the substrate mounting stage 10A described above as to the embodiment 2. No damage to the ceramics layer 113A such as cracks is caused. Since the side wall is heated to 400° C., it is possible to prevent the precursor from accumulating on the surface of the side wall 21A.

Or, in the embodiment 11, CVD processing is carried out under the same conditions as in the embodiment 4 in a state in which the side wall 21A is heated by the heater 114 to 500° C., and the silicon semiconductor substrate 40 is held by and secured to the substrate mounting stage 10A described above as to the embodiment2, and no damage occurs to the ceramics layer 113A such as cracks. Since the side wall 21A is heated to 500° C., it is possible to prevent deposits from accumulating on the surface of the side wall 21A.

In the above description of the embodiment 11, the substrate processing apparatus having the substrate mounting stage 10 described as to the embodiment 2 has been used. As required, however, the side wall or the ceiling plate of a substrate processing apparatus having the substrate mounting stage 10A or 10B described above as to the embodiment 1 or 3 may comprise the composite material of the invention. The aluminum-based material composing the matrix may comprise aluminum and silicon, in place of aluminum alone. By using an aluminum-based material comprising aluminum and silicon (for example, 80 vol. % Al-20 vol. % Si), it is possible to control the linear expansion coefficient $\alpha_1$ of the matrix, and further reduce the difference from the linear expansion coefficient $\alpha_2$ of the ceramics layer. The ceramics layer may comprise aluminum nitride (AlN) in place of $Al_2O_3$.

(Embodiment 12)

The embodiment 12 is also a variant of the embodiment 10. The embodiment 12 differs from the embodiment 10 in that the ceramics member composing the matrix in the composite material comprise silicon carbide, and the aluminum-based material composing the matrix comprises aluminum.

A schematic sectional view of the side wall in the embodiment 12, forming a part of the substrate processing apparatus composed of the composite material has the same structure a that shown in FIG. 15(A) or FIG. 15(B).

In the embodiment 12, the ceramics member composing the matrix 112A comprises silicon carbide (SiC). The aluminum-based material composing the matrix comprises aluminum (Al). A volumetric ratio of silicon carbide to aluminum is selected so as to satisfy $(\alpha_1-3) \leq \alpha_2 \leq (\alpha_1+3)$, or more specifically, the volumetric ratio of silicon carbide to aluminum is 70/30. The matrix 112A has a linear expansion coefficient of $6.2 \times 10^{-6}$/K on the average over temperature of 100 to 300° C., i.e., $\alpha_1 = 6.2$. The material composing the ceramics layer comprises $Al_2O_3$. The ceramics layer 113A is formed by the flame spraying method on the surface of the matrix 112A. $Al_2O_3$ has a linear expansion coefficient of about $8 \times 10^{-6}$/K ($\alpha_2$=about 8), which is a value close to the linear expansion coefficient $\alpha_1$ of the matrix 112A. As a result, it is possible to effectively prevent occurrence of damages to the ceramics layer 113A such as cracks caused by a change in temperature in heating to a high temperature, for example, of the matrix 112A.

Because the side wall 21A forming a part of the substrate processing apparatus composed of the composite material 111A can be manufactured in accordance with the high-pressure casting method described above as to the embodiment 10 or the non-pressurized metal penetrating method described above as to the embodiment 11, detailed description is omitted here. A ceramics member which is a preform prepared by forming SiC particles is prepared by forming a mixture of SiC having an average particle size of 15 μm and SiC particles having an average particle size of 60 μm at a volumetric ratio of 1:4 by the sludge forming method, and then, firing the formed mixture at a temperature of about 800° C. As required, flanges and holes for attaching various pipings and the like are previously provided in the ceramics member. This hollow cylindrical ceramics member is preliminarily heated to about 800° C., and aluminum melted by heating to about 800° C. is caused to penetrate into the ceramics member. This makes it possible to manufacture a matrix 112A comprising 70 vol. % SiC and 30 vol. % Al. Or, it is possible to manufacture a side wall 21A by preparing a preform comprising SiC formed into a prescribed shape, preliminarily heated the ceramics member comprising this preform, then casting aluminum melted by heating to about 800° C. into the vessel (mold), and applying a high pressure of about 1 ton/cm² into the vessel (mold), in accordance with the high-pressure casting method.

While the aluminum-based material composing the matrix has comprised aluminum in the above description, the aluminum-based material composing the matrix may comprise aluminum and silicon (for example, 80 vol. % Al-20 vol. % Si). By using the aluminum- based material comprising aluminum and silicon, it is possible to control the linear expansion coefficient $\alpha_1$ of the matrix, and further reduce the difference from the linear expansion coefficient $\alpha_2$ of the ceramics layer. The ceramics layer may comprise aluminum nitride (AlN) in place of $Al_2O_2$.

(Embodiment 13)

The embodiment 13 relates to the composite material of the invention and the manufacturing method thereof, the substrate processing apparatus of the embodiment 3 of the invention and the manufacturing method thereof, the substrate mounting stage and the manufacturing method thereof, and the substrate processing method (plasma etching) of the embodiment 3.

More particularly, the matrix in the embodiment 13 is composed, as in the embodiment 1, of a matrix consisting of a ceramics member comprising cordierite ceramics, having a texture filled with an aluminum-based material comprising aluminum and silicon, and a ceramics layer comprising $Al_2O_3$ provided on the surface of the matrix. Or, the composite material forming a part of the processing apparatus for processing the substrate is composed of a matrix consisting of a ceramics member comprising cordierite ceramics, having a texture filled with an aluminum-based material comprising aluminum and silicon, and a ceramics layer comprising $Al_2O_3$ provided on the surface of the matrix. Further, a part of the substrate processing apparatus for processing the substrate of the embodiment 13 is composed of a composite material comprising a matrix consisting of a ceramics member comprising cordierite ceramics, having a texture filled with an aluminum-based material comprising aluminum and silicon, and a ceramics layer comprising $Al_2O_3$ provided on the surface of the matrix. In the substrate processing apparatus of the embodiment 13, plasma etching is applied to the substrate. A part of the substrate processing apparatus composed of the composite material is a parallel flat upper opposed electrode.

Figure 16:
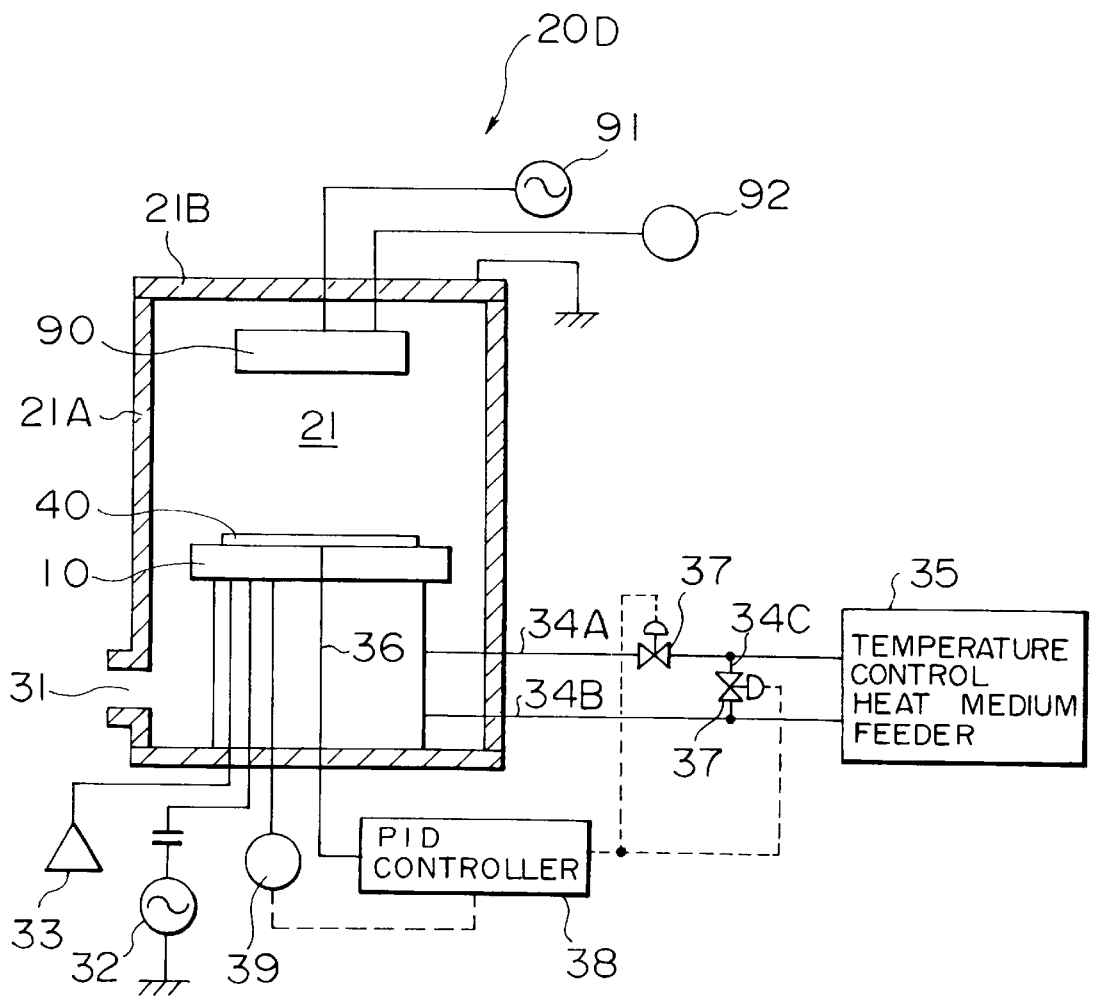
FIG. 16 is a conceptual view of a dry etching unit which is a substrate processing apparatus in an embodiment 13 of the invention.
Figure 17A:
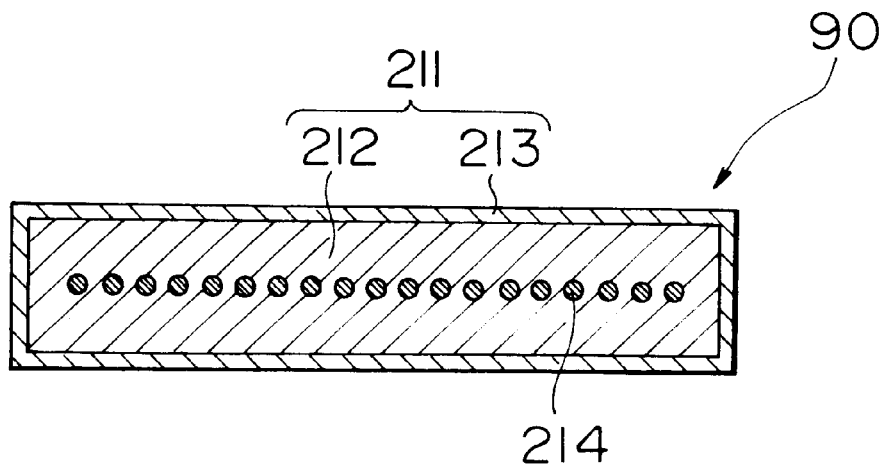
FIG. 17 consisting of FIGS. 17A and B is a schematic sectional view of a parallel and flat upper opposed electrode of the dry etching unit which is the substrate processing apparatus in the embodiment 13 of the invention.

FIG. 16 is a conceptual view of the substrate processing apparatus of the embodiment 13 (a dry etching unit 20D, hereinafter simply referred to as the "etching unit 20D") which is the substrate processing unit of the embodiment 3 of the invention, having a part thereof (parallel flat upper opposed electrode) composed of the composite material. A schematic sectional view of the upper opposed electrode is illustrated in FIG. 17(A).

In this etching unit 20D, the parallel flat upper opposed electrode 90 is arranged above in a chamber 21, in opposition to the substrate mounting stage corresponding to the lower electrode. The upper opposed electrode 90 is connected to an RF power source 91. A side wall 21A and a ceiling plate 21B of the chamber 21 should preferably comprise composite material 111 or 111A as in the embodiments 10 to 12. As required, any of the substrate mounting stages 10, 10A and 10B described above in the embodiments 1 to 3 may be used, or a conventional substrate mounting stage (wafer stage) may be used.

In the embodiment 13, as in the embodiment 1, the ceramics member composing the matrix 212 comprises cordierite ceramics. The aluminum-based material composing the matrix comprises aluminum (Al) and silicon (Si). In the embodiment 13, the aluminum-based material contains 20 vol. % silicon relative to the aluminum-based material. The ceramics member is a fired mixture of cordierite ceramics powder and cordierite ceramics fiber, and the ratio of cordierite ceramics fiber in this fired mixture is 5 vol. %. Cordierite ceramics powder has an average particle size of 10 μm. cordierite ceramics fiber has an average diameter of 3 μm and an average length of 1 mm. The ceramics member has a porosity of about 50%, and a pore has a diameter of about 1 to 2 μm. Therefore, the volumetric ratio of cordierite ceramics to the aluminum-based material is about 1/1. The matrix 212 having the configuration as described above has a linear expansion coefficient of about $10.6 \times 10^{-6}$/K on the average over temperatures of 100 to 300° C., i.e., $\alpha_1$=10.6. Since the volumetric ratio of cordierite ceramics to the aluminum-based material is about 1/1, the matrix 212 has an electric conductivity and a thermal conductivity closer to those of a metal then those of a pure ceramics. Therefore, a high frequency can be applied with no problem to the upper opposed electrode 90 made of such matrix 212.

The material composing the ceramics layer 213 comprises $Al_2O_3$ added with about 2.5 wt. % $Tio_2$. The ceramics layer 213 having a thickness of about 0.2 mm is formed by the flame spraying method on the surface of the matrix 212. The ceramics layer 213 having the composition as described above has a linear expansion coefficient of about $9 \times 10^{-6}$/K on the average over temperature of 100 to 300° C., i.e., $\alpha_2$=about 9, and thus the linear expansion coefficient $\alpha_2$ of the ceramics layer 213 satisfies $(\alpha_1-3) \leq \alpha_2 \leq (\alpha_1+3)$. $Al_2O_3$ itself has a linear expansion coefficient of about $8 \times 10^{-6}$/K.

In the interior of the upper opposed electrode 90, a heater 214 comprising a known sheath heater is arranged. The heater 214 is composed of a heater main body (not shown) and a sheath pipe (not shown) arranged outside the heater main body and protecting the heater main body. The heater 214 is connected via a wiring not shown to a power source 92. Thermal expansion of the heater 214 affects the upper opposed electrode 90. Therefore, it is desirable to use a material having a linear expansion coefficient close to that of the ceramics layer 213 and the matrix 212. More specifically, the sheath pipe should preferably be made of a material having a linear expansion coefficient within a range of from $9 \times 10^{-6}$/K, such as titanium or stainless steel. That is, the material composing the heater 214 (material of the sheath pipe in contact with the matrix 212) should preferably have a linear expansion coefficient satisfying $(\alpha_1-3) \leq \alpha_2 \leq (\alpha_1+3)$. There is no particular limitation on the linear expansion coefficient of the heater 214 main body since it never affects the upper opposed electrode 90.

The manufacturing method of the upper opposed electrode 90 in the embodiment 13 forming a part of the substrate processing apparatus composed of the composite material will now be described below. The composite material 111 is prepared by (A) a step of filling the texture of the ceramics member with the aluminum-based material, thereby preparing the matrix comprising the ceramics member having the texture filled with the aluminum-based material, and (B) a step of providing the ceramics layer on the surface of the matrix. In the embodiment 13, this process (A) comprises the steps of arranging the ceramics member comprising porous cordierite ceramics in a vessel (mold), casting the aluminum-based material comprising molten aluminum and silicon into the vessel (mold), and filling the ceramics member with the aluminum-based material by the high-pressure casting method.

In the embodiment 13 also, a porous annular fiber board which is a sinter available by sintering cordierite ceramics powder and cordierite ceramics fiber is used as the porous cordierite ceramics forming the ceramics member. The same fiber boards as in the embodiment 1 are employed. In order to manufacture upper opposed electrode 90, a first fiber board formed into a prescribed shape (rectangular) is provided. A groove for arranging the heater 214 is previously worked in the first fiber board. A second fiber board is provided apart from the first fiber board. The first fiber board is arranged on the bottom of the vessel (mold) and the heater 214 is arranged in the groove provided on the first fiber board. Then, the second fiber board is placed on the first fiber board. The fiber boards are preliminarily heated to about 800° C., and then, the aluminum-based material (80 vol. % AL-20 vol. % Si) melted by heating to 800° C. is cast into the vessel (mold). The high-pressure casting method comprising applying a high pressure of about 1 ton/cm$^2$ to the interior of the vessel (mold) is carried out. As a result, the porous fiber boards, i.e., the texture of the ceramics member, are filled with the aluminum-based material. The matrix 212 is manufactured by cooling and solidifying the aluminum-based material.

The, the surface of the rectangular matrix 212 is polished. Subsequently, a mixed powder having a particle $Al_2O_3$ in a molten state is sprayed onto the polished surface by the vacuum flame spraying method, and solidified. As a result, the ceramics layer 213 having a thickness of about 0.2 mm can be formed by the flame spraying method. Prior to forming the ceramics layer 213, nickel containing about 5 wt. % aluminum (Ni-5 wt. % Al) may be previously flame-sprayed as an undercoat layer for flame spraying, and the ceramics layer 213 may be formed by the flame spraying method on this flame-spray undercoat layer.

Figure 17B:
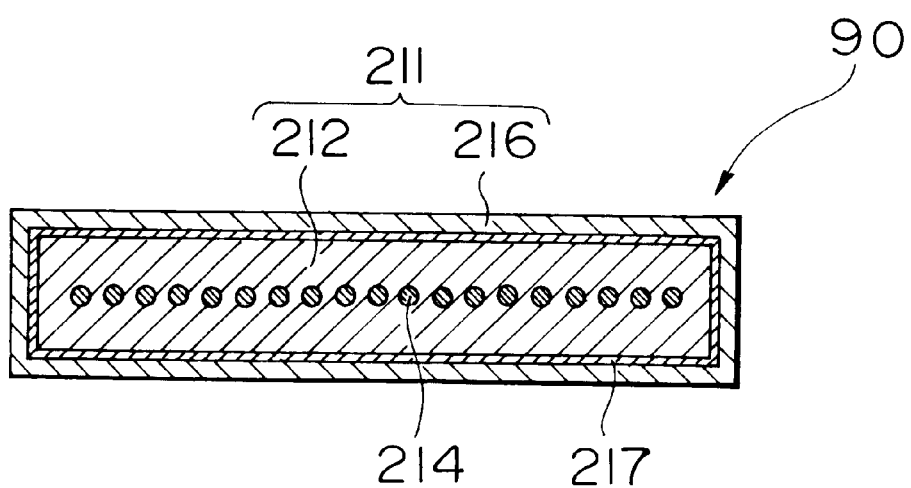

As shown in a schematic sectional view of FIG. 17(B), the ceramics layer may be provided on the surface of the matrix 212, not by the flame spraying method, but by brazing. In this case, it suffices to attach a ceramics layer 216 comprising an $Al_2O_3$ ceramics plate made by the sintering method to the surface of the matrix 212 by brazing by the use of an Al—Mg—Ge brazing material 217 at a temperature of about 600° C.

In the thus obtained upper opposite electrode 90, the matrix 212 is composed of a material obtained by filling the porous cordierite ceramics fiber boards with the aluminum-based material comprising 80 vol. % Al and 20 vol. % Si. The matrix 212 has a linear expansion coefficient of a value close to that of the ceramics layer 213. Therefore, the matrix 212 and the ceramics layer 213 exhibit almost the same extent of expansion or contraction resulting from heating or cooling. It is therefore possible to ensure avoidance of occurrence of damages to the ceramics layer 213 such as cracks, upon heating to a high temperature or upon bringing the upper opposite electrode 90 from a high temperature to room temperature, caused by the difference in linear expansion coefficient between these different materials. Since the composite material 211 is excellent in thermal conductivity, the upper opposed electrode 90 can be efficiently heated by the heater 214.

In the embodiment 13, a wiring groove is formed in the undercoat insulating layer comprising $SiO_2$, formed on the silicon semiconductor substrate. Dry etching of the undercoat insulating layer is carried out under conditions shown in Table 6. The upper opposed electrode 90, the side wall 21A and the ceiling plate 21B are kept at a temperature of 400° C. by the heaters 214 and 114.

TABLE 6

| | |
|---|---|
| Etching gas: | $C_4F_8/CF_4/CO/AR/O_2$ = 10/2/50/150/2 sccm |
| Pressure: | 3 Pa |
| Power from power source 90: | 1,500 W (24 MHz) |
| Power from power source 32: | 800 W (2 MHz) |
| Silicon semiconductor substrate temperature: | 50° C. |
| Upper opposed electrode temperature: | 400° C. |
| Side wall and ceiling plate temperature: | 400° C. |

This etching never causes occurrence of damages to the ceramics layer 113 and 213 composing the upper opposite electrode 90, the side wall 21A and the ceiling plated 21B such as cracks. In a conventional etching unit, the precursor of fluorocarbon polymer produced during discharging accumulates on the upper opposite electrode and the side wall, thus causing fluctuation of the ratio carbon/fluorine in plasma during etching. In the embodiment 13, however, it is possible to heat the upper opposite electrode 90, the side wall 21A and the ceiling plate 21B to a high temperature and keep them at a high temperature. It is therefore possible to effectively prevent accumulation of the precursor on the upper opposite electrode, the chamber side wall or the ceiling plate. As a result, it is possible to inhibit fluctuation of the ratio carbon/fluorine in plasma during etching, and to carry out dry etching stably at a high accuracy. In addition, because almost no fluorocarbon polymer accumulates on the upper opposite electrode, the chamber side wall or the ceiling plate, repetition of etching never causes deterioration of the particle level.

The upper opposite electrode may be manufactured also from a composite material composed of a matrix comprising a ceramics member consisting of aluminum nitride, an aluminum-based material composing the matrix comprising aluminum or aluminum and silicon, and a material composing the ceramics layer comprising $Al_2O_3$ or AlN, in accordance with the manufacturing method of the composite material described above as to the embodiment 2.

The upper opposite electrode may also be manufactured from a composite material composed of a matrix comprising a ceramics member consisting of silicon carbide, an aluminum-based material composing the matrix comprising aluminum or aluminum and silicon, and a material composing the ceramics layer comprising $Al_2O_3$ or AlN, in accordance with the manufacturing method of the composite material described above as the embodiment 3.

The present invention has been described above means of the embodiments of the invention. The invention is no however limited to these embodiments. While the heater has been built in the matrix in the embodiment 1 of the invention, the heater may be attached to a surface of the matrix opposite to the side provided with the ceramics layer. A heater or a piping may be incorporated in the matrix described above in the embodiment 2 or 3. The structures described in the embodiments of the dry etching unit, the plasma CVD unit and the sputtering unit are only examples, and the design thereof may be appropriately modified. The various processing conditions described in the embodiments of the invention are also example, and may be appropriately modified. Further, the compositions of the composite material and the physical properties of the cordierite ceramics fiber boards are also only examples, and may be appropriately modified.

In the embodiments of the invention, the side wall and the upper opposite electrode of the substrate mounting stage and the substrate processing apparatus have been composed of the composite material comprising the matrix and the ceramics layer, but are not limited to these configurations. That is, the side wall and the upper opposite electrode of the substrate mounting stage and the substrate processing apparatus may be manufactured on the basis of a combination of the composite material and a metal material or a metal compound material.

Figure 18A:
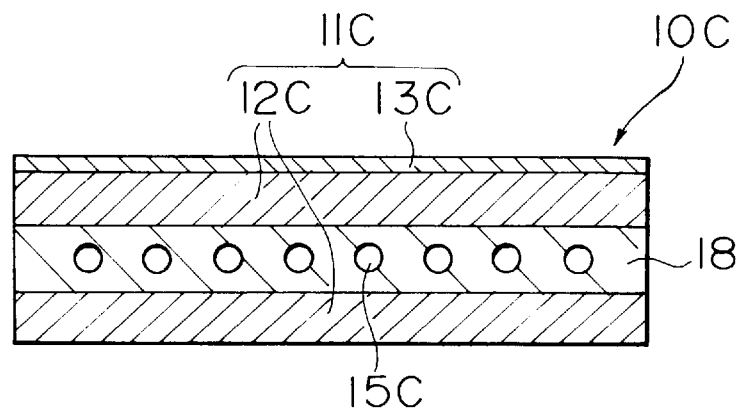
FIG. 18 consisting of FIGS. 18A through 18C is a schematic sectional view of a variant of the substrate mounting stage in the invention.
Figure 18B:
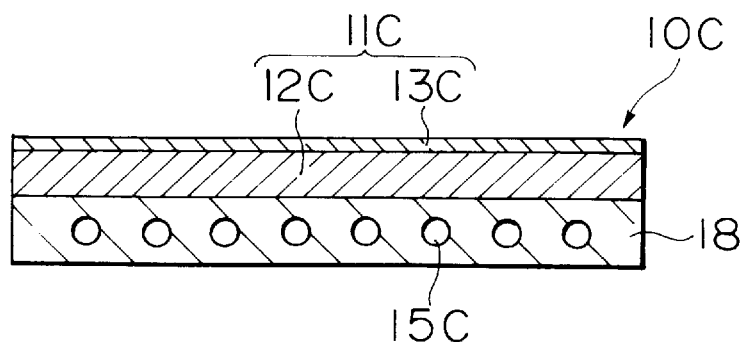
Figure 18C:
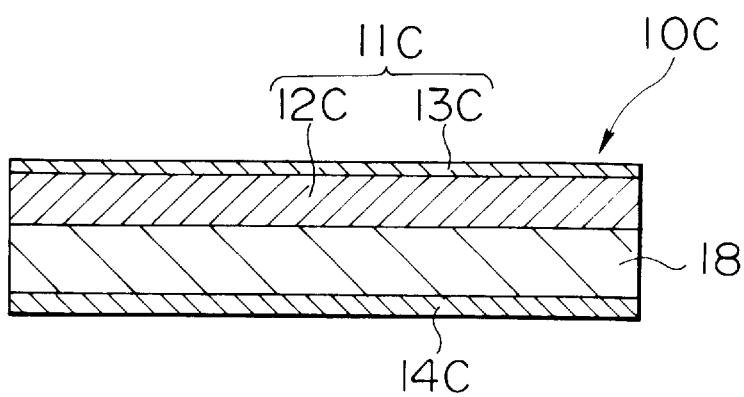
Figure 19A:
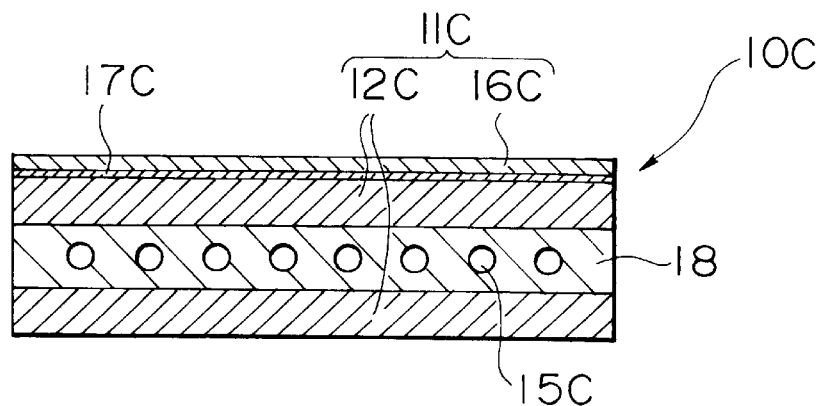
FIG. 19 consisting of FIGS. 19A through 19C is a schematic sectional view of another variant of the substrate mounting stage in the invention.
Figure 19B:
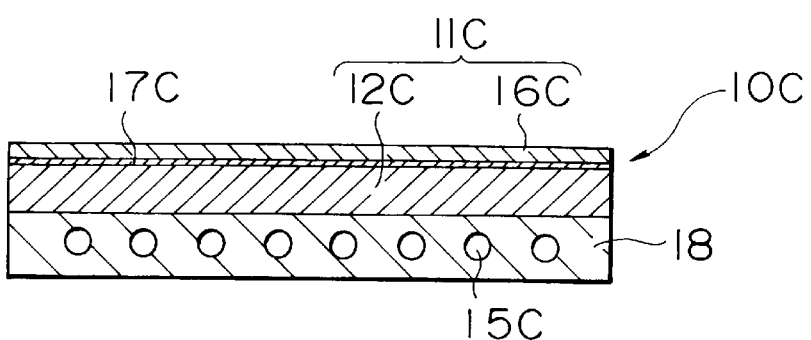
Figure 19C:
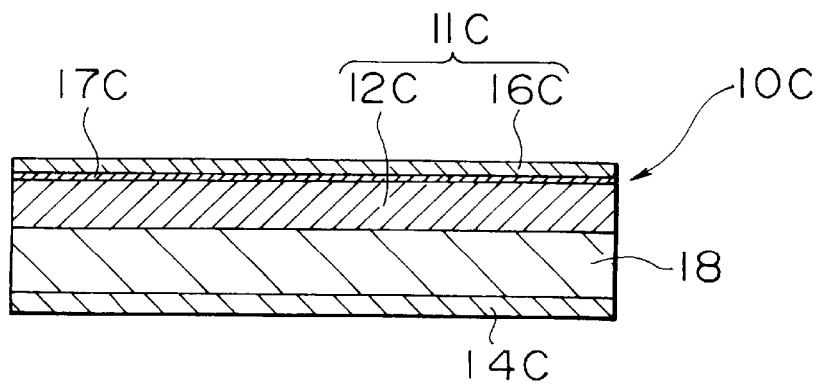

FIGS. 18 and 19 illustrate schematic sectional views of the substrate mounting stages manufactured by securing the composite material 11C to a disk-shaped aluminum member 18 by brazing or screw fitting. The brazing material or the screw is not shown in FIGS. 18 to 23. In FIG. 18(A) or 19(A), a piping 15C is arranged in the interior of the disk-shaped aluminum member 18. The matrix 12C is secured to each of the upper and the lower surfaces of the disk-shaped member 18. The composite material 11C secured to the upper surface of the disk-shaped member 18 has the same structure as the composite materials 11, 11A and 11B described above as to the embodiments 1 to 3. In FIG. 18(B) or 19(B), the matrix 12C on the lower surface of the disk-shaped aluminum member 18 is omitted. In FIG. 18(C) or 19(C), a PBN heater 14C is attached to the lower surface of the disk-shaped aluminum member 18. The material 11C is secured to the upper surface of the disk-shaped member 18.

Figure 20A:
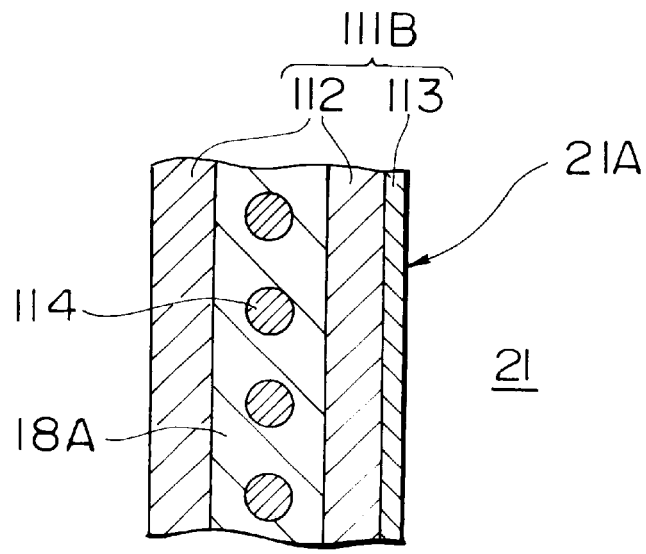
FIG. 20 consisting of FIGS. 20A and B is a schematic sectional view of a variant of side wall of the dry etching unit which is the substrate processing apparatus in the invention.
Figure 20B:
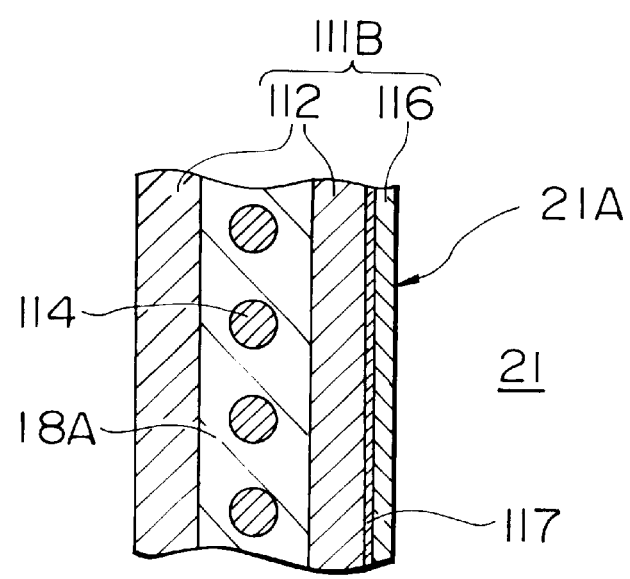
Figure 21A:
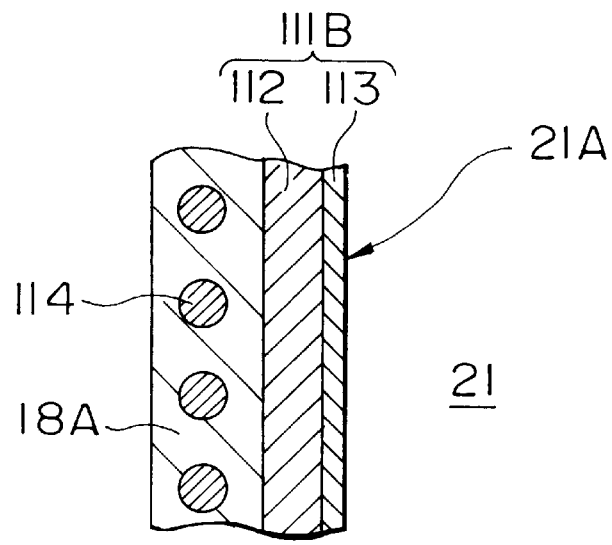
FIG. 21 consisting of FIGS. 21A and 21B is a schematic sectional view of another variant of the side wall of the dry etching unit which is substrate processing apparatus in the invention.
Figure 21B:
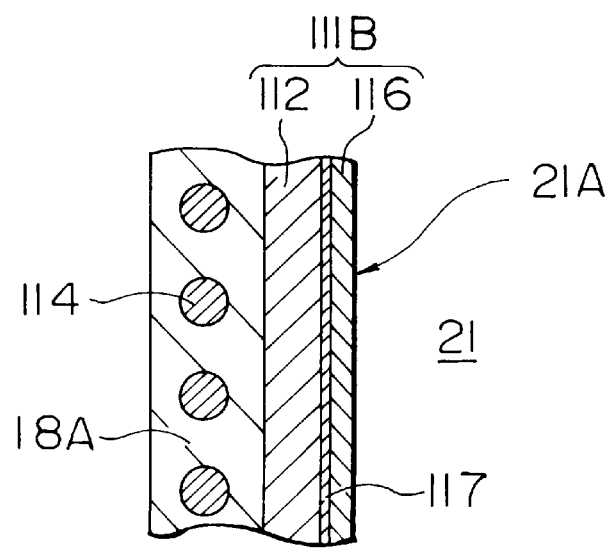
Figure 22A:
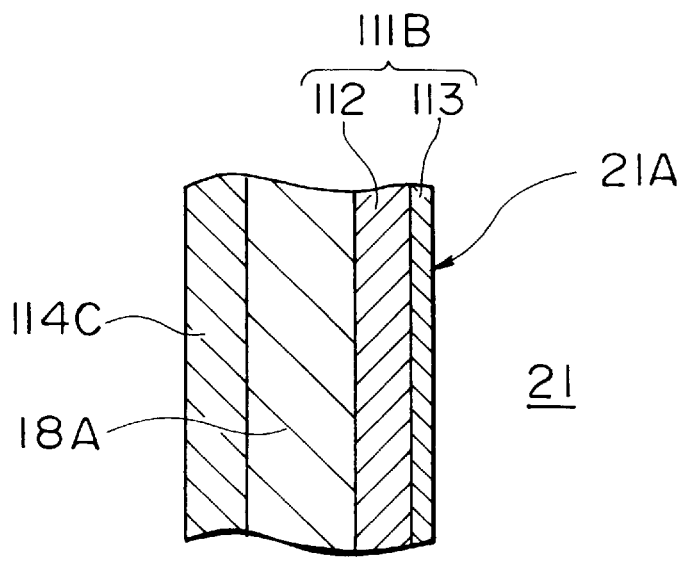
FIG. 22 consisting of FIGS. 22A and 22B is a schematic sectional view of another variant of the side wall of the dry etching unit which is the substrate processing apparatus in the invention.
Figure 22B:
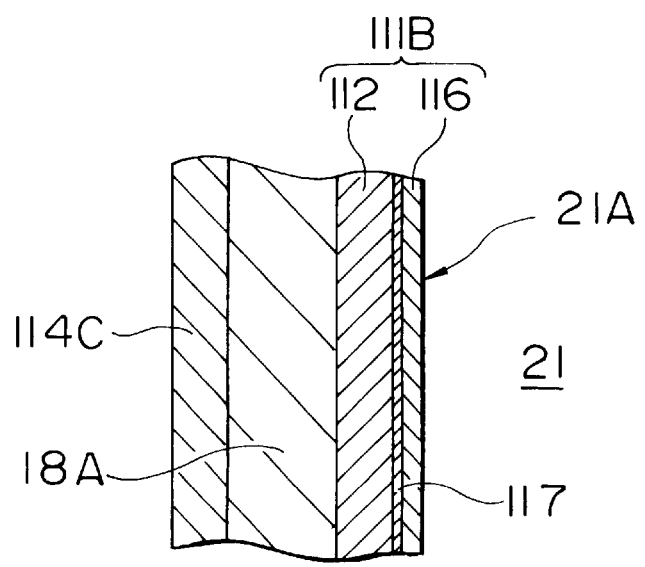

FIGS. 20 to 22 are schematic sectional views of the side wall of the substrate processing apparatus manufactured by securing the composite material 111B by brazing or screw fitting to the hollow cylindrical member 18A made of stainless steel or aluminum. In FIG. 20(A) or (B), a heater 114 (or piping) is arranged in the interior of the hollow cylindrical member 18A. The matrix 112 is secured to each of the inner and the outer surface of the hollow cylindrical member 18A. The composite material 111B secured to the inner surface (on the chamber 21 side) of the hollow cylindrical member 18A has the same structure as the composite materials 111 and 111A described above as to the embodiments 10 to 12. In FIG. 21(A) or 21(B), the matrix 112 on the outer surface of the hollow cylindrical member 18A is omitted. In FIG. 22(A) or 22(B), a PBN heater 114C is attached to the outer surface of the hollow cylindrical member 18A. The composite material 111B is secured to the inner surface of the hollow cylindrical member 18A.

Figure 23A:
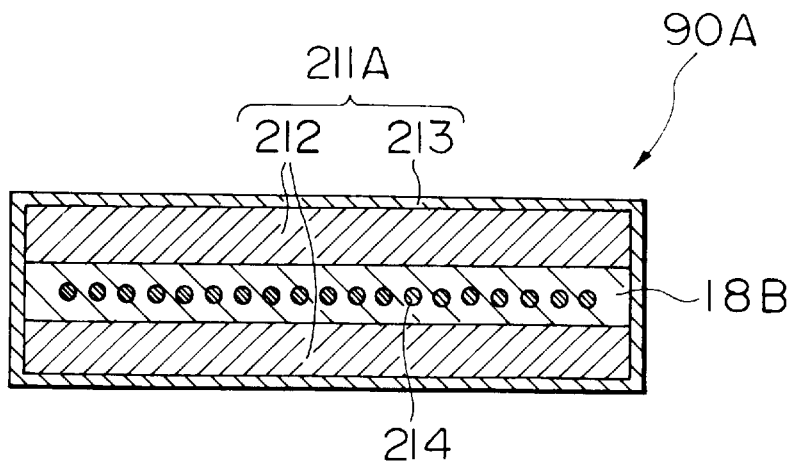
FIG. 23 consisting of FIGS. 23A through 23C is a schematic sectional view of a variant of the parallel and flat upper opposed electrode of the dry etching unit which is the substrate processing apparatus in the invention.
Figure 23B:
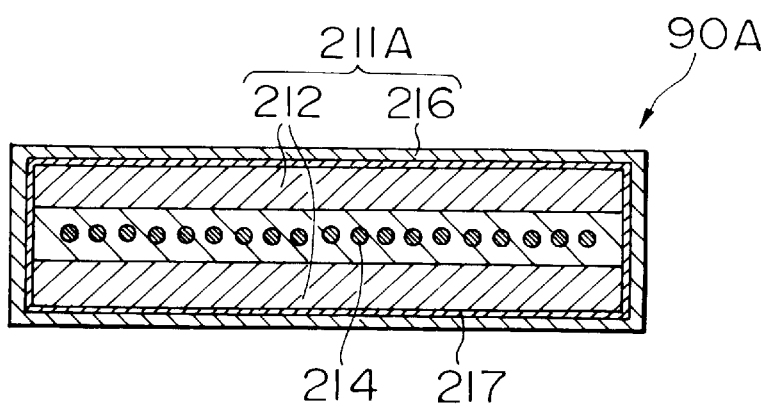
Figure 23C:
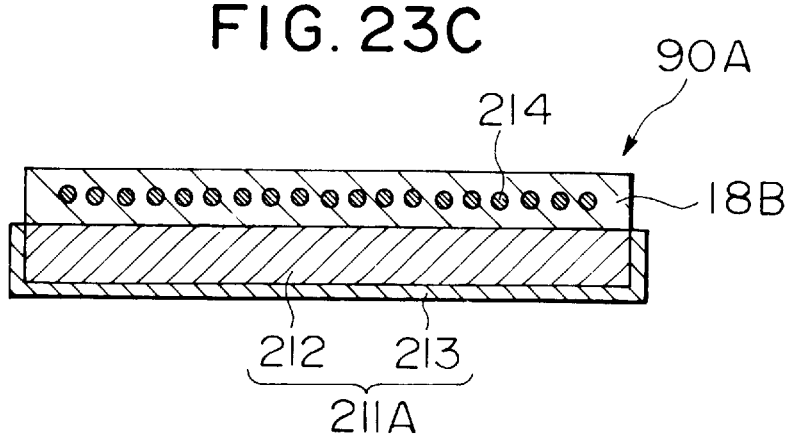

FIG. 23 illustrates a schematic sectional view of an upper opposite electrode 90A manufactured by securing the composite material 211A by brazing or screw fitting to a disk-shaped member 18B made of stainless steel or aluminum. A heater 214 is provided in the interior of the disk-shaped member 18B. The composite material 211A is secured to each of the upper and the lower surface of the disk-shaped member 18B. The composite material 211A has the same structure as the composite material 211 described above as to the embodiment 13. In FIG. 23(C), a composite material on the upper surface of the disk-shaped member 18B is omitted.

By using a composite material comprising a matrix and a ceramics layer, in the present invention, the matrix can have properties coming between a ceramics member and an aluminum-based material, and it is possible to adjust, for example, the linear expansion coefficient also to a value coming in between. It is consequently possible to avoid occurrence of damages to the ceramics layer caused by heat expansion of the matrix certainly at high temperatures. As a result, it is possible to effectively prevent deposits from accumulating on a part of the substrate processing apparatus such as the side wall, the ceiling plate or the upper opposite electrode. In addition, because the matrix has a high thermal conductivity, the substrate, for example, can be efficiently heated, and the composite material can be efficiently heated by, for, example, temperature control means. It is also possible to accomplish high-accuracy temperature control during heating to a high temperature, so far unavailable in the conventional art because of occurrence of cracks in the ceramics layer. This permits stable operation at a high accuracy of the manufacturing process of a semiconductor device over a wide range including etching, CVD processing and sputtering. A large-diameter substrate mounting stage of about 300 mm can be achieved, hence making it possible to cope with the future tendency toward a large-diameter wafer.

Further, because of the provision of the ceramics layer, occurrence of metal contamination can be prevented, and for example, it is possible to effectively prevent occurrence of corrosion of the composite material caused by a halogen gas.

What is claimed is:

1. A multilayer composite material comprising:
   a porous matrix which comprises a ceramics member;
   an aluminum-based material filling at least some of said porous matrix; and
   a ceramics layer provided on a surface of said porous matrix.

2. A composite material according to claim 1, wherein the matrix has a linear expansion coefficient $\alpha_1$[unit: 10-6/K], and the ceramics layer has a linear expansion coefficient $\alpha_2$[unit: 10-6/K] satisfying $(\alpha_1-3) \leq \alpha_2 \leq (\alpha_1+3)$.

3. A composite material according to claim 2, wherein the ceramics member comprises cordierite ceramics; the aluminum-based material composing the matrix comprises aluminum and silicon; and the ceramics layer comprises $Al_2O_3$.

4. A composite material according to claim 3, wherein a volumetric ratio of cordierite ceramics to the aluminum-based material is determined so as to satisfy $(\alpha_1-3) \leq \alpha_2 \leq (\alpha_1+3)$.

5. A composite material according to claim 3, wherein the volumetric ratio of cordierite ceramics to the aluminum-based material is within a range of from 25/75 to 75/25.

6. A composite material according to claim 3, wherein said aluminum-based material contains silicon in an amount within a range of from 12 to 35 vol. %.

7. A composite material according to claim 3, wherein said ceramics member comprises a fired mixture of cordierite ceramics powder and cordierite ceramics fiber.

8. A composite material according to claim 7, wherein the ratio of said cordierite ceramics fiber in said fired mixture is within a range of from 1 to 20 vol. %.

9. A composite material according to claim 7, wherein said cordierite ceramics powder has an average particle size within a range of from 1 to 100 μm, and said cordierite ceramics fiber has an average diameter within a range of from 2 to 10 μm and an average length within a range of from 0.1 to 10 mm.

10. A composite material according to claim 7, wherein said ceramics member has a porosity within a range of from 25 to 75%.

11. A composite material according to claim 2, wherein said ceramics member composing the matrix comprises aluminum nitride; said aluminum-based material composing the matrix comprises aluminum or aluminum and silicon;

and the material of said ceramics layer comprises $Al_2O_3$ or aluminum nitride.

12. A composite material according to claim 11, wherein a volumetric ratio of aluminum nitride to the aluminum-based material is determined so as to satisfy $(\alpha_1-3) \leq \alpha_2 \leq (\alpha_1+3)$.

13. A composite material according to claim 11, wherein the volumetric ratio of aluminum nitride to the aluminum-based material is within a range of from 40/60 to 80/20.

14. A composite material according to claim 11, wherein the aluminum-based material composing the matrix comprises aluminum and silicon and contains silicon in an amount within a range of from 12 to 35 vol. %.

15. A composite material according to claim 2, wherein said ceramics member composing the matrix comprises silicon carbide; said aluminum-based material composing the matrix comprises aluminum or aluminum and silicon; and said ceramics layer comprises $Al_2O_3$ or aluminum nitride.

16. A composite material according to claim 15, wherein a volumetric ratio of silicon carbide to the aluminum-based material is determined so as to satisfy $(\alpha_1-3) \leq \alpha_2 \leq (\alpha_1+3)$.

17. A composite material according to claim 15, wherein the volumetric ratio of silicon carbide to the aluminum-based material is within a range of from 40/60 to 80/20.

18. A composite material according to claim 15, wherein said aluminum-based material composing the matrix comprises aluminum and silicon, and contains silicon in an amount within a range of from 12 to 35 vol. %.

19. A composite material according to claim 1, wherein said ceramics layer is formed on the surface of said matrix by the flame spraying method.

20. A composite material according to claim 1, wherein said ceramics layer is attached to the surface of said matrix by brazing.

* * * * *

UNITED STATES PATENT AND TRADEMARK OFFICE
CERTIFICATE OF CORRECTION

PATENT NO. : 6,391,437 B2  Page 1 of 1
DATED : May 21, 2002
INVENTOR(S) : Shingo Kadomura It is certified that error appears in the above-identified patent and that said Letters Patent is hereby corrected as shown below:

Column 50,
Lines 31 and 33, replace "[unit: 10-6/K]" with -- [unit: $10^{-6}$/K] --.

Signed and Sealed this

Twelfth Day of August, 2003

JAMES E. ROGAN
*Director of the United States Patent and Trademark Office*